(12) United States Patent
Henry et al.

(10) Patent No.: US 10,284,259 B2
(45) Date of Patent: May 7, 2019

(54) BACKHAUL LINK FOR DISTRIBUTED ANTENNA SYSTEM

(71) Applicant: AT&T Intellectual Property I, L.P., Atlanta, GA (US)

(72) Inventors: Paul Shala Henry, Holmdel, NJ (US); Farhad Barzegar, Branchburg, NJ (US); George Blandino, Bridgewater, NJ (US); Irwin Gerszberg, Kendall Park, NJ (US); Donald J. Barnickel, Flemington, NJ (US); Thomas M. Willis, III, Tinton Falls, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/000,671

(22) Filed: Jun. 5, 2018

(65) Prior Publication Data

US 2018/0287667 A1 Oct. 4, 2018

Related U.S. Application Data

(63) Continuation of application No. 15/179,204, filed on Jun. 10, 2016, now Pat. No. 10,009,065, which is a (Continued)

(51) Int. Cl.
*H04B 3/54* (2006.01)
*H04W 72/04* (2009.01)
(Continued)

(52) U.S. Cl.
CPC ....... *H04B 3/542* (2013.01); *H04B 10/25753* (2013.01); *H04B 10/25759* (2013.01);
(Continued)

(58) Field of Classification Search
CPC ........ H04B 10/25753; H04B 10/25759; H04B 3/542; H04L 69/08; H04W 16/26;
(Continued)

(56) References Cited

U.S. PATENT DOCUMENTS

| 2,685,068 A | 7/1954 | Goubau |
| 2,852,753 A | 9/1958 | Gent et al. |

(Continued)

FOREIGN PATENT DOCUMENTS

| WO | 20170214162 | 12/2017 |
| WO | 2018106455 A1 | 6/2018 |

(Continued)

OTHER PUBLICATIONS

Article 34 Amendment for PCT/US2017/063172 filed, Apr. 10, 2018.

(Continued)

*Primary Examiner* — Kabir A Timory
(74) *Attorney, Agent, or Firm* — Guntin & Gust, PLC; Matthew Tropper

(57) ABSTRACT

A distributed antenna and backhaul system provide network connectivity for a small cell deployment. Rather than building new structures, and installing additional fiber and cable, embodiments described herein disclose using high-bandwidth, millimeter-wave communications and existing power line infrastructure. Above ground backhaul connections via power lines and line-of-sight millimeter-wave band signals as well as underground backhaul connections via buried electrical conduits can provide connectivity to the distributed base stations. An overhead millimeter-wave system can also be used to provide backhaul connectivity. Modules can be placed onto existing infrastructure, such as streetlights
(Continued)

and utility poles, and the modules can contain base stations and antennas to transmit the millimeter-waves to and from other modules.

20 Claims, 33 Drawing Sheets

Related U.S. Application Data continuation-in-part of application No. 14/788,994, filed on Jul. 1, 2015, now Pat. No. 9,699,785, which is a continuation of application No. 14/274,638, filed on May 9, 2014, now Pat. No. 9,119,127, which is a continuation of application No. 13/705,690, filed on Dec. 5, 2012, now Pat. No. 9,113,347.

(51) Int. Cl.

| | |
|---|---|
| H04B 10/2575 | (2013.01) |
| H04W 16/26 | (2009.01) |
| H04W 24/02 | (2009.01) |
| H04W 36/22 | (2009.01) |
| H04L 29/06 | (2006.01) |
| H04W 88/08 | (2009.01) |
| H04W 84/04 | (2009.01) |
| H04B 3/52 | (2006.01) |
| H04W 36/32 | (2009.01) |

(52) U.S. Cl.
CPC .......... *H04L 69/08* (2013.01); *H04W 16/26* (2013.01); *H04W 24/02* (2013.01); *H04W 36/22* (2013.01); *H04W 72/0453* (2013.01); *H04W 88/085* (2013.01); *H04B 3/52* (2013.01); *H04B 2203/5441* (2013.01); *H04B 2203/5479* (2013.01); *H04W 36/32* (2013.01); *H04W 84/045* (2013.01)

(58) Field of Classification Search
CPC ............... H04W 24/02; H04W 36/22; H04W 72/0453; H04W 88/085
See application file for complete search history.

(56) References Cited

U.S. PATENT DOCUMENTS

| | | | |
|---|---|---|---|
| 2,867,776 | A | 1/1959 | Wilkinson, Jr. |
| 2,912,695 | A | 11/1959 | Cutler |
| 2,921,277 | A | 1/1960 | Goubau |
| 3,201,724 | A | 8/1965 | Hafner |
| 3,566,317 | A | 2/1971 | Hafner |
| 5,889,449 | A | 3/1999 | Fiedziuszko |
| 5,890,055 | A | 3/1999 | Chu et al. |
| 6,239,377 | B1 | 5/2001 | Nishikawa |
| 6,434,187 | B1* | 8/2002 | Beard .................... H04B 1/403 332/128 |
| 7,009,471 | B2 | 3/2006 | Elmore |
| 7,043,271 | B1 | 5/2006 | Seto et al. |
| 7,280,033 | B2 | 10/2007 | Berkman et al. |
| 7,345,623 | B2 | 3/2008 | McEwan et al. |
| 7,567,154 | B2 | 7/2009 | Elmore |
| 7,590,404 | B1 | 9/2009 | Johnson et al. |
| 7,634,250 | B1 | 12/2009 | Prasad et al. |
| 8,159,385 | B2 | 4/2012 | Farneth et al. |
| 8,212,635 | B2 | 7/2012 | Miller, II et al. |
| 8,237,617 | B1 | 8/2012 | Johnson et al. |
| 8,253,516 | B2 | 8/2012 | Miller, II et al. |
| 8,269,583 | B2 | 9/2012 | Miller, II et al. |
| 8,344,829 | B2 | 1/2013 | Miller, II et al. |
| 8,736,502 | B1 | 5/2014 | Mehr et al. |
| 8,897,697 | B1 | 11/2014 | Bennett et al. |
| 9,113,347 | B2 | 8/2015 | Henry et al. |
| 9,209,902 | B2 | 12/2015 | Willis, III et al. |
| 9,312,919 | B1 | 4/2016 | Barzegar et al. |
| 9,461,706 | B1 | 10/2016 | Bennett et al. |
| 9,490,869 | B1 | 11/2016 | Henry |
| 9,509,415 | B1 | 11/2016 | Henry et al. |
| 9,520,945 | B2 | 12/2016 | Gerszberg et al. |
| 9,525,524 | B2 | 12/2016 | Barzegar et al. |
| 9,544,006 | B2 | 1/2017 | Henry et al. |
| 9,564,947 | B2 | 2/2017 | Stuckman et al. |
| 9,577,306 | B2 | 2/2017 | Willis, III et al. |
| 9,608,692 | B2 | 3/2017 | Willis, III et al. |
| 9,608,740 | B2 | 3/2017 | Henry et al. |
| 9,615,269 | B2 | 4/2017 | Henry et al. |
| 9,627,768 | B2 | 4/2017 | Henry et al. |
| 9,628,116 | B2 | 4/2017 | Willis, III et al. |
| 9,640,850 | B2 | 5/2017 | Henry et al. |
| 9,653,770 | B2 | 5/2017 | Henry et al. |
| 9,680,670 | B2 | 6/2017 | Henry et al. |
| 9,692,101 | B2 | 6/2017 | Henry et al. |
| 9,705,561 | B2 | 7/2017 | Henry et al. |
| 9,705,571 | B2 | 7/2017 | Gerszberg et al. |
| 9,742,462 | B2 | 8/2017 | Bennett et al. |
| 9,748,626 | B2 | 8/2017 | Henry et al. |
| 9,749,053 | B2 | 8/2017 | Henry et al. |
| 9,722,318 | B2 | 9/2017 | Adriazola et al. |
| 9,768,833 | B2 | 9/2017 | Fuchs et al. |
| 9,769,020 | B2 | 9/2017 | Henry et al. |
| 9,780,834 | B2 | 10/2017 | Henry et al. |
| 9,793,951 | B2 | 10/2017 | Henry et al. |
| 9,793,954 | B2 | 10/2017 | Bennett et al. |
| 9,847,566 | B2 | 12/2017 | Henry et al. |
| 9,853,342 | B2 | 12/2017 | Henry et al. |
| 9,860,075 | B1 | 1/2018 | Gerszberg et al. |
| 9,865,911 | B2 | 1/2018 | Henry et al. |
| 9,866,309 | B2 | 1/2018 | Bennett et al. |
| 9,871,282 | B2 | 1/2018 | Henry et al. |
| 9,871,283 | B2 | 1/2018 | Henry et al. |
| 9,876,264 | B2 | 1/2018 | Barnickel et al. |
| 9,876,570 | B2 | 1/2018 | Henry et al. |
| 9,876,605 | B1 | 1/2018 | Henry et al. |
| 9,882,257 | B2 | 1/2018 | Henry et al. |
| 9,893,795 | B1 | 2/2018 | Willis et al. |
| 9,912,381 | B2 | 3/2018 | Bennett et al. |
| 9,917,341 | B2 | 3/2018 | Henry et al. |
| 9,991,580 | B2 | 6/2018 | Henry et al. |
| 9,997,819 | B2 | 6/2018 | Bennett et al. |
| 9,998,172 | B1 | 6/2018 | Barzegar et al. |
| 9,998,870 | B1 | 6/2018 | Bennett et al. |
| 9,999,038 | B2 | 6/2018 | Barzegar et al. |
| 10,003,364 | B1 | 6/2018 | Willis, III et al. |
| 10,009,063 | B2 | 6/2018 | Gerszberg et al. |
| 10,009,065 | B2 | 6/2018 | Henry et al. |
| 10,009,901 | B2 | 6/2018 | Gerszberg |
| 10,027,397 | B2 | 7/2018 | Kim |
| 10,027,427 | B2 | 7/2018 | Vannucci et al. |
| 10,033,107 | B2 | 7/2018 | Henry et al. |
| 10,033,108 | B2 | 7/2018 | Henry et al. |
| 10,044,409 | B2 | 8/2018 | Barzegar et al. |
| 10,051,483 | B2 | 8/2018 | Barzegar et al. |
| 10,051,488 | B1 | 8/2018 | Vannucci et al. |
| 10,062,970 | B1 | 8/2018 | Vannucci et al. |
| 10,069,535 | B2 | 9/2018 | Vannucci et al. |
| 10,079,661 | B2 | 9/2018 | Gerszberg et al. |
| 10,090,606 | B2 | 10/2018 | Henry et al. |
| 10,096,883 | B2 | 10/2018 | Henry et al. |
| 10,103,777 | B1 | 10/2018 | Henry et al. |
| 10,103,801 | B2 | 10/2018 | Bennett et al. |
| 2004/0113756 | A1 | 6/2004 | Mollenkopf et al. |
| 2005/0042989 | A1 | 2/2005 | Ho et al. |
| 2005/0258920 | A1 | 11/2005 | Elmore et al. |
| 2006/0111047 | A1 | 5/2006 | Louberg et al. |
| 2008/0064331 | A1 | 3/2008 | Washiro et al. |
| 2008/0113616 | A1 | 5/2008 | Kim et al. |
| 2008/0122642 | A1 | 5/2008 | Radtke et al. |
| 2008/0211727 | A1 | 9/2008 | Elmore et al. |
| 2008/0252541 | A1 | 10/2008 | Diaz et al. |
| 2008/0279292 | A1 | 11/2008 | Tanabe et al. |
| 2009/0079660 | A1 | 3/2009 | Elmore et al. |
| 2009/0088091 | A1* | 4/2009 | Shen .................... H04B 1/0483 455/102 |

(56) References Cited

U.S. PATENT DOCUMENTS

| | | |
|---|---|---|
| 2009/0109981 A1 | 4/2009 | Keselman |
| 2009/0258652 A1 | 10/2009 | Lambert et al. |
| 2010/0090887 A1 | 4/2010 | Cooper et al. |
| 2010/0159823 A1 | 6/2010 | Smith et al. |
| 2010/0225426 A1 | 9/2010 | Unger et al. |
| 2010/0277003 A1 | 11/2010 | Von Novak et al. |
| 2010/0284446 A1 | 11/2010 | Mu et al. |
| 2011/0053498 A1 | 3/2011 | Nogueira-Nine |
| 2011/0110404 A1 | 5/2011 | Washiro |
| 2011/0132658 A1 | 6/2011 | Miller, II et al. |
| 2011/0136432 A1 | 6/2011 | Miller, II et al. |
| 2011/0187578 A1 | 8/2011 | Farneth et al. |
| 2012/0133373 A1 | 5/2012 | Ali et al. |
| 2012/0154239 A1 | 6/2012 | Bar-Sade et al. |
| 2012/0306587 A1 | 12/2012 | Strid et al. |
| 2013/0064311 A1 | 3/2013 | Turner et al. |
| 2014/0285277 A1 | 9/2014 | Herbsommer et al. |
| 2015/0188584 A1 | 7/2015 | Laurent-Michel et al. |
| 2015/0304045 A1 | 10/2015 | Henry et al. |
| 2016/0080839 A1 | 3/2016 | Fuchs et al. |
| 2016/0112093 A1 | 4/2016 | Barzegar |
| 2016/0142196 A1 | 5/2016 | Saban et al. |
| 2016/0164571 A1 | 6/2016 | Bennett et al. |
| 2016/0164573 A1 | 6/2016 | Birk et al. |
| 2016/0182096 A1 | 6/2016 | Panioukov et al. |
| 2016/0261311 A1 | 9/2016 | Henry et al. |
| 2016/0278094 A1 | 9/2016 | Henry et al. |
| 2016/0315662 A1 | 10/2016 | Henry |
| 2016/0323015 A1 | 11/2016 | Henry et al. |
| 2016/0359541 A1 | 12/2016 | Bennett |
| 2016/0359546 A1 | 12/2016 | Bennett |
| 2016/0359547 A1 | 12/2016 | Bennett et al. |
| 2016/0360511 A1 | 12/2016 | Barzegar |
| 2016/0360533 A1 | 12/2016 | Bennett et al. |
| 2016/0365175 A1 | 12/2016 | Bennett et al. |
| 2016/0365966 A1 | 12/2016 | Bennett et al. |
| 2017/0012667 A1 | 1/2017 | Bennett |
| 2017/0018332 A1 | 1/2017 | Barzegar et al. |
| 2017/0018851 A1 | 1/2017 | Henry et al. |
| 2017/0018856 A1 | 1/2017 | Henry et al. |
| 2017/0033465 A1 | 2/2017 | Henry et al. |
| 2017/0033466 A1 | 2/2017 | Henry et al. |
| 2017/0033953 A1 | 2/2017 | Henry et al. |
| 2017/0033954 A1 | 2/2017 | Henry et al. |
| 2017/0078064 A1 | 3/2017 | Gerszberg et al. |
| 2017/0079024 A1 | 3/2017 | Gerszberg |
| 2017/0079037 A1 | 3/2017 | Gerszberg et al. |
| 2017/0079038 A1 | 3/2017 | Gerszberg et al. |
| 2017/0079039 A1 | 3/2017 | Gerszberg et al. |
| 2017/0085003 A1 | 3/2017 | Johnson et al. |
| 2017/0093693 A1 | 3/2017 | Barzegar et al. |
| 2017/0110795 A1 | 4/2017 | Henry |
| 2017/0110804 A1 | 4/2017 | Henry et al. |
| 2017/0111805 A1 | 4/2017 | Barzegar et al. |
| 2017/0229782 A1 | 8/2017 | Adriazola et al. |
| 2017/0265196 A1 | 9/2017 | Henry et al. |
| 2017/0374666 A1 | 12/2017 | Henry et al. |
| 2018/0048497 A1 | 2/2018 | Henry et al. |
| 2018/0054232 A1 | 2/2018 | Henry et al. |
| 2018/0054233 A1 | 2/2018 | Henry et al. |
| 2018/0054234 A1 | 2/2018 | Stuckman et al. |
| 2018/0062886 A1 | 3/2018 | Paul et al. |
| 2018/0069594 A1 | 3/2018 | Henry et al. |
| 2018/0069731 A1 | 3/2018 | Henry et al. |
| 2018/0076982 A1 | 3/2018 | Henry et al. |
| 2018/0076988 A1 | 3/2018 | Willis, III et al. |
| 2018/0077709 A1 | 3/2018 | Gerszberg |
| 2018/0108997 A1 | 4/2018 | Henry et al. |
| 2018/0108998 A1 | 4/2018 | Henry et al. |
| 2018/0108999 A1 | 4/2018 | Henry et al. |
| 2018/0115040 A1 | 4/2018 | Bennett et al. |
| 2018/0115044 A1 | 4/2018 | Henry et al. |
| 2018/0115058 A1 | 4/2018 | Henry et al. |
| 2018/0115060 A1 | 4/2018 | Bennett et al. |
| 2018/0115075 A1 | 4/2018 | Bennett et al. |
| 2018/0115081 A1 | 4/2018 | Johnson et al. |
| 2018/0123207 A1 | 5/2018 | Henry et al. |
| 2018/0123208 A1 | 5/2018 | Henry et al. |
| 2018/0123643 A1 | 5/2018 | Henry et al. |
| 2018/0123836 A1 | 5/2018 | Henry et al. |
| 2018/0151957 A1 | 5/2018 | Bennett et al. |
| 2018/0159195 A1 | 6/2018 | Henry et al. |
| 2018/0159196 A1 | 6/2018 | Henry et al. |
| 2018/0159228 A1 | 6/2018 | Britz et al. |
| 2018/0159229 A1 | 6/2018 | Britz |
| 2018/0159230 A1 | 6/2018 | Henry et al. |
| 2018/0159232 A1 | 6/2018 | Henry et al. |
| 2018/0159235 A1 | 6/2018 | Wolniansky |
| 2018/0159238 A1 | 6/2018 | Wolniansky |
| 2018/0159240 A1 | 6/2018 | Henry et al. |
| 2018/0159243 A1 | 6/2018 | Britz et al. |
| 2018/0166761 A1 | 6/2018 | Henry et al. |
| 2018/0166784 A1 | 6/2018 | Johnson et al. |
| 2018/0166785 A1 | 6/2018 | Henry et al. |
| 2018/0166787 A1 | 6/2018 | Johnson et al. |
| 2018/0167130 A1 | 6/2018 | Vannucci |
| 2018/0167927 A1 | 6/2018 | Beattie, Jr. et al. |

FOREIGN PATENT DOCUMENTS

| | | |
|---|---|---|
| WO | 2018106684 A1 | 6/2018 |
| WO | 2018106915 A1 | 6/2018 |

OTHER PUBLICATIONS

International Preliminary Report on Patentability for PCT/US17/36172 dated May 10, 2018.

PCT/US17/36172, International Search Report and Written Opinion dated Aug. 25, 2017, 15 Pages.

Akalin, Tahsin et al., "Single-Wire Transmission Lines at Terahertz Frequencies", IEEE Transactions on Microwave Theory and Techniques, vol. 54, No. 6, 2006, 2762-2767.

Alam, M. N. et al., "Novel Surface Wave Exciters for Power Line Fault Detection and Communications", Department of Electrical Engineering, University of South Carolina, Antennas and Propagation (APSURSI), 2011 IEEE International Symposium, IEEE, 2011, 1-4.

Barlow, H. M. et al., "Surface Waves", 621.396.11 : 538.566, Paper No. 1482 Radio Section, 1953, pp. 329-341.

Corridor Systems, "A New Approach to Outdoor DAS Network Physical Layer Using E-Line Technology", Mar. 2011, 5 pages.

Elmore, Glenn et al., "A Surface Wave Transmission Line", QEX, May/Jun. 2012, pp. 3-9.

Elmore, Glenn , "Introduction to the Propagating Wave on a Single Conductor", www.corridor.biz, Jul. 27, 2009, 30 pages.

Friedman, M et al., "Low-Loss RF Transport Over Long Distances", IEEE Transactions on Microwave Theory and Techniques, vol. 49, No. 2, Feb. 2001, 8 pages.

Goubau, Georg et al., "Investigation of a Surface-Wave Line for Long Distance Transmission", 1952, 263-267.

Goubau, Georg et al., "Investigations with a Model Surface Wave Transmission Line", IRE Transactions on Antennas and Propagation, 1957, 222-227.

Goubau, Georg , "Open Wire Lines", IRE Transactions on Microwave Theory and Techniques, 1956, 197-200.

Goubau, Georg , "Single-Conductor Surface-Wave Transmission Lines", Proceedings of the I.R.E., 1951, 619-624.

Goubau, Georg , "Surface Waves and Their Application to Transmission Lines", Radio Communication Branch, Coles Signal Laboratory, Mar. 10, 1950, 1119-1128.

Goubau, Georg , "Waves on Interfaces", IRE Transactions on Antennas and Propagation, Dec. 1959, 140-146.

Ren-Bin, Zhong et al., "Surface plasmon wave propagation along single metal wire", Chin. Phys. B, vol. 21, No. 11, May 2, 2012, 9 pages.

Sommerfeld, A. , "On the propagation of electrodynamic waves along a wire", Annals of Physics and Chemistry New Edition, vol. 67, No. 2, 1899, 72 pages.

(56) References Cited

OTHER PUBLICATIONS

Wang, Hao et al., "Dielectric Loaded Substrate Integrated Waveguide (SIW)—Plan Horn Antennas", IEEE Transactions on Antennas and Propagation, IEEE Service Center, Piscataway, NJ, US, vol. 56, No. 3, Mar. 1, 2010, 640-647.
Wang, Kanglin , "Dispersion of Surface Plasmon Polaritons on Metal Wires in the Terahertz Frequency Range", Physical Review Letters, PRL 96, 157401, 2006, 4 pages.
Zelby, Leon W. , "Propagation Modes on a Dielectric Coated Wire", Journal of the Franklin Institute, vol. 274(2), Aug. 1962, pp. 85-97.
"International Search Report and Written Opinion", PCT/US2018/015634, dated Jun. 25, 2018, 8 pages.

* cited by examiner

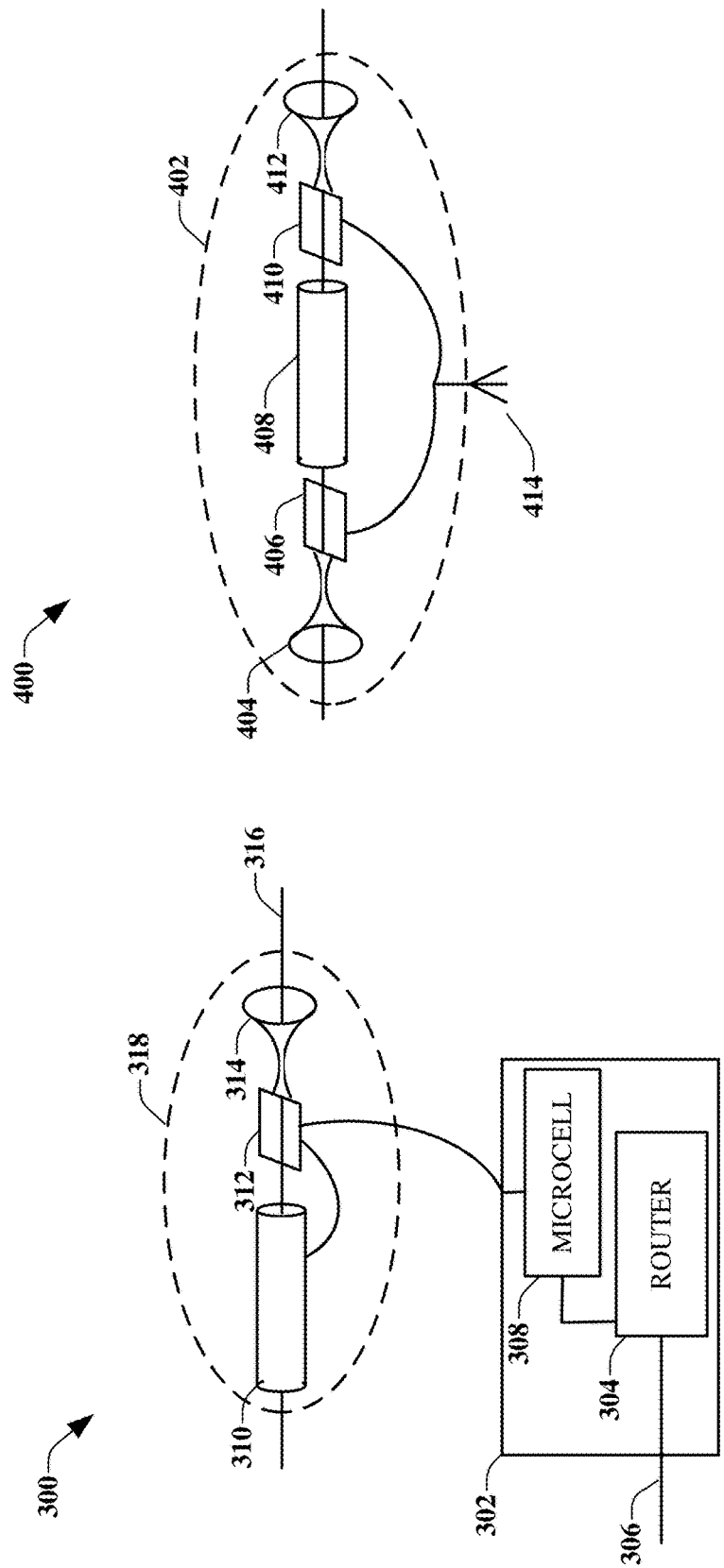

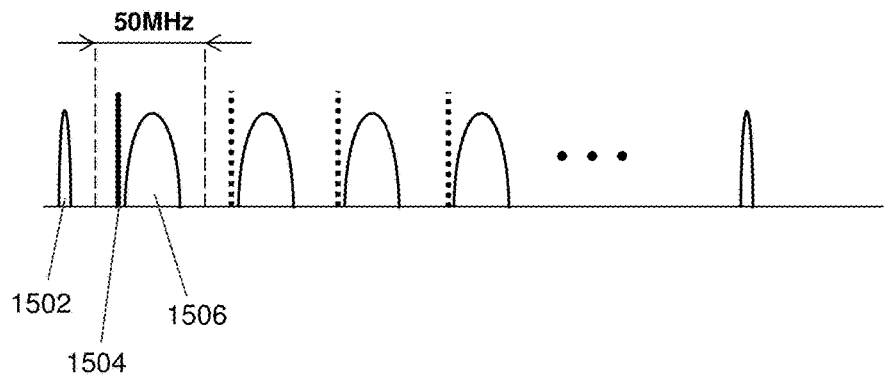
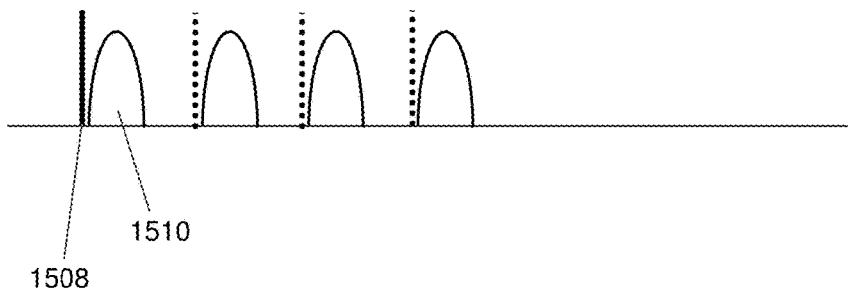
FIG. 15A

BACKHAUL LINK FOR DISTRIBUTED ANTENNA SYSTEM

CROSS-REFERENCE TO RELATED APPLICATION(S)

This application is a continuation of U.S. patent application Ser. No. 15/179,204, filed Jun. 10, 2016, which is a continuation-in-part of U.S. patent application Ser. No. 14/788,994, filed Jul. 1, 2015 (now U.S. Pat. No. 9,699,785), which is a continuation of U.S. patent application Ser. No. 14/274,638, filed May 9, 2014 (now U.S. Pat. No. 9,119,127), which is a continuation of U.S. patent application Ser. No. 13/705,690, filed Dec. 5, 2012 (now U.S. Pat. No. 9,113,347). All sections of the aforementioned application(s) and patent(s) are incorporated herein by reference in their entirety.

TECHNICAL FIELD

The subject disclosure relates to wireless communications and more particularly to providing backhaul connectivity to distributed antennas and base stations.

BACKGROUND

As smart phones and other portable devices increasingly become ubiquitous, and data usage skyrockets, macrocell base stations and existing wireless infrastructure are being overwhelmed. To provide additional mobile bandwidth, small cell deployment is being pursued, with microcells and picocells providing coverage for much smaller areas than traditional macrocells, but at high expense.

BRIEF DESCRIPTION OF THE DRAWINGS

FIG. 3 is a block diagram illustrating an example, non-limiting embodiment of a distributed antenna system in accordance with various aspects described herein.

FIG. 4 is a block diagram illustrating an example, non-limiting embodiment of a distributed antenna system in accordance with various aspects described herein.

FIG. 15A is a graphical diagram illustrating an example, non-limiting embodiment of downlink and uplink communication techniques for enabling a base station to communicate with communication nodes in accordance with various aspects described herein.

DETAILED DESCRIPTION

Figure 1:
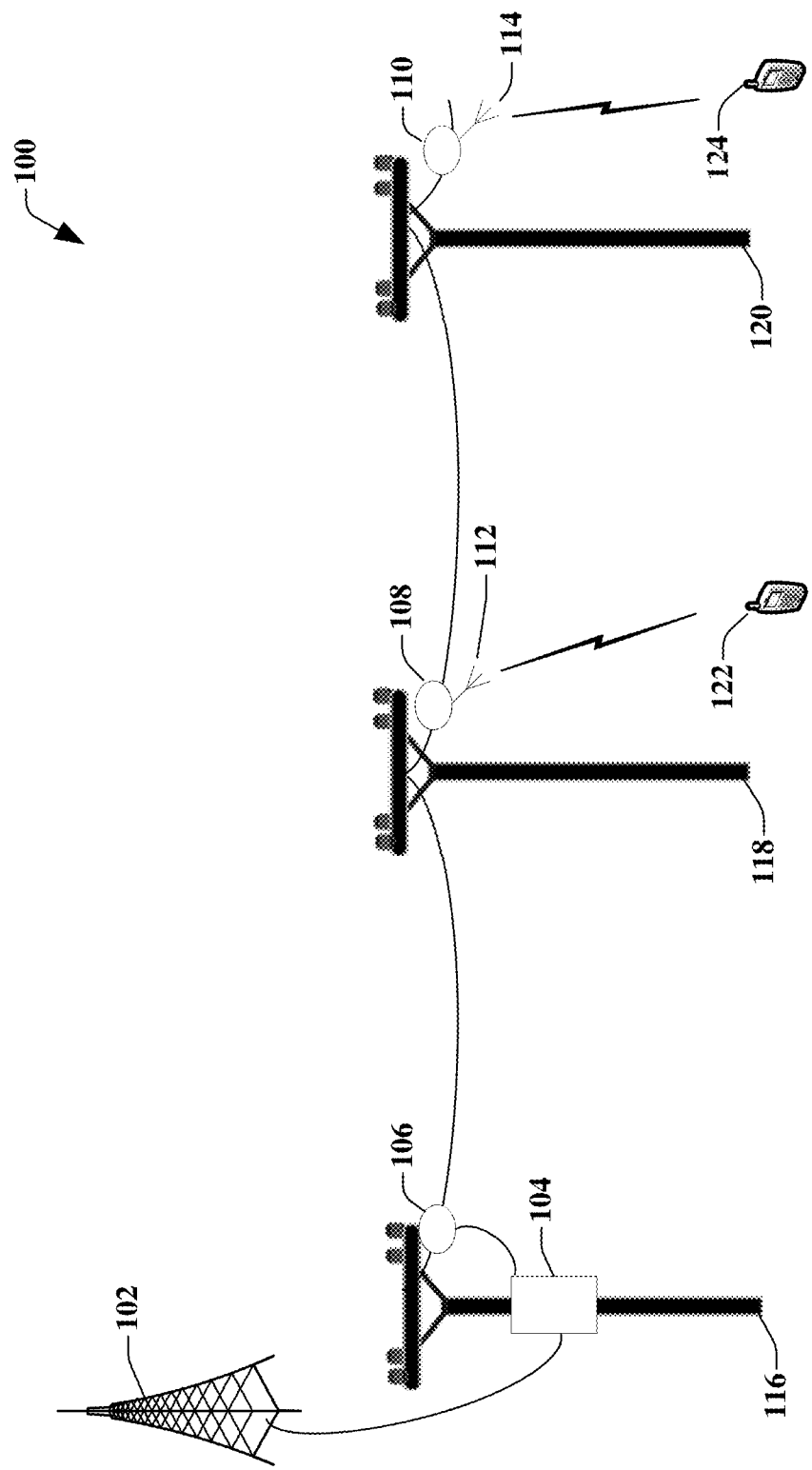
FIG. 1 is a block diagram illustrating an example, non-limiting embodiment of a distributed antenna system in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To provide network connectivity to additional base stations, the backhaul network that links the microcells and macrocells to the mobile network correspondingly expands. Providing a wireless backhaul connection is difficult due to the limited bandwidth available at commonly used frequencies. Fiber and cable have bandwidth, but installing the connections can be cost prohibitive due to the distributed nature of small cell deployment.

For these considerations as well as other considerations, in one or more embodiments, a system includes a memory to store instructions and a processor, communicatively coupled to the memory to facilitate execution of the instructions to perform operations including facilitating receipt of a first guided wave received via a power line and converting the first guided wave to an electronic transmission. The operations also include facilitating transmission of an electronic signal determined from the electronic transmission to a base station device. The operations can also include converting the electronic transmission into a second guided wave, and facilitating transmission of the second guided wave via the power line.

Another embodiment includes a memory to store instructions and a processor, communicatively coupled to the memory to facilitate execution of the instructions to perform operations including facilitating receipt of a first transmission from a first radio repeater device. The operations can include directing a second transmission to a second radio repeater device wherein the first and second transmissions are at a frequency of at least about 57 GHz. The operations also include determining an electronic signal from the first transmission and directing the electronic signal to a base station device.

In another embodiment, a method includes receiving, by a device including a processor, a first surface wave transmission via a power line and converting the first surface wave transmission into an electronic transmission. The method can also include extracting a communication signal from the electronic transmission and sending the communication signal to a base station device. The method can also include transmitting the electronic transmission as a second surface wave transmission over the power line wherein the first surface wave transmission and the second surface wave transmission are at a frequency of at least 30 GHz.

Various embodiments described herein relate to a system that provides a distributed antenna system for a small cell deployment and/or a backhaul connection for a small cell deployment. Rather than building new structures, and installing additional fiber and cable, embodiments described herein disclose using high-bandwidth, millimeter-wave communications and existing power line infrastructure. Above ground backhaul connections via power lines and line of sight millimeter-wave band signals as well as underground backhaul connections via buried electrical conduits can provide connectivity to the distributed base stations.

In an embodiment, an overhead millimeter-wave system can be used to provide backhaul connectivity. Modules can be placed onto existing infrastructure, such as streetlights and utility poles, and the modules can contain base stations and antennas to transmit the millimeter waves to and from other modules. One of the modules, or nodes, in the network can be communicably coupled, either by fiber/cable, or by a standard 57-64 Ghz GHz line-of-sight microwave connection to a macrocell site that is physically connected to the mobile network.

In another embodiment, base station nodes can be installed on utility poles, and the backhaul connection can be provided by transmitters that send millimeter-wave band surface wave transmissions via the power lines between nodes. A single site with one or more base stations can also be connected via the surface wave transmission over power lines to a distributed antenna system, with cellular antennas located at the nodes. In another embodiment, underground conduits can be used to transmit guided waves, with the waves propagating in the empty space between the conduit and the power lines. Signal extractors and base stations can be placed in existing transformer boxes.

Turning now to FIG. 1, illustrated is an example, non-limiting embodiment of a distributed antenna system 100 in accordance with various aspects described herein.

Distributed antenna system 100 includes one or more base stations (e.g., base station device 104) that are communicably coupled to a macrocell site 102. Base station device 104 can be connected by fiber and/or cable, or by a microwave wireless connection to macrocell site 102. Macrocells such as macrocell site 102 can have dedicated connections to the mobile network and base station device 104 can piggy back off of macrocell site 102's connection. Base station device 104 can be mounted on, or attached to, utility pole 116. In other embodiments, base station device 104 can be near transformers and/or other locations situated nearby a power line.

Base station device 104 can provide connectivity for mobile devices 122 and 124. Antennas 112 and 114, mounted on or near utility poles 118 and 120 can receive signals from base station device 104 and transmit those signals to mobile devices 122 and 124 over a much wider area than if the antennas 112 and 114 were located at or near base station device 104.

It is to be appreciated that FIG. 1 displays three utility poles, with one base station device, for purposes of simplicity. In other embodiments, utility pole 116 can have more base station devices, and one or more utility poles with distributed antennas are possible.

A launcher 106 can transmit the signal from base station device 104 to antennas 112 and 114 over a power line(s) that connect the utility poles 116, 118, and 120. To transmit the signal, launcher 106 upconverts the signal from base station device 104 to a millimeter-wave band signal and the launcher 106 can include a cone transceiver (shown in FIG. 3 in more detail) that launches a millimeter-wave band surface wave that propagates as a guided wave traveling along the wire. At utility pole 118, a repeater 108 receives the surface wave and can amplify it and send it forward on the power line. The repeater 108 can also extract a signal from the millimeter-wave band surface wave and shift it down in frequency to its original cellular band frequency (e.g. 1.9 GHz). An antenna can transmit the downshifted signal to mobile device 122. The process can be repeated by repeater 110, antenna 114 and mobile device 124.

Transmissions from mobile devices 122 and 124 can also be received by antennas 112 and 114 respectively. The repeaters 108 and 110 can upshift the cellular band signals to millimeter-wave band (e.g., 60-110 GHz) and transmit the signals as surface wave transmissions over the power line(s) to base station device 104.

Figure 2:
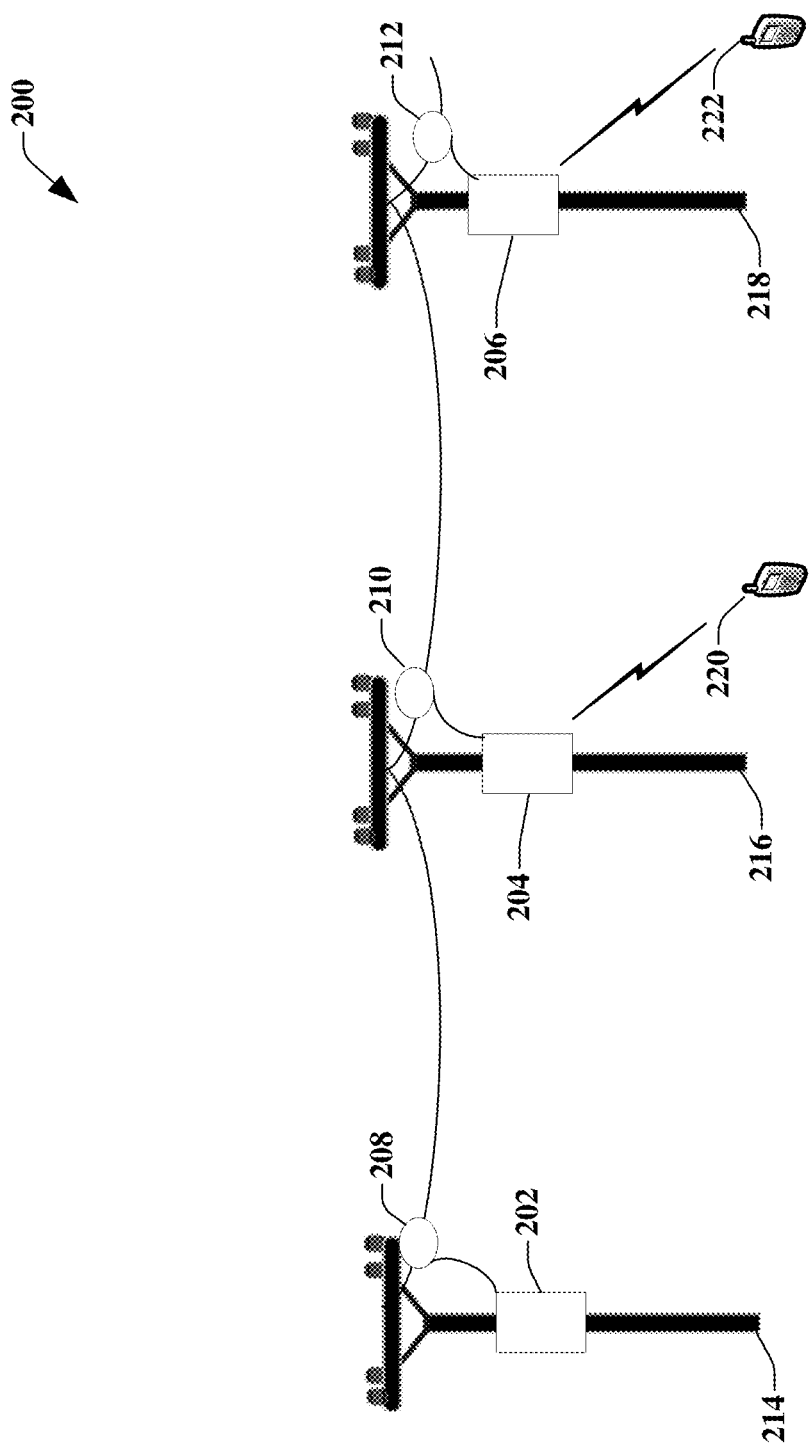
FIG. 2 is a block diagram illustrating an example, non-limiting embodiment of a backhaul system in accordance with various aspects described herein.

Turning now to FIG. 2, a block diagram illustrating an example, non-limiting embodiment of a backhaul system 200 in accordance with various aspects described herein is shown. The embodiment shown in FIG. 2 differs from FIG. 1 in that rather than having a distributed antenna system with base station devices located in one place and having remote antennas, the base station devices themselves are distributed through the system, and the backhaul connection is provided by surface wave transmissions over the power lines.

System 200 includes an RF modem 202 that receives a network connection via a physical or wireless connection to existing network infrastructure. The network connection can be via fiber and/or cable, or by a high-bandwidth microwave connection. The RF modem can receive the network connection and process it for distribution to base station devices 204 and 206. The RF modem 202 can modulate a millimeter-wave band transmission using a protocol such as DOCSIS, and out put the signal to a launcher 208. Launcher 208 can include a cone (shown in FIG. 5 in more detail) that launches a millimeter-wave band surface wave that propagates as a guided wave traveling along the wire.

At utility pole 216, a repeater 210 receives the surface wave and can amplify it and send it forward over the power line to repeater 212. Repeater 210 can also include a modem that extracts the signal from the surface wave, and output the signal to base station device 204. Base station device 204 can then use the backhaul connection to facilitate communications with mobile device 220.

Repeater 212 can receive the millimeter-wave band surface wave transmission sent by repeater 210, and extract a signal via a modem, and output the signal to base station device 206 which can facilitate communications with mobile device 222. The backhaul connection can work in reverse as well, with transmissions from mobile devices 220 and 222 being received by base station devices 204 and 206 which forward the communications via the backhaul network to repeaters 210 and 212. Repeaters 210 and 212 can convert the communications signal to a millimeter-wave band surface wave and transmit it via the power line back to launcher 208, RF modem 202 and on to the mobile network.

Turning now to FIG. 3, a block diagram illustrating an example, non-limiting embodiment of a distributed antenna system 300 is shown. FIG. 3 shows in more detail the base station 104 and launcher 106 described in FIG. 1. A base station device 302 can include a router 304 and a microcell 308 (or picocell, femtocell, or other small cell deployment). The base station device 302 can receive an external network connection 306 that is linked to existing infrastructure. The network connection 306 can be physical (such as fiber or cable) or wireless (high-bandwidth microwave connection). The existing infrastructure that the network connection 306 can be linked to, can in some embodiments be macrocell sites. For those macrocell sites that have high data rate network connections, base station device 302 can share the network connection with the macrocell site.

The router 304 can provide connectivity for microcell 308 which facilitates communications with the mobile devices. While FIG. 3 shows that base station device 302 has one microcell, in other embodiments, the base station device 302 can include two or more microcells. The RF output of microcell 308 can be used to modulate a 60 GHz signal and be connected via fiber to a launcher 318. It is to be appreciated that launcher 318 and repeater 108 include similar functionality, and a network connection 306 can be linked to either launcher 318 or repeater 108 (and 106, 110, and etc.).

Figure 7:
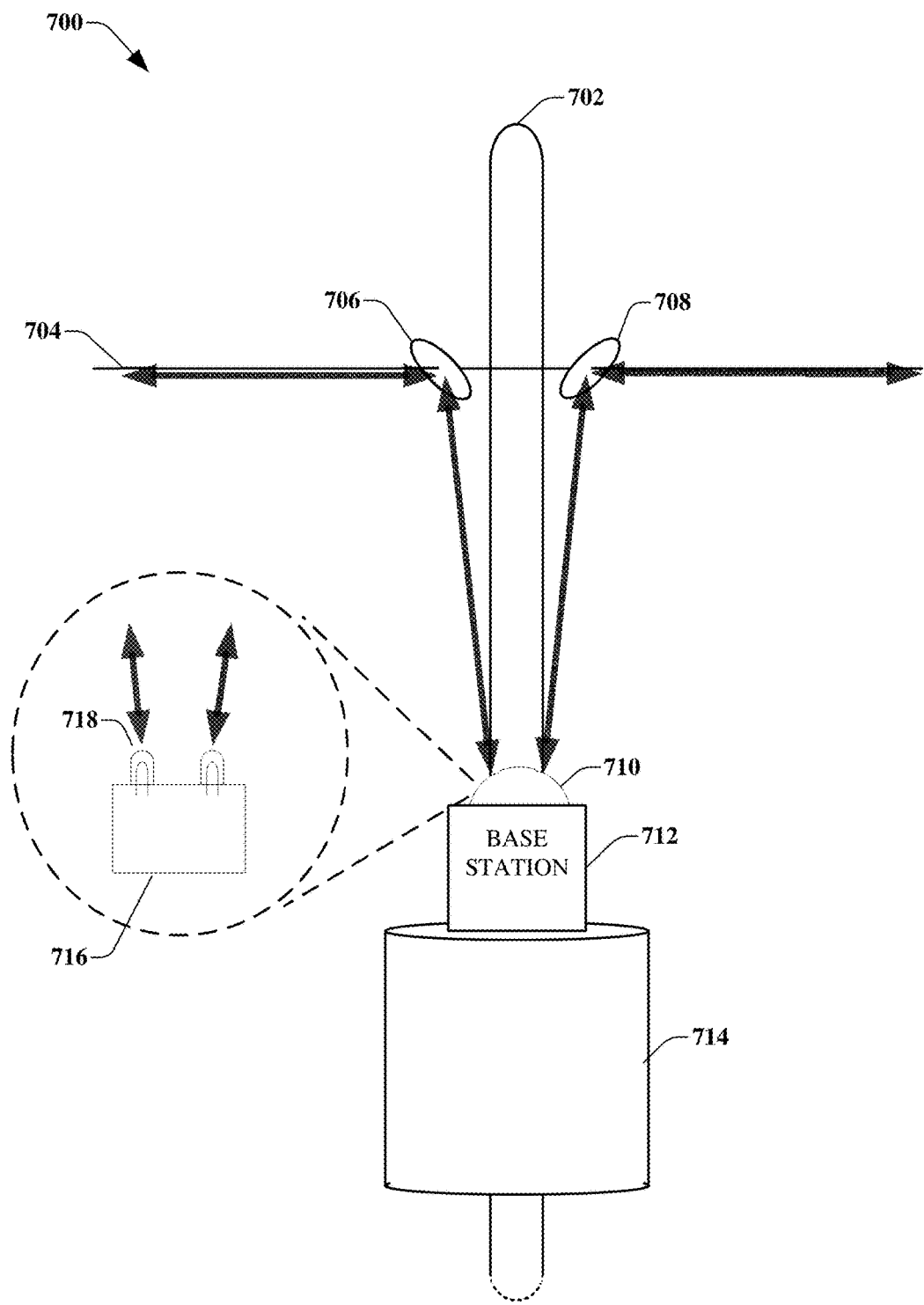
FIG. 7 is a block diagram illustrating an example, non-limiting embodiment of a quasi-optical coupling in accordance with various aspects described herein.

In other embodiments, the base station device 302 can be coupled to launcher 318 by a quasi-optical coupling (shown in more detail in FIG. 7). Launcher 318 includes a millimeter-wave interface 312 that shifts the frequency of the RF output to a millimeter-wave band signal. The signal can then be transmitted as a surface wave transmission by cone transceiver 314 over power line 316.

The cone transceiver 314 can generate an electromagnetic field specially configured to propagate as a guided wave travelling along the wire. The guided wave, or surface wave, will stay parallel to the wire, even as the wire bends and flexes. Bends can increase transmission losses, which are also dependent on wire diameters, frequency, and materials.

The millimeter-wave interface 312 and the cone transceiver 314 can be powered by inductive power supply 310 that receives power inductively from the medium voltage or high voltage power line. In other embodiments, the power can be supplemented by a battery supply.

Turning now to FIG. 4, a block diagram illustrating an example, non-limiting embodiment of a distributed antenna system in accordance with various aspects described herein is shown. System 400 includes a repeater 402 that has cone transceivers 404 and 412, millimeter-wave interfaces 406 and 410, as well an inductive power supply 408 and antenna 414.

Transceiver 404 can receive a millimeter-wave band surface wave transmission sent along a power line. The millimeter-wave interface 406 can convert the signal to an electronic signal in a cable or a fiber-optic signal and forward the signal to millimeter-wave interface 410 and cone transceiver 412 which launch the signal on to the power line as a surface wave transmission. Millimeter-wave interfaces 406 and 410 can also shift the frequency of the signal down and up respectively, between the millimeter-wave band and the cellular band. Antenna 414 can transmit the signal to mobile devices that are in range of the transmission.

Antenna 414 can receive return signals from the mobile devices, and pass them to millimeter-wave interfaces 406 and 410 which can shift the frequency upwards to another frequency band in the millimeter-wave frequency range. Cone transceivers 404 and 412 can then transmit the return signal as a surface wave transmission back to the base station device located near the launcher (e.g. base station device 302).

Figures 5, 6:
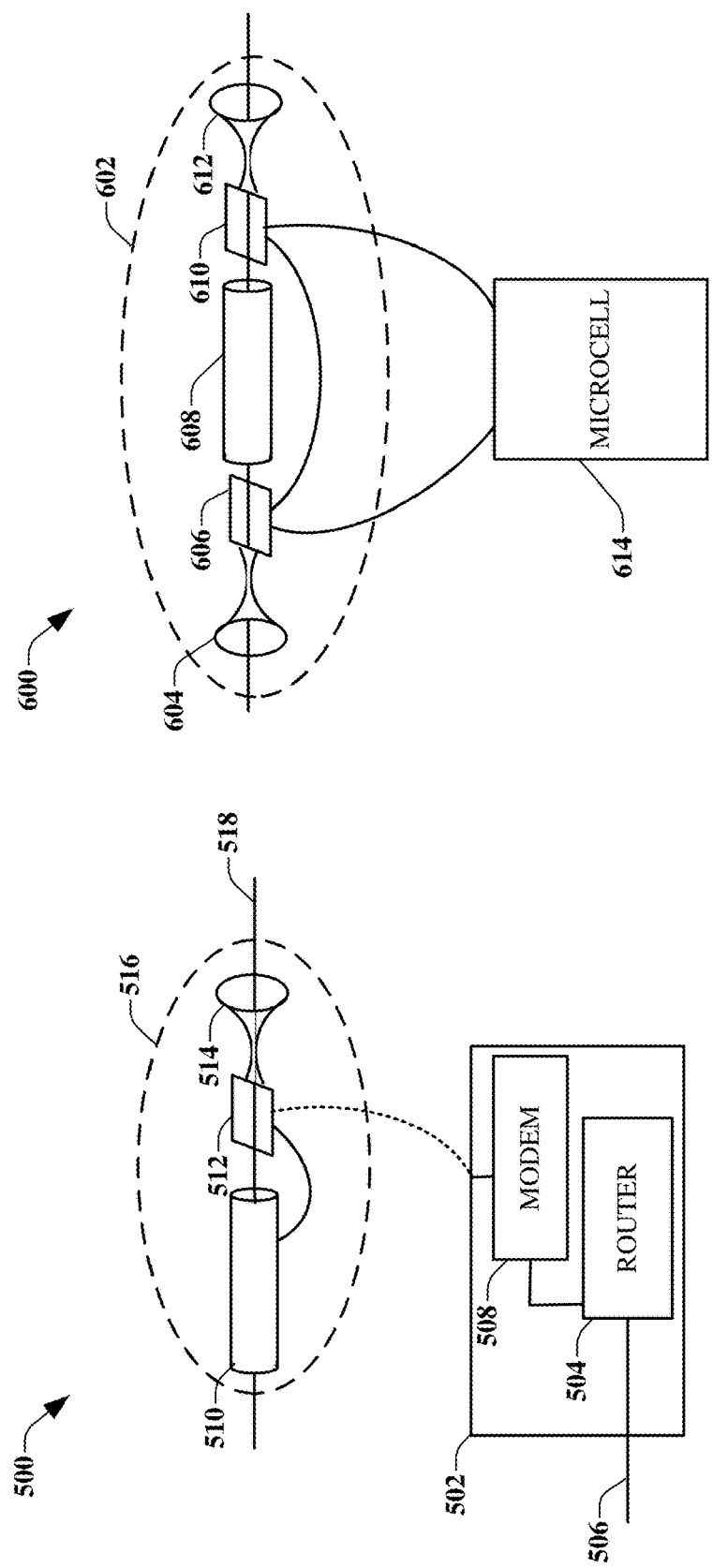
FIG. 5 is a block diagram illustrating an example, non-limiting embodiment of a backhaul system in accordance with various aspects described herein.
FIG. 6 is a block diagram illustrating an example, non-limiting embodiment of a backhaul system in accordance with various aspects described herein.

Referring now to FIG. 5, a block diagram illustrating an example, non-limiting embodiment of a backhaul system 500 in accordance with various aspects described herein is shown. Backhaul system 500 shows in greater detail the RF modem 202 and launcher 208 that are shown in FIG. 2. An RF modem 502 can include a router 504 and a modem 508. The RF modem 502 can receive an external network connection 506 that is linked to existing infrastructure. The network connection 506 can be physical (such as fiber or cable) or wireless (high-bandwidth microwave connection). The existing infrastructure that the network connection 506 can be linked to, can in some embodiments be macrocell sites. Since macrocell sites already have high data rate network connections, RF modem 502 can share the network connection with the macrocell site.

The router 504 and modem 508 can modulate a millimeter-wave band transmission using a protocol such as DOCSIS, and output the signal to a launcher 516. The RF modem 502 can send the signal to the launcher 516 via a fiber or cable link. In some embodiment, RF modem 502 can be coupled to launcher 516 by a quasi-optical coupling (shown in more detail in FIG. 7).

The launcher 516 can include a millimeter-wave interface 512 that shifts the frequency of the RF modem 502 output to a millimeter-wave band signal. The signal can then be transmitted as a surface wave transmission by cone transceiver 514. The cone transceiver 514 can generate an electromagnetic field specially configured to propagate as a guided wave travelling along the wire 518. The guided wave, or surface wave, will stay parallel to the wire, even as the wire bends and flexes. Bends can increase transmission losses, which are also dependent on wire diameters, frequency, and materials.

The millimeter wave interface 512 and the cone transceiver 514 can be powered by inductive power supply 510 that receives power inductively from the medium voltage or high voltage power line. In other embodiments, the power can be supplemented by a battery supply.

FIG. 6 shows a block diagram of an example, non-limiting embodiment of a backhaul system in accordance with various aspects described herein. System 600 includes a repeater 602 that has cone transceivers 604 and 612, millimeter-wave interfaces 606 and 610, as well an inductive power supply 608 and a microcell 614.

Transceiver 604 can receive a millimeter-wave band surface wave transmission sent along a power line. The millimeter-wave interface 606 can convert the signal to an electronic signal in a cable or a fiber-optic signal and forward the signal to millimeter-wave interface 610 and cone transceiver 612 which launch the signal on to the power line as a surface wave transmission. Millimeter-wave interfaces 606 and 610 can also shift the frequency of the signal up and down, between the millimeter-wave band and the cellular band. The millimeter-wave interfaces 606 and 610 can also include multiplexers and demultiplexers that allow for multiplexed signals in the time domain and/or frequency domain. The millimeter-wave interfaces 606 and 610 can also include a modem that can demodulate the signal using a protocol such as DOCSIS. The signal can then be sent to microcell 614 to facilitate communications with a mobile device.

The millimeter wave interfaces 606 and 610 can also include a wireless access point. The wireless access point (e.g., 802.11ac), can enable the microcell 614 to be located anywhere within range of the wireless access point, and does not need to be physically connected to the repeater 602.

FIG. 7 shows a block diagram of an example, non-limiting embodiment of a quasi-optical coupling 700 in accordance with various aspects described herein. Specially trained and certified technicians are required to work with high voltage and medium voltage power lines. Locating the circuitry away from the high voltage and medium voltage power lines allows ordinary craft technicians to install and maintain the circuitry. Accordingly, this example embodiment is a quasi-optical coupler allowing the base station and surface wave transmitters to be detached from the power lines.

At millimeter-wave frequencies, where the wavelength is small compared to the macroscopic size of the equipment, the millimeter-wave transmissions can be transported from one place to another and diverted via lenses and reflectors, much like visible light. Accordingly, reflectors 706 and 708 can be placed and oriented on power line 704 such that millimeter-wave band transmissions sent from transmitter 716 are reflected parallel to the power line, such that it is guided by the power line as a surface wave. Likewise, millimeter-wave band (60 Ghz and greater for this embodiment) surface waves, sent along the power line 704 can be reflected by reflectors 706 and 708 and sent as a collimated beam to the dielectric lens 710 and waveguide 718 on a monolithic transmitter integrated circuit 716 which sends the signal to the base station 712.

The base station 712 and transmitter apparatus 716 can receive power from a transformer 714 that may be part of the existing power company infrastructure.

Figure 8:
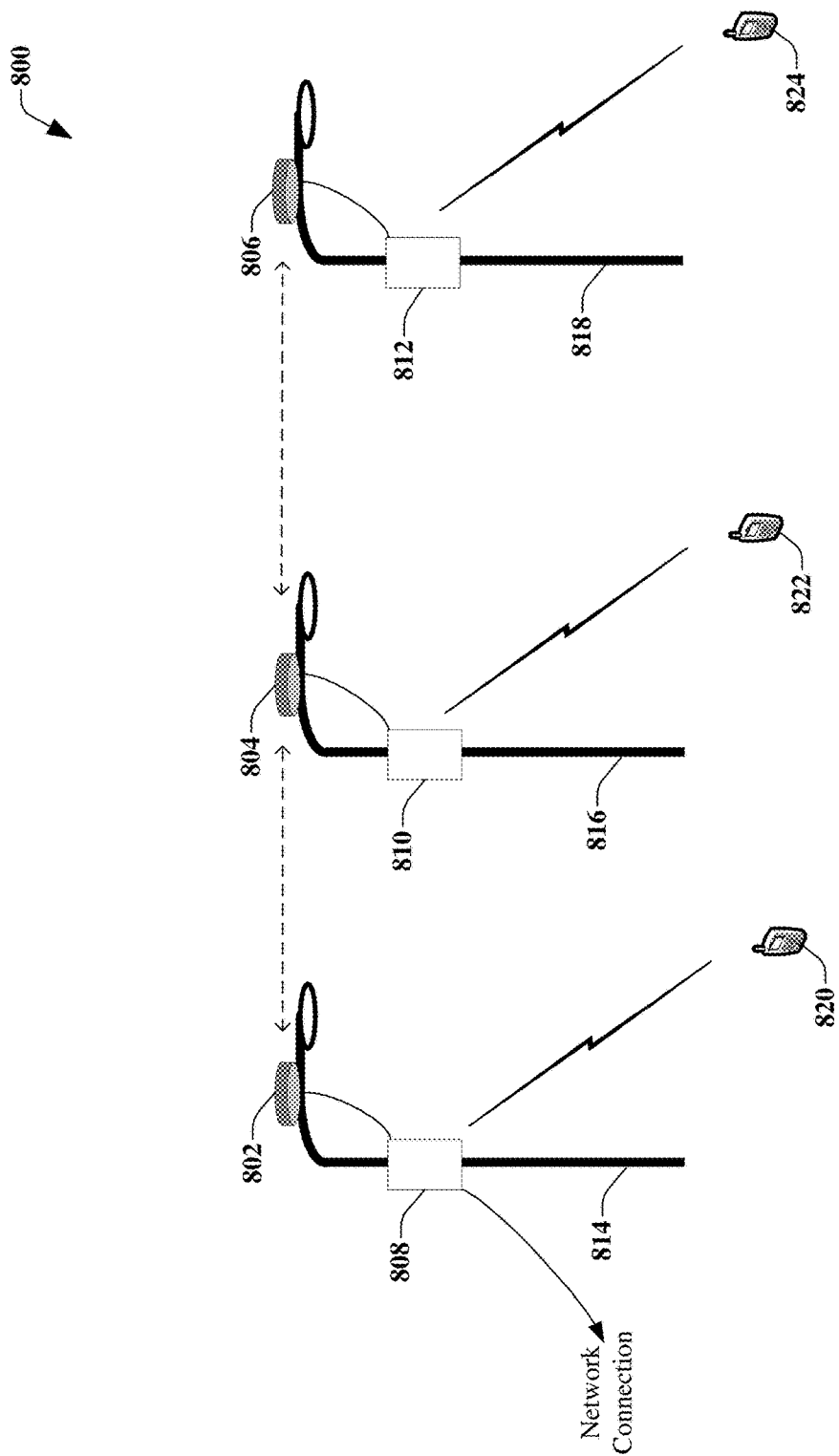
FIG. 8 is a block diagram illustrating an example, non-limiting embodiment of a backhaul system in accordance with various aspects described herein.

Turning now to FIG. 8, a block diagram illustrating an example, non-limiting embodiment of a backhaul system in accordance with various aspects described herein is shown. Backhaul system 800 includes a base station device 808 that receives a network connection via a physical or wireless connection to existing network infrastructure. The network connection can be via fiber and/or cable, or by a high bandwidth line-of-sight microwave connection to a nearby macrocell site. The base station device 808 can include a microcell (or other small cell deployment) that can facilitate communication with mobile device 820.

Radio repeater 802, communicably coupled to base station device 808, can transmit a millimeter band signal to radio repeater 804. Radio repeater 804 can forward the transmission to radio repeater 806 as well, and both radio repeaters 804 and 806 can share the signal with microcells 810 and 812. In this way, the network connection from the existing infrastructure can be distributed to a mesh network of microcells via line of sight millimeter band transmissions by radio repeaters.

In some embodiments, the radio repeaters can transmit broadcasts at frequencies above 100 GHz. A lower gain, broader beamwidth antenna than conventional millimeter-wave radio links provides high availability at short link lengths (~500 ft) while keeping the radio repeaters small and inexpensive.

In some embodiments, the radio repeaters and microcells can be mounted on existing infrastructure such as light poles 814, 816, and 818. In other embodiments, the radio repeaters and microcells can be mounted on utility poles for power lines, buildings, and other structures.

Figure 9:
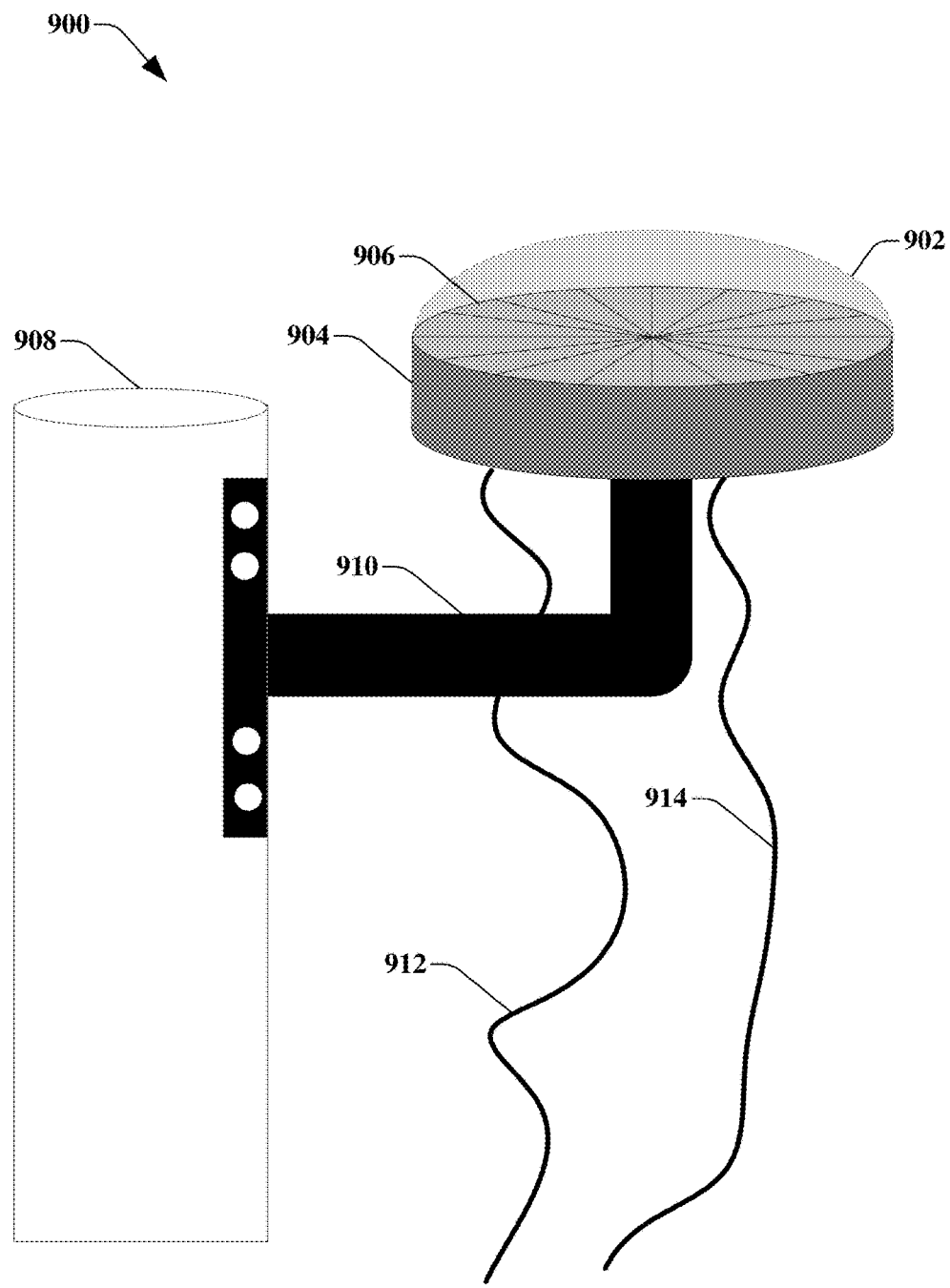
FIG. 9 is a block diagram illustrating an example, non-limiting embodiment of a millimeter band antenna apparatus in accordance with various aspects described herein.

Turning now to FIG. 9, a block diagram illustrating an example, non-limiting embodiment of a millimeter-wave band antenna apparatus 900 in accordance with various aspects described herein is shown. The radio repeater 904 can have a plastic cover 902 to protect the radio antennas 906. The radio repeater 904 can be mounted to a utility pole, light pole, or other structure 908 with a mounting arm 910. The radio repeater can also receive power via power cord 912 and output the signal to a nearby microcell using fiber or cable 914.

In some embodiments, the radio repeater 904 can include 16 antennas. These antennas can be arranged radially, and each can have approximately 24 degrees of azimuthal beamwidth. There can thus be a small overlap between each antennas beamwidths. The radio repeater 904, when transmitting, or receiving transmissions, can automatically select the best sector antenna to use for the connections based on signal measurements such as signal strength, signal to noise ratio, etc. Since the radio repeater 904 can automatically select the antennas to use, in one embodiment, precise antenna alignment is not implemented, nor are stringent requirements on mounting structure twist, tilt, and sway.

In some embodiments, the radio repeater 904 can include a microcell within the apparatus, thus enabling a self-contained unit to be a repeater on the backhaul network, in addition to facilitating communications with mobile devices. In other embodiments, the radio repeater can include a wireless access point (e.g. 802.11ac).

Figure 10:
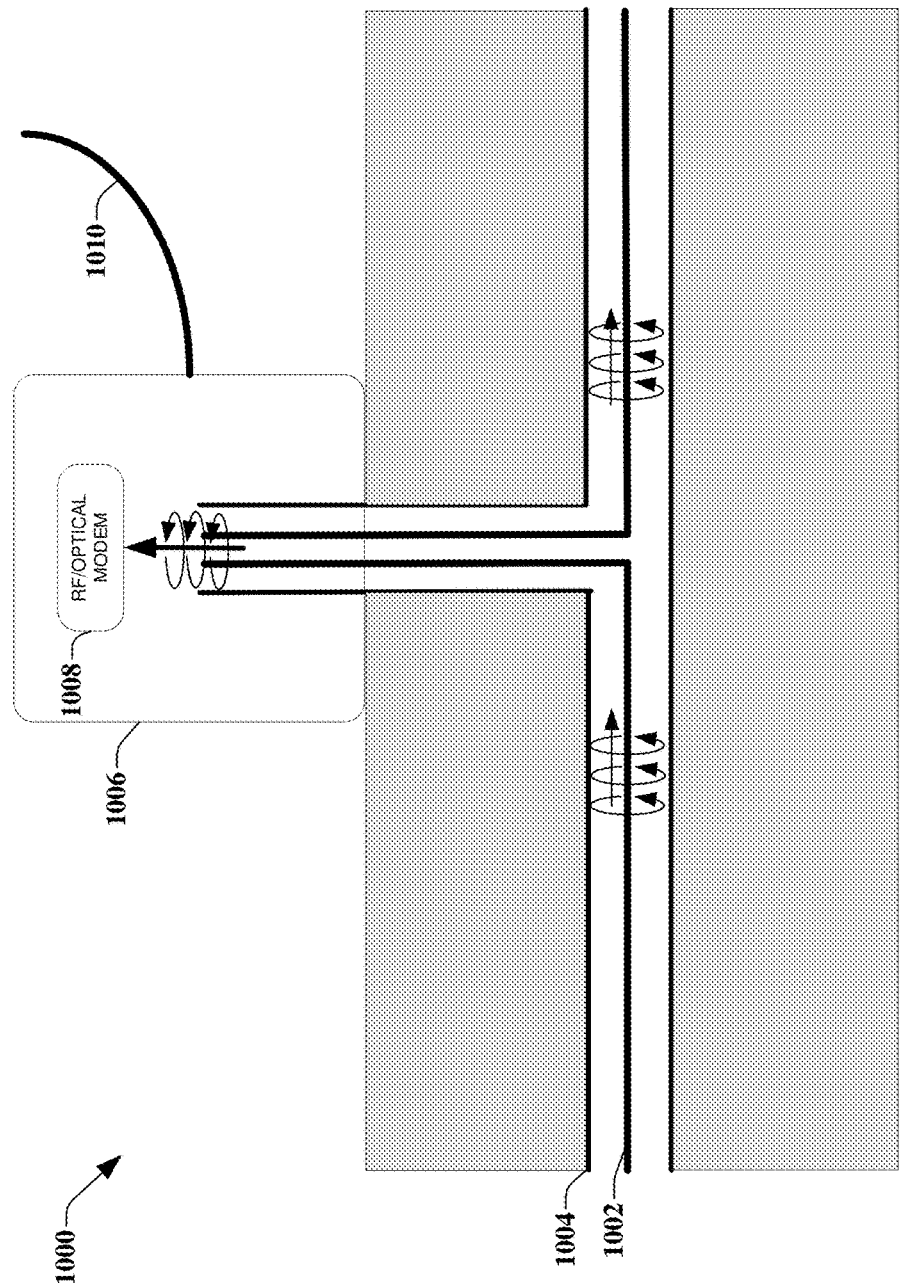
FIG. 10 is a block diagram illustrating an example, non-limiting embodiment of an underground backhaul system in accordance with various aspects described herein.

Turning now to FIG. 10, a block diagram illustrating an example, non-limiting embodiment of an underground backhaul system in accordance with various aspects described herein is shown. Pipes, whether they are metallic or dielectric, can support the transmission of guided electromagnetic waves. Thus the distributed antenna backhaul systems shown in FIGS. 1 and 2, respectively, can be replicated using underground conduits 1004 in place of above ground power lines. The underground conduits can carry power lines or other cables 1002, and at transformer box 1006 an RF/optical modem can convert (modulate or demodulate) the backhaul signal to or from the millimeter-wave (40 GHz or greater in an embodiment). A fiber or cable 1010 can carry the converted backhaul signal to a microcell located nearby.

A single conduit can serve several backhaul connections along its route by carrying millimeter-wave signals multiplexed in a time domain or frequency domain fashion.

Figure 11:
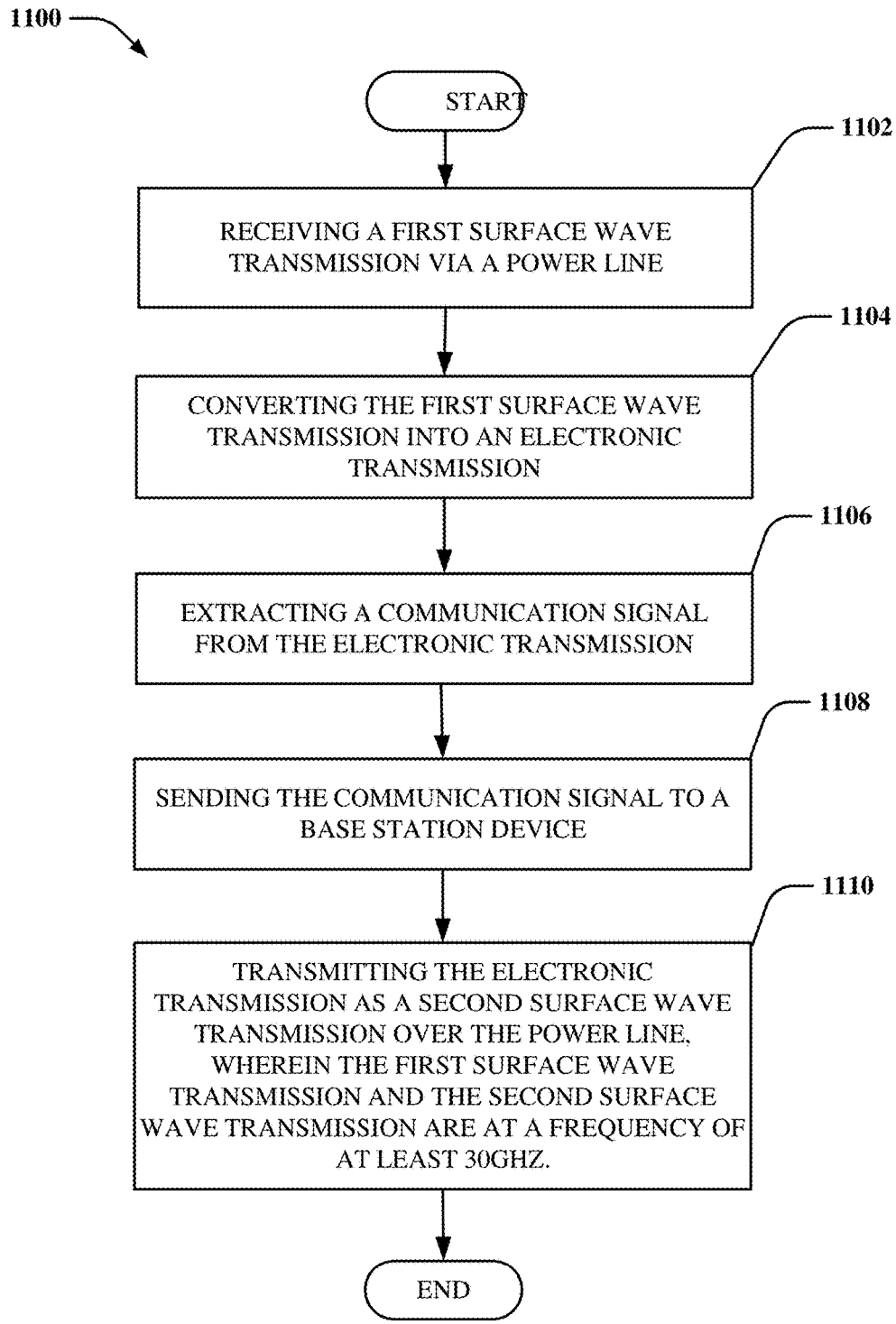
FIG. 11 illustrates a flow diagram of an example, non-limiting embodiment of a method for providing a backhaul connection as described herein.

FIG. 11 illustrates a process in connection with the aforementioned systems. The process in FIG. 11 can be implemented for example by systems 100, 200, 300, 400, 500, 600, 700, and 1000 illustrated in FIGS. 1-7 and 10 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 11 illustrates a flow diagram of an example, non-limiting embodiment of a method for providing a backhaul connection as described herein. At step 1102, a first surface wave transmission is received over a power line. The surface wave transmission can be received by cone transceivers in some embodiments. In other embodiments, reflectors, positioned on the power line can reflect the surface wave to a dielectric lens and waveguide that convert the surface wave into an electronic transmission. At step 1104, the first surface wave transmission is converted into an electronic transmission. The cone transceiver can receive the electromagnetic wave and convert it into an electronic transmission that propagates through a circuit.

At step 1106, a communication signal is extracted from the electronic transmission. The communication signal can be extracted using an RF modem that uses a protocol such as DOCSIS. The RF modem can modulate and demodulate the electronic signal to extract the communication signal. The communication signal can be a signal received from the mobile network, and can be provided to give network connectivity to a distributed base station.

At 1108, the communication signal can be sent to a base station device nearby. The communication can be sent over fiber or cable, or can be sent wirelessly using Wi-Fi (e.g., 802.11ac).

At 1110, the electronic transmission is transmitted as a second surface wave transmission over the power line. A second cone transceiver or reflector can launch the surface wave on to the power line to a next node in the backhaul system. The first surface wave transmission and the second surface wave transmission are at a frequency of at least 30 GHz.

Figure 12:
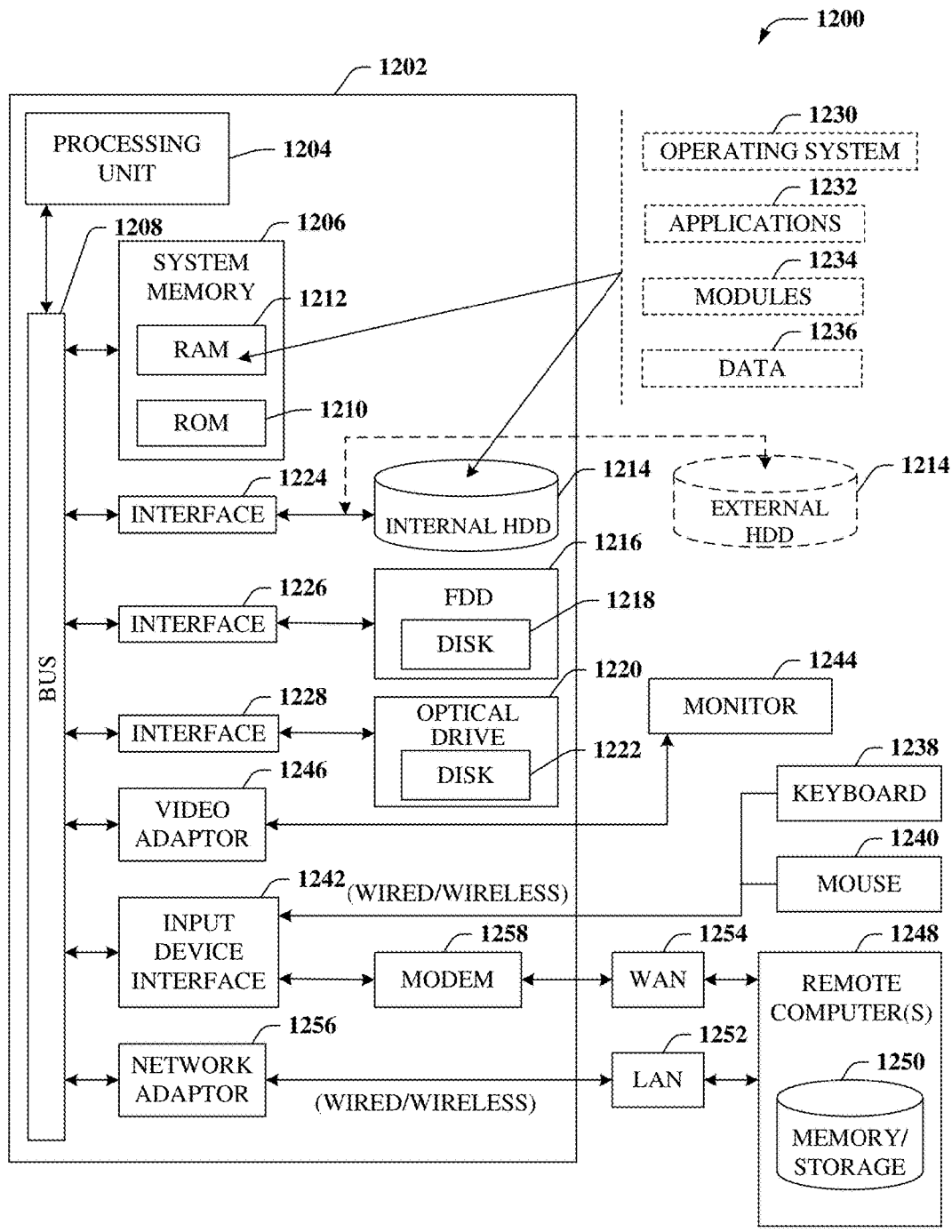
FIG. 12 is a block diagram of an example, non-limiting embodiment of a computing environment in accordance with various aspects described herein.

Referring now to FIG. 12, there is illustrated a block diagram of a computing environment in accordance with various aspects described herein. For example, in some embodiments, the computer can be or be included within the mobile device data rate throttling system 200, 400, 500 and/or 600.

In order to provide additional context for various embodiments of the embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a universal serial bus (USB) port, an IR interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless AP disposed thereon for communicating with the wireless adapter 1256.

When used in a WAN networking environment, the computer 1202 can include a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 BaseT wired Ethernet networks used in many offices.

Figure 13:
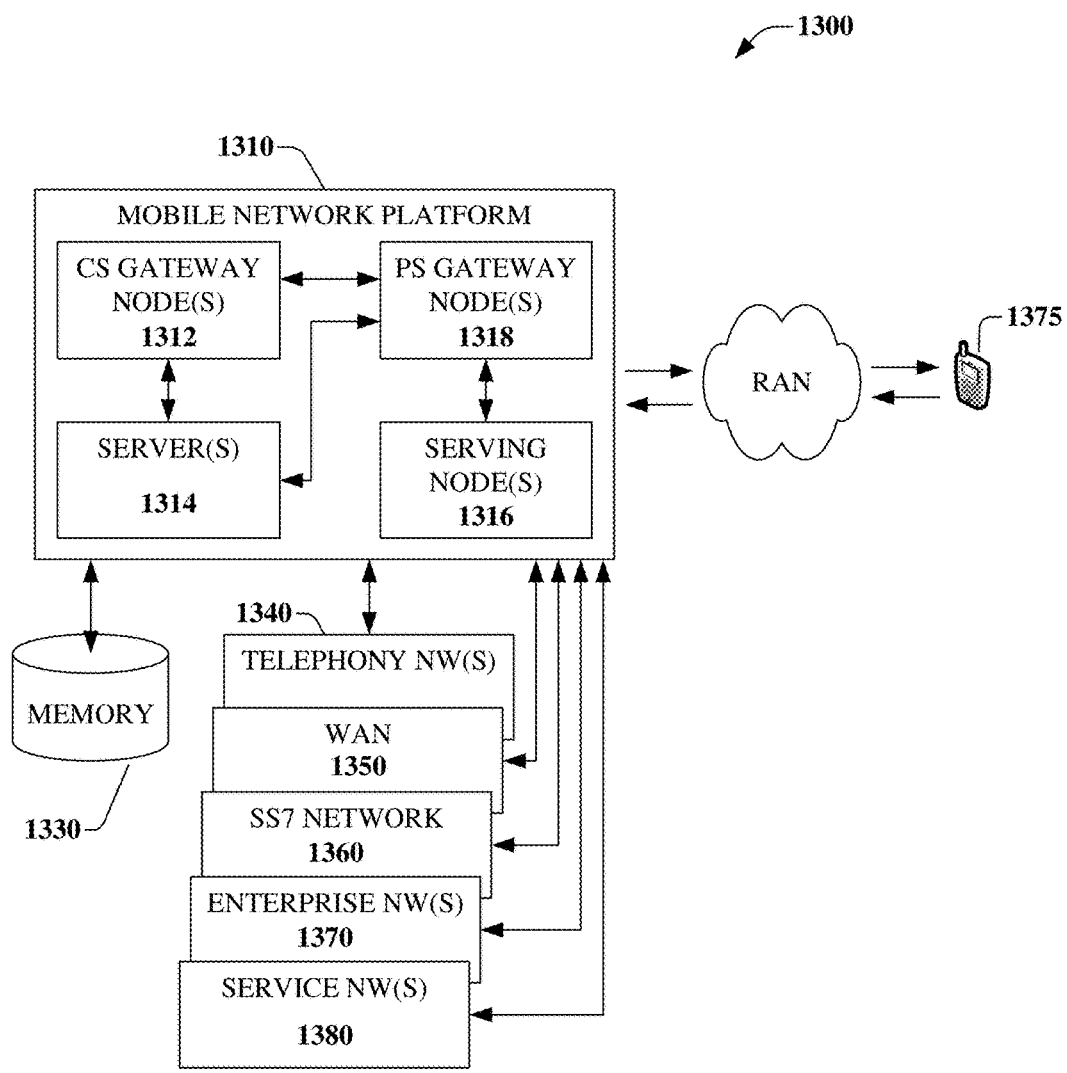
FIG. 13 is a block diagram of an example, non-limiting embodiment of a mobile network platform in accordance with various aspects described herein.

FIG. 13 presents an example embodiment 1300 of a mobile network platform 1310 that can implement and exploit one or more aspects of the disclosed subject matter described herein. Generally, wireless network platform 1310 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1310 can be included in telecommunications carrier networks, and can be considered carrier-side components as discussed elsewhere herein. Mobile network platform 1310 includes CS gateway node(s) 1312 which can interface CS traffic received from legacy networks like telephony network(s) 1340 (e.g., public switched telephone network (PSTN), or public land mobile network (PLMN)) or a signaling system #7 (SS7) network 1370. Circuit switched gateway node(s) 1312 can authorize and authenticate traffic (e.g., voice) arising from such networks. Additionally, CS gateway node(s) 1312 can access mobility, or roaming, data generated through SS7 network 1370; for instance, mobility data stored in a visited location register (VLR), which can reside in memory 1330. Moreover, CS gateway node(s) 1312 interfaces CS-based traffic and signaling and PS gateway node(s) 1318. As an example, in a 3GPP UMTS network, CS gateway node(s) 1312 can be realized at least in part in gateway GPRS support node(s) (GGSN). It should be appreciated that functionality and specific operation of CS gateway node(s) 1312, PS gateway node(s) 1318, and serving node(s) 1316, is provided and dictated by radio technology(ies) utilized by mobile network platform 1310 for telecommunication.

In addition to receiving and processing CS-switched traffic and signaling, PS gateway node(s) 1318 can authorize and authenticate PS-based data sessions with served mobile devices. Data sessions can include traffic, or content(s), exchanged with networks external to the wireless network platform 1310, like wide area network(s) (WANs) 1350, enterprise network(s) 1370, and service network(s) 1380, which can be embodied in local area network(s) (LANs), can also be interfaced with mobile network platform 1310 through PS gateway node(s) 1318. It is to be noted that WANs 1350 and enterprise network(s) 1360 can embody, at least in part, a service network(s) like IP multimedia subsystem (IMS). Based on radio technology layer(s) available in technology resource(s) 1317, packet-switched gateway node(s) 1318 can generate packet data protocol contexts when a data session is established; other data structures that facilitate routing of packetized data also can be generated. To that end, in an aspect, PS gateway node(s) 1318 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1300, wireless network platform 1310 also includes serving node(s) 1316 that, based upon available radio technology layer(s) within technology resource(s) 1317, convey the various packetized flows of data streams received through PS gateway node(s) 1318. It is to be noted that for technology resource(s) 1317 that rely primarily on CS communication, server node(s) can deliver traffic without reliance on PS gateway node(s) 1318; for example, server node(s) can embody at least in part a mobile switching center. As an example, in a 3GPP UMTS network, serving node(s) 1316 can be embodied in serving GPRS support node(s) (SGSN).

For radio technologies that exploit packetized communication, server(s) 1314 in wireless network platform 1310 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1310. Data streams (e.g., content(s) that are part of a voice call or data session) can be conveyed to PS gateway node(s) 1318 for authorization/authentication and initiation of a data session, and to serving node(s) 1316 for communication thereafter. In addition to application server, server(s) 1314 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1310 to ensure network's operation and data integrity in addition to authorization and authentication procedures that CS gateway node(s) 1312 and PS gateway node(s) 1318 can enact. Moreover, provisioning server(s) can provision services from external network(s) like networks operated by a disparate service provider; for instance, WAN 1350 or Global Positioning System (GPS) network(s) (not shown). Provisioning server(s) can also provision coverage through networks associated to wireless network platform 1310 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1375.

It is to be noted that server(s) 1314 can include one or more processors configured to confer at least in part the functionality of macro network platform 1310. To that end, the one or more processor can execute code instructions stored in memory 1330, for example. It is should be appreciated that server(s) 1314 can include a content manager 1315, which operates in substantially the same manner as described hereinbefore.

In example embodiment 1300, memory 1330 can store information related to operation of wireless network platform 1310. Other operational information can include provisioning information of mobile devices served through wireless platform network 1310, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1330 can also store information from at least one of telephony network(s) 1340, WAN 1350, enterprise network(s) 1360, or SS7 network 1370. In an aspect, memory 1330 can be, for example, accessed as part of a data store component or as a remotely connected memory store.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

Figure 14A:
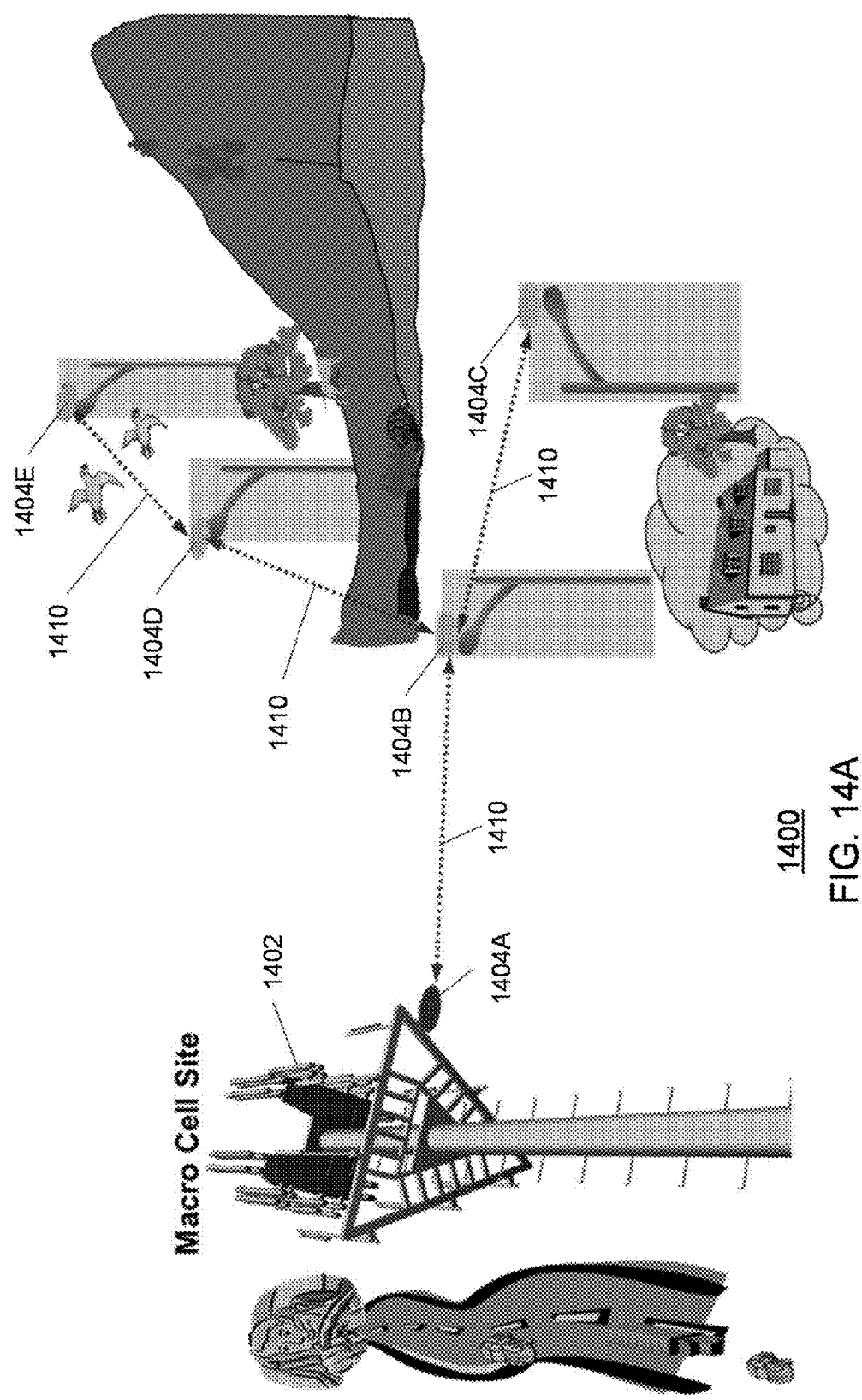
FIG. 14A is a block diagram illustrating an example, non-limiting embodiment of a communication system in accordance with various aspects described herein.

Turning now to FIG. 14A, a block diagram illustrating an example, non-limiting embodiment of a communication system 1400 in accordance with various aspects of the subject disclosure is shown. The communication system 1400 can include a macro base station 1402 such as a base station or access point having antennas that covers one or more sectors (e.g., 6 or more sectors). The macro base station 1402 can be communicatively coupled to a communication node 1404A that serves as a master or distribution node for other communication nodes 1404B-E distributed at differing geographic locations inside or beyond a coverage area of the macro base station 1402. The communication nodes 1404 operate as a distributed antenna system configured to handle communications traffic associated with client devices such as mobile devices (e.g., cell phones) and/or fixed/stationary devices (e.g., a communication device in a residence, or commercial establishment) that are wirelessly coupled to any of the communication nodes 1404. In particular, the wireless resources of the macro base station 1402 can be made available to mobile devices by allowing and/or redirecting certain mobile and/or stationary devices to utilize the wireless resources of a communication node 1404 in a communication range of the mobile or stationary devices.

The communication nodes 1404A-E can be communicatively coupled to each other over an interface 1410. In one embodiment, the interface 1410 can comprise a wired or tethered interface (e.g., fiber optic cable). In other embodiments, the interface 1410 can comprise a wireless RF interface forming a radio distributed antenna system. In various embodiments, the communication nodes 1804A-E can be configured to provide communication services to mobile and stationary devices according to instructions provided by the macro base station 1402. In other examples of operation however, the communication nodes 1404A-E operate merely as analog repeaters to spread the coverage of the macro base station 1402 throughout the entire range of the individual communication nodes 1404A-E.

The micro base stations (depicted as communication nodes 1404) can differ from the macro base station in several ways. For example, the communication range of the micro base stations can be smaller than the communication range of the macro base station. Consequently, the power consumed by the micro base stations can be less than the power consumed by the macro base station. The macro base station optionally directs the micro base stations as to which mobile and/or stationary devices they are to communicate with, and which carrier frequency, spectral segment(s) and/or timeslot schedule of such spectral segment(s) are to be used by the micro base stations when communicating with certain mobile or stationary devices. In these cases, control of the micro base stations by the macro base station can be performed in a master-slave configuration or other suitable control configurations. Whether operating independently or under the control of the macro base station 1402, the resources of the micro base stations can be simpler and less costly than the resources utilized by the macro base station 1402.

Figure 14B:
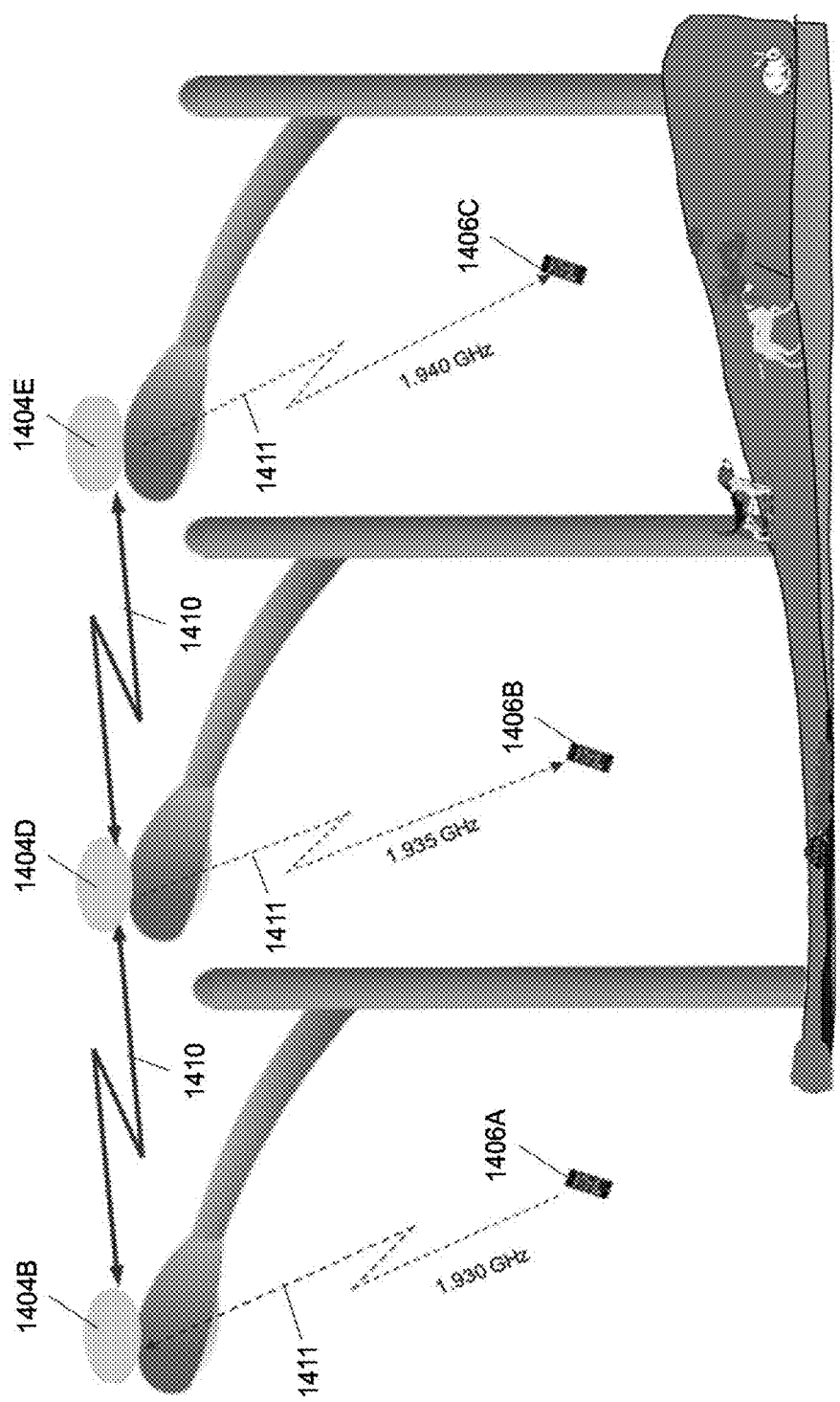
FIG. 14B is a block diagram illustrating an example, non-limiting embodiment of a portion of the communication system of FIG. 14A in accordance with various aspects described herein.

Turning now to FIG. 14B, a block diagram illustrating an example, non-limiting embodiment of the communication nodes 1404B-E of the communication system 1400 of FIG. 14A is shown. In this illustration, the communication nodes 1404B-E are placed on a utility fixture such as a light post. In other embodiments, some of the communication nodes 1404B-E can be placed on a building or a utility post or pole that is used for distributing power and/or communication lines. The communication nodes 1404B-E in these illustrations can be configured to communicate with each other over the interface 1410, which in this illustration is shown as a wireless interface. The communication nodes 1404B-E can also be configured to communicate with mobile or stationary devices 1406A-C over a wireless interface 1411 that conforms to one or more communication protocols (e.g., fourth generation (4G) wireless signals such as LTE signals or other 4G signals, fifth generation (5G) wireless signals, WiMAX, 802.11 signals, ultra-wideband signals, etc.). The communication nodes 1404 can be configured to exchange signals over the interface 1410 at an operating frequency that may be higher (e.g., 28 GHz, 38 GHz, 60 GHz, 80 GHz or higher) than the operating frequency used for communicating with the mobile or stationary devices (e.g., 1.9 GHz) over interface 1411. The high carrier frequency and a wider bandwidth can be used for communicating between the communication nodes 1404 enabling the communication nodes 1404 to provide communication services to multiple mobile or stationary devices via one or more differing frequency bands, (e.g. a 900 MHz band, 1.9 GHz band, a 2.4 GHz band, and/or a 5.8 GHz band, etc.) and/or one or more differing protocols, as will be illustrated by spectral downlink and uplink diagrams of FIG. 15A described below. In other embodiments, particularly where the interface 1410 is implemented via a guided wave communications system on a wire, a wideband spectrum in a lower frequency range (e.g. in the range of 2-6 GHz, 4-10 GHz, etc.) can be employed.

Figure 14C:
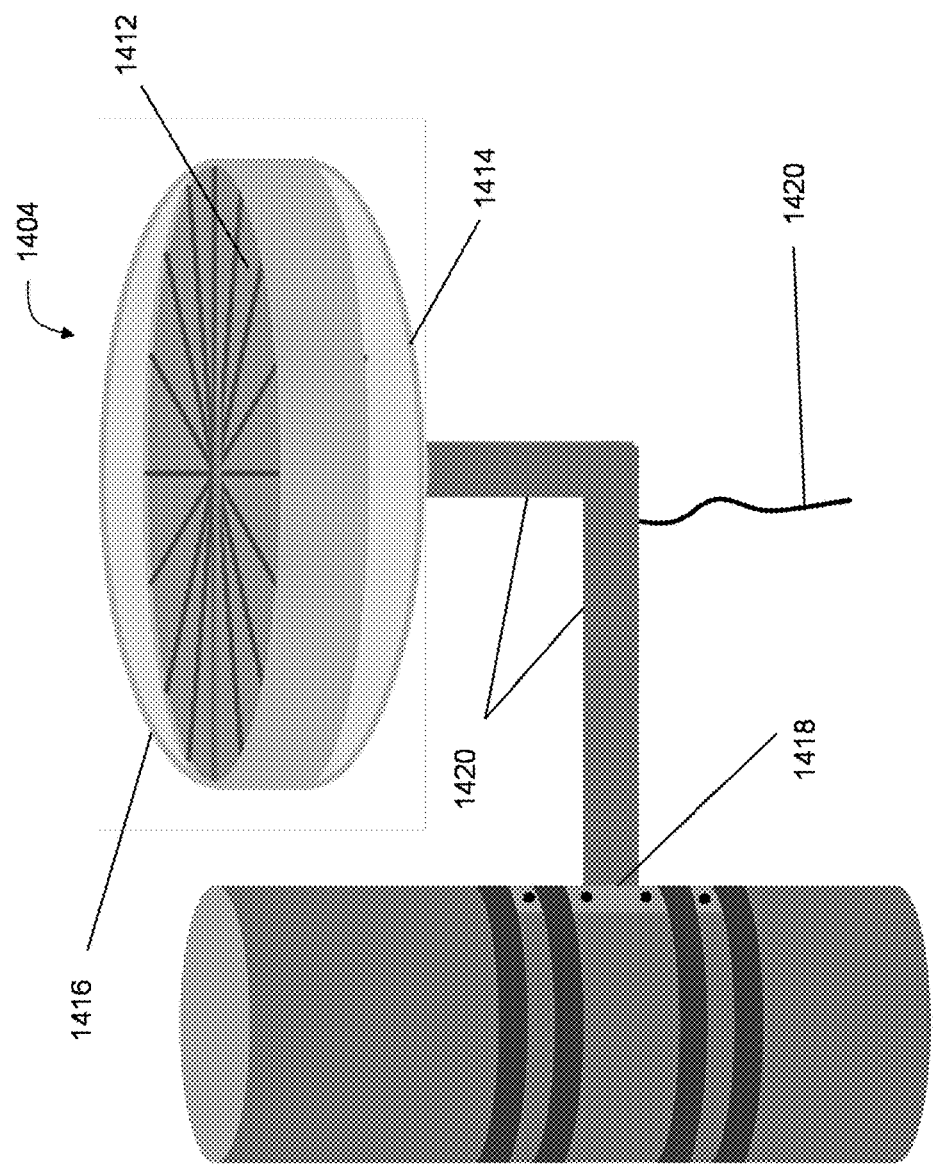
FIGS. 14C-14D are block diagrams illustrating example, non-limiting embodiments of a communication node of the communication system of FIG. 14A in accordance with various aspects described herein.
Figure 14D:
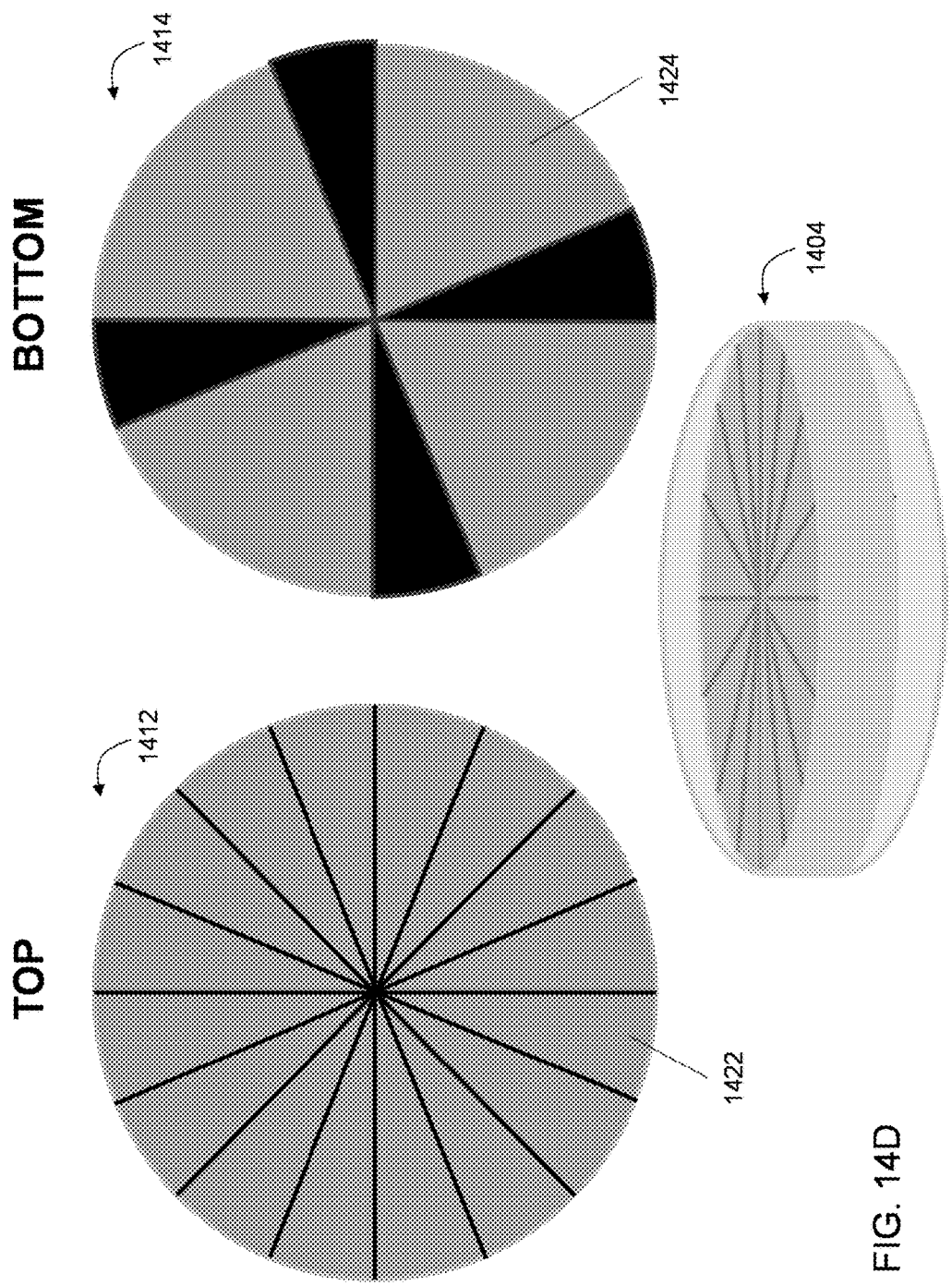

Turning now to FIGS. 14C-14D, block diagrams illustrating example, non-limiting embodiments of a communication node 1404 of the communication system 1400 of FIG. 14A is shown. The communication node 1404 can be attached to a support structure 1418 of a utility fixture such as a utility post or pole as shown in FIG. 14C. The communication node 1404 can be affixed to the support structure 1418 with an arm 1420 constructed of plastic or other suitable material that attaches to an end of the communication node 1404. The communication node 1404 can further include a plastic housing assembly 1416 that covers components of the communication node 1404. The communication node 1404 can be powered by a power line 1421 (e.g., 110/220 VAC). The power line 1421 can originate from a light pole or can be coupled to a power line of a utility pole.

In an embodiment where the communication nodes 1404 communicate wirelessly with other communication nodes 1404 as shown in FIG. 14B, a top side 1412 of the communication node 1404 (illustrated also in FIG. 14D) can comprise a plurality of antennas 1422 (e.g., 16 dielectric antennas devoid of metal surfaces) coupled to one or more transceivers such as, for example, in whole or in part, the transceiver 1400 illustrated in FIG. 14. Each of the plurality of antennas 1422 of the top side 1412 can operate as a sector of the communication node 1404, each sector configured for communicating with at least one communication node 1404 in a communication range of the sector. Alternatively, or in combination, the interface 1410 between communication nodes 1404 can be a tethered interface (e.g., a fiber optic cable, or a power line used for transport of guided electromagnetic waves as previously described). In other embodiments, the interface 1410 can differ between communication nodes 1404. That is, some communications nodes 1404 may communicate over a wireless interface, while others communicate over a tethered interface. In yet other embodiments, some communications nodes 1404 may utilize a combined wireless and tethered interface.

A bottom side 1414 of the communication node 1404 can also comprise a plurality of antennas 1424 for wirelessly communicating with one or more mobile or stationary devices 1406 at a carrier frequency that is suitable for the mobile or stationary devices 1406. As noted earlier, the carrier frequency used by the communication node 1404 for communicating with the mobile or station devices over the wireless interface 1411 shown in FIG. 14B can be different from the carrier frequency used for communicating between the communication nodes 1404 over interface 1410. The plurality of antennas 1424 of the bottom portion 1414 of the communication node 1404 can also utilize a transceiver such as, for example, in whole or in part, the transceiver 1400 illustrated in FIG. 14.

Turning now to FIG. 15A, a block diagram illustrating an example, non-limiting embodiment of downlink and uplink communication techniques for enabling a base station to communicate with the communication nodes 1404 of FIG. 14A is shown. In the illustrations of FIG. 15A, downlink signals (i.e., signals directed from the macro base station 1402 to the communication nodes 1404) can be spectrally divided into control channels 1502, downlink spectral segments 1506 each including modulated signals which can be frequency converted to their original/native frequency band for enabling the communication nodes 1404 to communicate with one or more mobile or stationary devices 1506, and pilot signals 1504 which can be supplied with some or all of the spectral segments 1506 for mitigating distortion created between the communication nodes 1504. The pilot signals 1504 can be processed by the top side 1416 (tethered or wireless) transceivers of downstream communication nodes 1404 to remove distortion from a receive signal (e.g., phase distortion). Each downlink spectral segment 1506 can be allotted a bandwidth 1505 sufficiently wide (e.g., 50 MHz) to include a corresponding pilot signal 1504 and one or more downlink modulated signals located in frequency channels (or frequency slots) in the spectral segment 1506. The modulated signals can represent cellular channels, WLAN channels or other modulated communication signals (e.g., 10-20 MHz), which can be used by the communication nodes 1404 for communicating with one or more mobile or stationary devices 1406.

Uplink modulated signals generated by mobile or stationary communication device in their native/original frequency bands can be frequency converted and thereby located in frequency channels (or frequency slots) in the uplink spectral segment 1510. The uplink modulated signals can represent cellular channels, WLAN channels or other modulated communication signals. Each uplink spectral segment 1510 can be allotted a similar or same bandwidth 1505 to include a pilot signal 1508 which can be provided with some or each spectral segment 1510 to enable upstream communication nodes 1404 and/or the macro base station 1402 to remove distortion (e.g., phase error).

In the embodiment shown, the downlink and uplink spectral segments 1506 and 1510 each comprise a plurality of frequency channels (or frequency slots), which can be occupied with modulated signals that have been frequency converted from any number of native/original frequency bands (e.g. a 900 MHz band, 1.9 GHz band, a 2.4 GHz band, and/or a 5.8 GHz band, etc.). The modulated signals can be up-converted to adjacent frequency channels in downlink and uplink spectral segments 1506 and 1510. In this fashion, while some adjacent frequency channels in a downlink spectral segment 1506 can include modulated signals originally in a same native/original frequency band, other adjacent frequency channels in the downlink spectral segment 1506 can also include modulated signals originally in different native/original frequency bands, but frequency converted to be located in adjacent frequency channels of the downlink spectral segment 1506. For example, a first modulated signal in a 1.9 GHz band and a second modulated signal in the same frequency band (i.e., 1.9 GHz) can be frequency converted and thereby positioned in adjacent frequency channels of a downlink spectral segment 1506. In another illustration, a first modulated signal in a 1.9 GHz band and a second communication signal in a different frequency band (i.e., 2.4 GHz) can be frequency converted and thereby positioned in adjacent frequency channels of a downlink spectral segment 1506. Accordingly, frequency channels of a downlink spectral segment 1506 can be occupied with any combination of modulated signals of a same or differing signaling protocols and of the same or differing native/original frequency bands.

Similarly, while some adjacent frequency channels in an uplink spectral segment 1510 can include modulated signals originally in a same frequency band, adjacent frequency channels in the uplink spectral segment 1510 can also include modulated signals originally in different native/ original frequency bands, but frequency converted to be located in adjacent frequency channels of an uplink segment 1510. For example, a first communication signal in a 2.4 GHz band and a second communication signal in the same frequency band (i.e., 2.4 GHz) can be frequency converted and thereby positioned in adjacent frequency channels of an uplink spectral segment 1510. In another illustration, a first communication signal in a 1.9 GHz band and a second communication signal in a different frequency band (i.e., 2.4 GHz) can be frequency converted and thereby positioned in adjacent frequency channels of the uplink spectral segment 1506. Accordingly, frequency channels of an uplink spectral segment 1510 can be occupied with any combination of modulated signals of a same or differing signaling protocols and of a same or differing native/original frequency bands. It should be noted that a downlink spectral segment 1506 and an uplink spectral segment 1510 can themselves be adjacent to one another and separated by only a guard band or otherwise separated by a larger frequency spacing, depending on the spectral allocation in place.

Figure 15B:
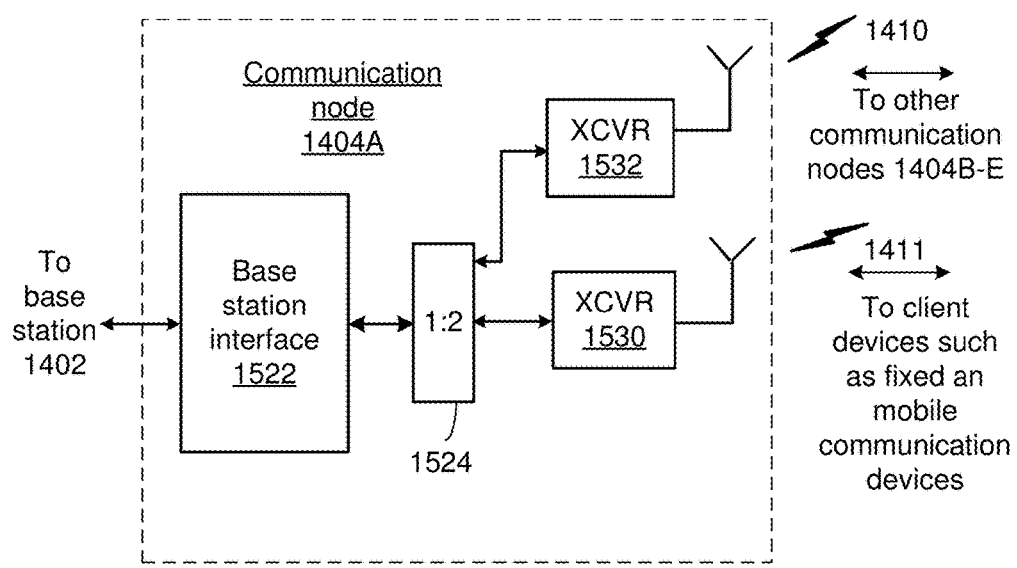
FIG. 15B is a block diagram illustrating an example, non-limiting embodiment of a communication node in accordance with various aspects described herein.

Turning now to FIG. 15B, a block diagram 1520 illustrating an example, non-limiting embodiment of a communication node is shown. In particular, the communication node device such as communication node 1404A of a radio distributed antenna system includes a base station interface 1522, duplexer/diplexer assembly 1524, and two transceivers 1530 and 1532. It should be noted however, that when the communication node 1404A is collocated with a base station, such as a macro base station 1402, the duplexer/ diplexer assembly 1524 and the transceiver 1530 can be omitted and the transceiver 1532 can be directly coupled to the base station interface 1522.

In various embodiments, the base station interface 1522 receives a first modulated signal having one or more down link channels in a first spectral segment for transmission to a client device such as one or more mobile communication devices. The first spectral segment represents an original/ native frequency band of the first modulated signal. The first modulated signal can include one or more downlink communication channels conforming to a signaling protocol such as a LTE or other 4G wireless protocol, a 5G wireless communication protocol, an ultra-wideband protocol, a WiMAX protocol, a 802.11 or other wireless local area network protocol and/or other communication protocol. The duplexer/diplexer assembly 1524 transfers the first modulated signal in the first spectral segment to the transceiver 1530 for direct communication with one or more mobile communication devices in range of the communication node 1404A as a free space wireless signal. In various embodiments, the transceiver 1530 is implemented via analog circuitry that merely provides: filtration to pass the spectrum of the downlink channels and the uplink channels of modulated signals in their original/native frequency bands while attenuating out-of-band signals, power amplification, transmit/receive switching, duplexing, diplexing, and impedance matching to drive one or more antennas that sends and receives the wireless signals of interface 1410.

In other embodiments, the transceiver 1532 is configured to perform frequency conversion of the first modulated signal in the first spectral segment to the first modulated signal at a first carrier frequency based on, in various embodiments, an analog signal processing of the first modulated signal without modifying the signaling protocol of the first modulated signal. The first modulated signal at the first carrier frequency can occupy one or more frequency channels of a downlink spectral segment 1506. The first carrier frequency can be in a millimeter-wave or microwave frequency band. As used herein analog signal processing includes filtering, switching, duplexing, diplexing, amplification, frequency up and down conversion, and other analog processing that does not require digital signal processing, such as including without limitation either analog to digital conversion, digital to analog conversion, or digital frequency conversion. In other embodiments, the transceiver 1532 can be configured to perform frequency conversion of the first modulated signal in the first spectral segment to the first carrier frequency by applying digital signal processing to the first modulated signal without utilizing any form of analog signal processing and without modifying the signaling protocol of the first modulated signal. In yet other embodiments, the transceiver 1532 can be configured to perform frequency conversion of the first modulated signal in the first spectral segment to the first carrier frequency by applying a combination of digital signal processing and analog processing to the first modulated signal and without modifying the signaling protocol of the first modulated signal.

The transceiver 1532 can be further configured to transmit one or more control channels, one or more corresponding reference signals, such as pilot signals or other reference signals, and/or one or more clock signals together with the first modulated signal at the first carrier frequency to a network element of the distributed antenna system, such as one or more downstream communication nodes 1404B-E, for wireless distribution of the first modulated signal to one or more other mobile communication devices once frequency converted by the network element to the first spectral segment. In particular, the reference signal enables the network element to reduce a phase error (and/or other forms of signal distortion) during processing of the first modulated signal from the first carrier frequency to the first spectral segment. The control channel can include instructions to direct the communication node of the distributed antenna system to convert the first modulated signal at the first carrier frequency to the first modulated signal in the first spectral segment, to control frequency selections and reuse patterns, handoff and/or other control signaling. In embodiments where the instructions transmitted and received via the control channel are digital signals, the transceiver can 1532 can include a digital signal processing component that provides analog to digital conversion, digital to analog conversion and that processes the digital data sent and/or received via the control channel. The clock signals supplied with the downlink spectral segment 1506 can be utilized to synchronize timing of digital control channel processing by the downstream communication nodes 1404B-E to recover the instructions from the control channel and/or to provide other timing signals.

In various embodiments, the transceiver 1532 can receive a second modulated signal at a second carrier frequency from a network element such as a communication node 1404B-E. The second modulated signal can include one or more uplink frequency channels occupied by one or more modulated signals conforming to a signaling protocol such as a LTE or other 4G wireless protocol, a 5G wireless communication protocol, an ultra-wideband protocol, a 802.11 or other wireless local area network protocol and/or other communication protocol. In particular, the mobile or stationary communication device generates the second modulated signal in a second spectral segment such as an original/native frequency band and the network element frequency converts the second modulated signal in the second spectral segment to the second modulated signal at the second carrier frequency and transmits the second modulated signal at the second carrier frequency as received by the communication node 1404A. The transceiver 1532 operates to convert the second modulated signal at the second carrier frequency to the second modulated signal in the second spectral segment and sends the second modulated signal in the second spectral segment, via the duplexer/diplexer assembly 1524 and base station interface 1522, to a base station, such as macro base station 1402, for processing.

Consider the following examples where the communication node 1404A is implemented in a distributed antenna system. The uplink frequency channels in an uplink spectral segment 1510 and downlink frequency channels in a downlink spectral segment 1506 can be occupied with signals modulated and otherwise formatted in accordance with a DOCSIS 2.0 or higher standard protocol, a WiMAX standard protocol, an ultra-wideband protocol, a 802.11 standard protocol, a 4G or 5G voice and data protocol such as an LTE protocol and/or other standard communication protocol. In addition to protocols that conform with current standards, any of these protocols can be modified to operate in conjunction with the system of FIG. 14A. For example, a 802.11 protocol or other protocol can be modified to include additional guidelines and/or a separate data channel to provide collision detection/multiple access over a wider area (e.g. allowing network elements or communication devices communicatively coupled to the network elements that are communicating via a particular frequency channel of a downlink spectral segment 1506 or uplink spectral segment 1510 to hear one another). In various embodiments all of the uplink frequency channels of the uplink spectral segment 1510 and downlink frequency channel of the downlink spectral segment 1506 can all be formatted in accordance with the same communications protocol. In the alternative however, two or more differing protocols can be employed on both the uplink spectral segment 1510 and the downlink spectral segment 1506 to, for example, be compatible with a wider range of client devices and/or operate in different frequency bands.

When two or more differing protocols are employed, a first subset of the downlink frequency channels of the downlink spectral segment 1506 can be modulated in accordance with a first standard protocol and a second subset of the downlink frequency channels of the downlink spectral segment 1506 can be modulated in accordance with a second standard protocol that differs from the first standard protocol. Likewise a first subset of the uplink frequency channels of the uplink spectral segment 1510 can be received by the system for demodulation in accordance with the first standard protocol and a second subset of the uplink frequency channels of the uplink spectral segment 1510 can be received in accordance with a second standard protocol for demodulation in accordance with the second standard protocol that differs from the first standard protocol.

In accordance with these examples, the base station interface 1522 can be configured to receive modulated signals such as one or more downlink channels in their original/native frequency bands from a base station such as macro base station 1402 or other communications network element. Similarly, the base station interface 1522 can be configured to supply to a base station modulated signals received from another network element that is frequency converted to modulated signals having one or more uplink channels in their original/native frequency bands. The base station interface 1522 can be implemented via a wired or wireless interface that bidirectionally communicates communication signals such as uplink and downlink channels in their original/native frequency bands, communication control signals and other network signaling with a macro base station or other network element. The duplexer/diplexer assembly 1524 is configured to transfer the downlink channels in their original/native frequency bands to the transceiver 1532 which frequency converts the frequency of the downlink channels from their original/native frequency bands into the frequency spectrum of interface 1410—in this case a wireless communication link used to transport the communication signals downstream to one or more other communication nodes 1404B-E of the distributed antenna system in range of the communication device 1404A.

In various embodiments, the transceiver 1532 includes an analog radio that frequency converts the downlink channel signals in their original/native frequency bands via mixing or other heterodyne action to generate frequency converted downlink channels signals that occupy downlink frequency channels of the downlink spectral segment 1506. In this illustration, the downlink spectral segment 1506 is within the downlink frequency band of the interface 1410. In an embodiment, the downlink channel signals are up-converted from their original/native frequency bands to a 28 GHz, 38 GHz, 60 GHz, 70 GHz or 80 GHz band of the downlink spectral segment 1506 for line-of-sight wireless communications to one or more other communication nodes 1404B-E. It is noted, however, that other frequency bands can likewise be employed for a downlink spectral segment 1506 (e.g., 3GHz to 5 GHz). For example, the transceiver 1532 can be configured for down-conversion of one or more downlink channel signals in their original/native spectral bands in instances where the frequency band of the interface 1410 falls below the original/native spectral bands of the one or more downlink channels signals.

The transceiver 1532 can be coupled to multiple individual antennas, such as antennas 1422 presented in conjunction with FIG. 14D, for communicating with the communication nodes 1404B, a phased antenna array or steerable beam or multi-beam antenna system for communicating with multiple devices at different locations. The duplexer/diplexer assembly 1524 can include a duplexer, triplexer, splitter, switch, router and/or other assembly that operates as a "channel duplexer" to provide bi-directional communications over multiple communication paths via one or more original/native spectral segments of the uplink and downlink channels.

In addition to forwarding frequency converted modulated signals downstream to other communication nodes 1404B-E at a carrier frequency that differs from their original/native spectral bands, the communication node 1404A can also communicate all or a selected portion of the modulated signals unmodified from their original/native spectral bands to client devices in a wireless communication range of the communication node 1404A via the wireless interface 1411. The duplexer/diplexer assembly 1524 transfers the modulated signals in their original/native spectral bands to the transceiver 1530. The transceiver 1530 can include a channel selection filter for selecting one or more downlink channels and a power amplifier coupled to one or more antennas, such as antennas 1424 presented in conjunction with FIG. 14D, for transmission of the downlink channels via wireless interface 1411 to mobile or fixed wireless devices.

In addition to downlink communications destined for client devices, communication node 1404A can operate in a reciprocal fashion to handle uplink communications originating from client devices as well. In operation, the transceiver 1532 receives uplink channels in the uplink spectral segment 1510 from communication nodes 1404B-E via the uplink spectrum of interface 1410. The uplink frequency channels in the uplink spectral segment 1510 include modulated signals that were frequency converted by communication nodes 1404B-E from their original/native spectral bands to the uplink frequency channels of the uplink spectral segment 1510. In situations where the interface 1410 operates in a higher frequency band than the native/original spectral segments of the modulated signals supplied by the client devices, the transceiver 1532 down-converts the up-converted modulated signals to their original frequency bands. In situations, however, where the interface 1410 operates in a lower frequency band than the native/original spectral segments of the modulated signals supplied by the client devices, the transceiver 1532 up-converts the down-converted modulated signals to their original frequency bands. Further, the transceiver 1530 operates to receive all or selected ones of the modulated signals in their original/native frequency bands from client devices via the wireless interface 1411. The duplexer/diplexer assembly 1524 transfers the modulated signals in their original/native frequency bands received via the transceiver 1530 to the base station interface 1522 to be sent to the macro base station 1402 or other network element of a communications network. Similarly, modulated signals occupying uplink frequency channels in an uplink spectral segment 1510 that are frequency converted to their original/native frequency bands by the transceiver 1532 are supplied to the duplexer/diplexer assembly 1524 for transfer to the base station interface 1522 to be sent to the macro base station 1402 or other network element of a communications network.

Figure 15C:
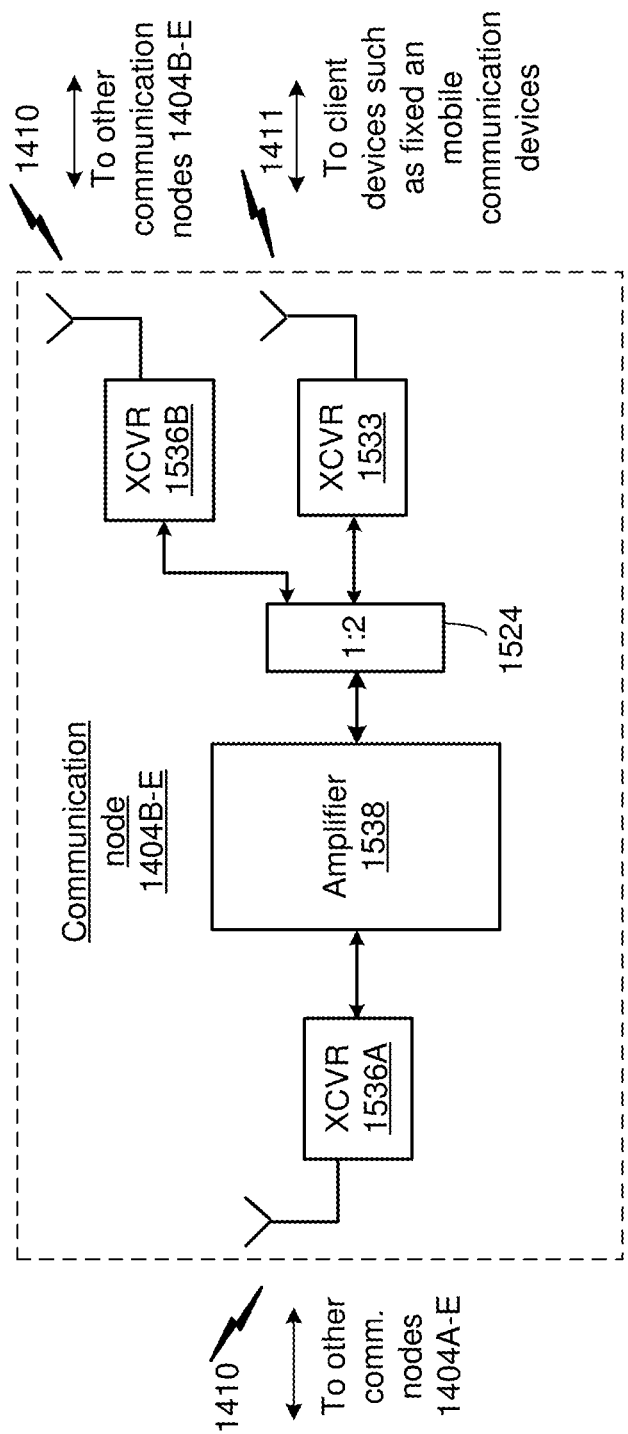
FIG. 15C is a block diagram illustrating an example, non-limiting embodiment of a communication node in accordance with various aspects described herein.

Turning now to FIG. 15C, a block diagram 1535 illustrating an example, non-limiting embodiment of a communication node is shown. In particular, the communication node device such as communication node 1404B, 1404C, 1404D or 1404E of a radio distributed antenna system includes transceiver 1533, duplexer/diplexer assembly 1524, an amplifier 1538 and two transceivers 1536A and 1536B.

In various embodiments, the transceiver 1536A receives, from a communication node 1404A or an upstream communication node 1404B-E, a first modulated signal at a first carrier frequency corresponding to the placement of the channels of the first modulated signal in the converted spectrum of the distributed antenna system (e.g., frequency channels of one or more downlink spectral segments 1506). The first modulated signal includes first communications data provided by a base station and directed to a mobile communication device. The transceiver 1536A is further configured to receive, from a communication node 1404A one or more control channels and one or more corresponding reference signals, such as pilot signals or other reference signals, and/or one or more clock signals associated with the first modulated signal at the first carrier frequency. The first modulated signal can include one or more downlink communication channels conforming to a signaling protocol such as a LTE or other 4G wireless protocol, a 5G wireless communication protocol, an ultra-wideband protocol, a WiMAX protocol, a 802.11 or other wireless local area network protocol and/or other communication protocol.

As previously discussed, the reference signal enables the network element to reduce a phase error (and/or other forms of signal distortion) during processing of the first modulated signal from the first carrier frequency to the first spectral segment (i.e., original/native spectrum). The control channel includes instructions to direct the communication node of the distributed antenna system to convert the first modulated signal at the first carrier frequency to the first modulated signal in the first spectral segment, to control frequency selections and reuse patterns, handoff and/or other control signaling. The clock signals can synchronize timing of digital control channel processing by the downstream communication nodes 1404B-E to recover the instructions from the control channel and/or to provide other timing signals.

The amplifier 1538 can be a bidirectional amplifier that amplifies the first modulated signal at the first carrier frequency together with the reference signals, control channels and/or clock signals for coupling via the duplexer/diplexer assembly 1524 to transceiver 1536B, which in this illustration, serves as a repeater for retransmission of the amplified the first modulated signal at the first carrier frequency together with the reference signals, control channels and/or clock signals to one or more others of the communication nodes 1404B-E that are downstream from the communication node 1404B-E that is shown and that operate in a similar fashion.

The amplified first modulated signal at the first carrier frequency together with the reference signals, control channels and/or clock signals are also coupled via the duplexer/diplexer assembly 1524 to the transceiver 1533. The transceiver 1533 performs digital signal processing on the control channel to recover the instructions, such as in the form of digital data, from the control channel. The clock signal is used to synchronize timing of the digital control channel processing. The transceiver 1533 then performs frequency conversion of the first modulated signal at the first carrier frequency to the first modulated signal in the first spectral segment in accordance with the instructions and based on an analog (and/or digital) signal processing of the first modulated signal and utilizing the reference signal to reduce distortion during the converting process. The transceiver 1533 wirelessly transmits the first modulated signal in the first spectral segment for direct communication with one or more mobile communication devices in range of the communication node 1404B-E as free space wireless signals.

In various embodiments, the transceiver 1536B receives a second modulated signal at a second carrier frequency in an uplink spectral segment 1510 from other network elements such as one or more other communication nodes 1404B-E that are downstream from the communication node 1404B-E that is shown. The second modulated signal can include one or more uplink communication channels conforming to a signaling protocol such as a LTE or other 4G wireless protocol, a 5G wireless communication protocol, an ultra-wideband protocol, a 802.11 or other wireless local area network protocol and/or other communication protocol. In particular, one or more mobile communication devices generate the second modulated signal in a second spectral segment such as an original/native frequency band and the downstream network element performs frequency conversion on the second modulated signal in the second spectral segment to the second modulated signal at the second carrier frequency and transmits the second modulated signal at the second carrier frequency in an uplink spectral segment 1510 as received by the communication node 1404B-E shown. The transceiver 1536B operates to send the second modulated signal at the second carrier frequency to amplifier 1538, via the duplexer/diplexer assembly 1524, for amplification and retransmission via the transceiver 1536A back to the communication node 1404A or upstream communication nodes 1404B-E for further retransmission back to a base station, such as macro base station 1402, for processing.

The transceiver 1533 may also receive a second modulated signal in the second spectral segment from one or more mobile communication devices in range of the communication node 1404B-E. The transceiver 1533 operates to perform frequency conversion on the second modulated signal in the second spectral segment to the second modulated signal at the second carrier frequency, for example, under control of the instructions received via the control channel, inserts the reference signals, control channels and/or clock signals for use by communication node 1404A in reconverting the second modulated signal back to the original/native spectral segments and sends the second modulated signal at the second carrier frequency, via the duplexer/diplexer assembly 1524 and amplifier 1538, to the transceiver 1536A for amplification and retransmission back to the communication node 1404A or upstream communication nodes 1404B-E for further retransmission back to a base station, such as macro base station 1402, for processing.

Figure 15D:
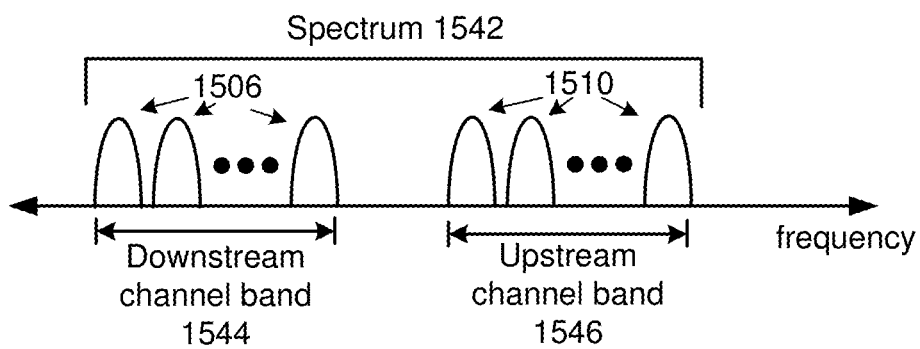
FIG. 15D is a graphical diagram illustrating an example, non-limiting embodiment of a frequency spectrum in accordance with various aspects described herein.

Turning now to FIG. 15D, a graphical diagram 1540 illustrating an example, non-limiting embodiment of a frequency spectrum is shown. In particular, a spectrum 1542 is shown for a distributed antenna system that conveys modulated signals that occupy frequency channels of a downlink segment 1506 or uplink spectral segment 1510 after they have been converted in frequency (e.g. via up-conversion or down-conversion) from one or more original/native spectral segments into the spectrum 1542.

In the example presented, the downstream (downlink) channel band 1544 includes a plurality of downstream frequency channels represented by separate downlink spectral segments 1506. Likewise the upstream (uplink) channel band 1546 includes a plurality of upstream frequency channels represented by separate uplink spectral segments 1510. The spectral shapes of the separate spectral segments are meant to be placeholders for the frequency allocation of each modulated signal along with associated reference signals, control channels and clock signals. The actual spectral response of each frequency channel in a downlink spectral segment 1506 or uplink spectral segment 1510 will vary based on the protocol and modulation employed and further as a function of time.

The number of the uplink spectral segments 1510 can be less than or greater than the number of the downlink spectral segments 1506 in accordance with an asymmetrical communication system. In this case, the upstream channel band 1546 can be narrower or wider than the downstream channel band 1544. In the alternative, the number of the uplink spectral segments 1510 can be equal to the number of the downlink spectral segments 1506 in the case where a symmetrical communication system is implemented. In this case, the width of the upstream channel band 1546 can be equal to the width of the downstream channel band 1544 and bit stuffing or other data filling techniques can be employed to compensate for variations in upstream traffic. While the downstream channel band 1544 is shown at a lower frequency than the upstream channel band 1546, in other embodiments, the downstream channel band 1444 can be at a higher frequency than the upstream channel band 1546. In addition, the number of spectral segments and their respective frequency positions in spectrum 1542 can change dynamically over time. For example, a general control channel can be provided in the spectrum 1542 (not shown) which can indicate to communication nodes 1404 the frequency position of each downlink spectral segment 1506 and each uplink spectral segment 1510. Depending on traffic conditions, or network requirements necessitating a reallocation of bandwidth, the number of downlink spectral segments 1506 and uplink spectral segments 1510 can be changed by way of the general control channel. Additionally, the downlink spectral segments 1506 and uplink spectral segments 1510 do not have to be grouped separately. For instance, a general control channel can identify a downlink spectral segment 1506 being followed by an uplink spectral segment 1510 in an alternating fashion, or in any other combination which may or may not be symmetric. It is further noted that instead of utilizing a general control channel, multiple control channels can be used, each identifying the frequency position of one or more spectral segments and the type of spectral segment (i.e., uplink or downlink).

Further, while the downstream channel band 1544 and upstream channel band 1546 are shown as occupying a single contiguous frequency band, in other embodiments, two or more upstream and/or two or more downstream channel bands can be employed, depending on available spectrum and/or the communication standards employed. Frequency channels of the uplink spectral segments 1510 and downlink spectral segments 1506 can be occupied by frequency converted signals modulated formatted in accordance with a DOCSIS 2.0 or higher standard protocol, a WiMAX standard protocol, an ultra-wideband protocol, a 802.11 standard protocol, a 4G or 5G voice and data protocol such as an LTE protocol and/or other standard communication protocol. In addition to protocols that conform with current standards, any of these protocols can be modified to operate in conjunction with the system shown. For example, a 802.11 protocol or other protocol can be modified to include additional guidelines and/or a separate data channel to provide collision detection/multiple access over a wider area (e.g. allowing devices that are communicating via a particular frequency channel to hear one another). In various embodiments all of the uplink frequency channels of the uplink spectral segments 1510 and downlink frequency channel of the downlink spectral segments 1506 are all formatted in accordance with the same communications protocol. In the alternative however, two or more differing protocols can be employed on both the uplink frequency channels of one or more uplink spectral segments 1510 and downlink frequency channels of one or more downlink spectral segments 1506 to, for example, be compatible with a wider range of client devices and/or operate in different frequency bands.

It should be noted that, the modulated signals can be gathered from differing original/native spectral segments for aggregation into the spectrum 1542. In this fashion, a first portion of uplink frequency channels of an uplink spectral segment 1510 may be adjacent to a second portion of uplink frequency channels of the uplink spectral segment 1510 that have been frequency converted from one or more differing original/native spectral segments. Similarly, a first portion of downlink frequency channels of a downlink spectral segment 1506 may be adjacent to a second portion of downlink frequency channels of the downlink spectral segment 1506 that have been frequency converted from one or more differing original/native spectral segments. For example, one or more 2.4 GHz 802.11 channels that have been frequency converted may be adjacent to one or more 5.8 GHz 802.11 channels that have also been frequency converted to a spectrum 1542 that is centered at 80 GHz. It should be noted that each spectral segment can have an associated reference signal such as a pilot signal that can be used in generating a local oscillator signal at a frequency and phase that provides the frequency conversion of one or more frequency channels of that spectral segment from its placement in the spectrum 1542 back into it original/native spectral segment.

Figure 15E:
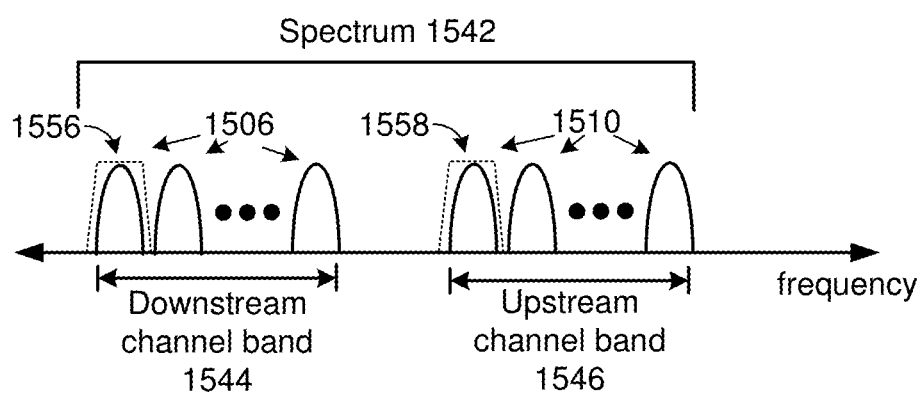
FIG. 15E is a graphical diagram illustrating an example, non-limiting embodiment of a frequency spectrum in accordance with various aspects described herein.

Turning now to FIG. 15E, a graphical diagram 1550 illustrating an example, non-limiting embodiment of a frequency spectrum is shown. In particular a spectral segment selection is presented as discussed in conjunction with signal processing performed on the selected spectral segment by transceivers 1530 of communication node 1440A or transceiver 1532 of communication node 1404B-E. As shown, a particular uplink frequency portion 1558 including one of the uplink spectral segments 1510 of uplink frequency channel band 1546 and a particular downlink frequency portion 1556 including one of the downlink spectral segments 1506 of downlink channel frequency band 1544 is selected to be passed by channel selection filtration, with the remaining portions of uplink frequency channel band 1546 and downlink channel frequency band 1544 being filtered out—i.e. attenuated so as to mitigate adverse effects of the processing of the desired frequency channels that are passed by the transceiver. It should be noted that while a single particular uplink spectral segment 1510 and a particular downlink spectral segment 1506 are shown as being selected, two or more uplink and/or downlink spectral segments may be passed in other embodiments.

While the transceivers 1530 and 1532 can operate based on static channel filters with the uplink and downlink frequency portions 1558 and 1556 being fixed, as previously discussed, instructions sent to the transceivers 1530 and 1532 via the control channel can be used to dynamically configure the transceivers 1530 and 1532 to a particular frequency selection. In this fashion, upstream and downstream frequency channels of corresponding spectral segments can be dynamically allocated to various communication nodes by the macro base station 1402 or other network element of a communication network to optimize performance by the distributed antenna system.

Figure 15F:
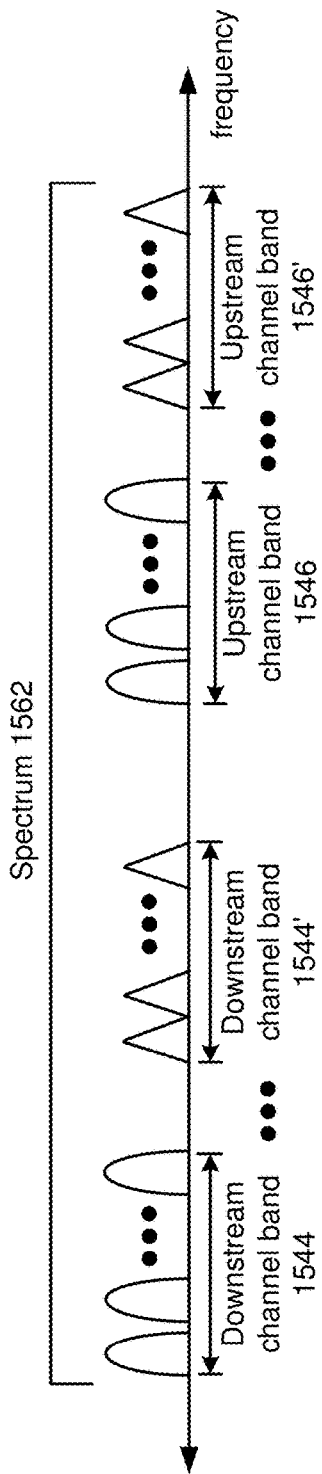
FIG. 15F is a graphical diagram illustrating an example, non-limiting embodiment of a frequency spectrum in accordance with various aspects described herein.

Turning now to FIG. 15F, a graphical diagram 1560 illustrating an example, non-limiting embodiment of a frequency spectrum is shown. In particular, a spectrum 1562 is shown for a distributed antenna system that conveys modulated signals occupying frequency channels of uplink or downlink spectral segments after they have been converted in frequency (e.g. via up-conversion or down-conversion) from one or more original/native spectral segments into the spectrum 1562.

As previously discussed two or more different communication protocols can be employed to communicate upstream and downstream data. When two or more differing protocols are employed, a first subset of the downlink frequency channels of a downlink spectral segment 1506 can be occupied by frequency converted modulated signals in accordance with a first standard protocol and a second subset of the downlink frequency channels of the same or a different downlink spectral segment 1510 can be occupied by frequency converted modulated signals in accordance with a second standard protocol that differs from the first standard protocol. Likewise a first subset of the uplink frequency channels of an uplink spectral segment 1510 can be received by the system for demodulation in accordance with the first standard protocol and a second subset of the uplink frequency channels of the same or a different uplink spectral segment 1510 can be received in accordance with a second standard protocol for demodulation in accordance with the second standard protocol that differs from the first standard protocol.

In the example shown, the downstream channel band 1544 includes a first plurality of downstream spectral segments represented by separate spectral shapes of a first type representing the use of a first communication protocol. The downstream channel band 1544' includes a second plurality of downstream spectral segments represented by separate spectral shapes of a second type representing the use of a second communication protocol. Likewise the upstream channel band 1546 includes a first plurality of upstream spectral segments represented by separate spectral shapes of the first type representing the use of the first communication protocol. The upstream channel band 1546' includes a second plurality of upstream spectral segments represented by separate spectral shapes of the second type representing the use of the second communication protocol. These separate spectral shapes are meant to be placeholders for the frequency allocation of each individual spectral segment along with associated reference signals, control channels and/or clock signals. While the individual channel bandwidth is shown as being roughly the same for channels of the first and second type, it should be noted that upstream and downstream channel bands 1544, 1544', 1546 and 1546' may be of differing bandwidths. Additionally, the spectral segments in these channel bands of the first and second type may be of differing bandwidths, depending on available spectrum and/or the communication standards employed.

Figure 15G:
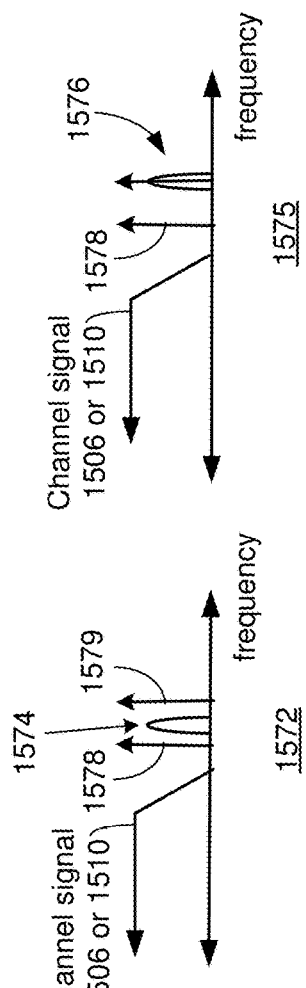
FIG. 15G is a graphical diagram illustrating an example, non-limiting embodiment of a frequency spectrum in accordance with various aspects described herein.

Turning now to FIG. 15G, a graphical diagram 1570 illustrating an example, non-limiting embodiment of a frequency spectrum is shown. In particular a portion of the spectrum 1542 or 1562 of FIGS. 15D-15F is shown for a distributed antenna system that conveys modulated signals in the form of channel signals that have been converted in frequency (e.g. via up-conversion or down-conversion) from one or more original/native spectral segments.

The portion 1572 includes a portion of a downlink or uplink spectral segment 1506 and 1510 that is represented by a spectral shape and that represents a portion of the bandwidth set aside for a control channel, reference signal, and/or clock signal. The spectral shape 1574, for example, represents a control channel that is separate from reference signal 1579 and a clock signal 1578. It should be noted that the clock signal 1578 is shown with a spectral shape representing a sinusoidal signal that may require conditioning into the form of a more traditional clock signal. In other embodiments however, a traditional clock signal could be sent as a modulated carrier wave such by modulating the reference signal 1579 via amplitude modulation or other modulation technique that preserves the phase of the carrier for use as a phase reference. In other embodiments, the clock signal could be transmitted by modulating another carrier wave or as another signal. Further, it is noted that both the clock signal 1578 and the reference signal 1579 are shown as being outside the frequency band of the control channel 1574.

In another example, the portion 1575 includes a portion of a downlink or uplink spectral segment 1506 and 1510 that is represented by a portion of a spectral shape that represents a portion of the bandwidth set aside for a control channel, reference signal, and/or clock signal. The spectral shape 1576 represents a control channel having instructions that include digital data that modulates the reference signal, via amplitude modulation, amplitude shift keying or other modulation technique that preserves the phase of the carrier for use as a phase reference. The clock signal 1578 is shown as being outside the frequency band of the spectral shape 1576. The reference signal, being modulated by the control channel instructions, is in effect a subcarrier of the control channel and is in-band to the control channel. Again, the clock signal 1578 is shown with a spectral shape representing a sinusoidal signal, in other embodiments however, a traditional clock signal could be sent as a modulated carrier wave or other signal. In this case, the instructions of the control channel can be used to modulate the clock signal 1578 instead of the reference signal.

Consider the following example, where the control channel 1576 is carried via modulation of a reference signal in the form of a continuous wave (CW) from which the phase distortion in the receiver is corrected during frequency conversion of the downlink or uplink spectral segment back to its original/native spectral segment. The control channel 1576 can be modulated with a robust modulation such as pulse amplitude modulation, binary phase shift keying, amplitude shift keying or other modulation scheme to carry instructions between network elements of the distributed antenna system such as network operations, administration and management traffic and other control data. In various embodiments, the control data can include:

Status information that indicates online status, offline status, and network performance parameters of each network element.

Network device information such as module names and addresses, hardware and software versions, device capabilities, etc.

Spectral information such as frequency conversion factors, channel spacing, guard bands, uplink/downlink allocations, uplink and downlink channel selections, etc.

Environmental measurements such as weather conditions, image data, power outage information, line of sight blockages, etc.

In a further example, the control channel data can be sent via ultra-wideband (UWB) signaling. The control channel data can be transmitted by generating radio energy at specific time intervals and occupying a larger bandwidth, via pulse-position or time modulation, by encoding the polarity or amplitude of the UWB pulses and/or by using orthogonal pulses. In particular, UWB pulses can be sent sporadically at relatively low pulse rates to support time or position modulation, but can also be sent at rates up to the inverse of the UWB pulse bandwidth. In this fashion, the control channel can be spread over an UWB spectrum with relatively low power, and without interfering with CW transmissions of the reference signal and/or clock signal that may occupy in-band portions of the UWB spectrum of the control channel.

Figure 15H:
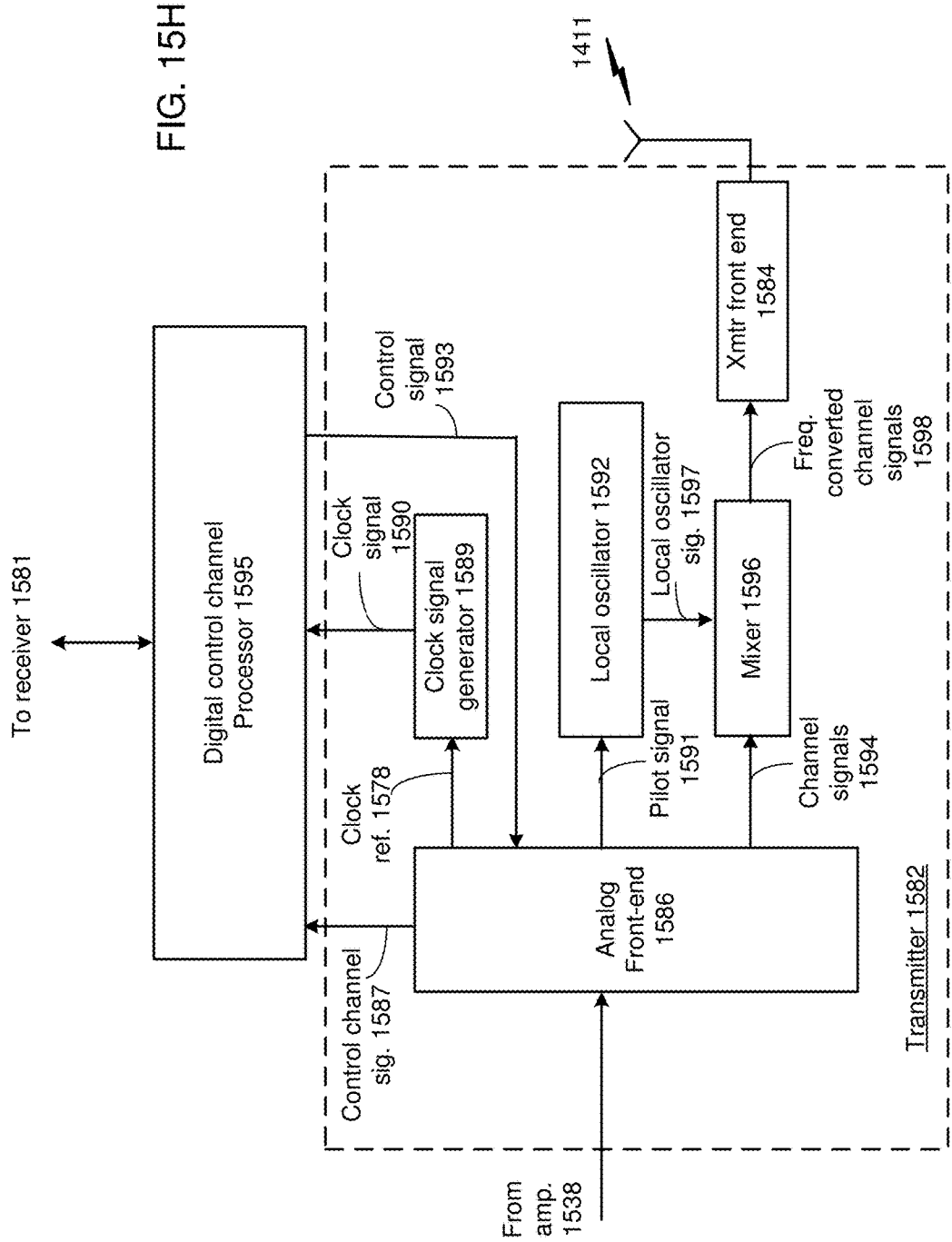
FIG. 15H is a block diagram illustrating an example, non-limiting embodiment of a transmitter in accordance with various aspects described herein.

Turning now to FIG. 15H, a block diagram 1580 illustrating an example, non-limiting embodiment of a transmitter is shown. In particular, a transmitter 1582 is shown for use with, for example, a receiver 1581 and a digital control channel processor 1595 in a transceiver, such as transceiver 1533 presented in conjunction with FIG. 15C. As shown, the transmitter 1582 includes an analog front-end 1586, clock signal generator 1589, a local oscillator 1592, a mixer 1596, and a transmitter front end 1584.

The amplified first modulated signal at the first carrier frequency together with the reference signals, control channels and/or clock signals are coupled from the amplifier 1538 to the analog front-end 1586. The analog front end 1586 includes one or more filters or other frequency selection to separate the control channel signal 1587, a clock reference signal 1578, a pilot signal 1591 and one or more selected channels signals 1594.

The digital control channel processor 1595 performs digital signal processing on the control channel to recover the instructions, such as via demodulation of digital control channel data, from the control channel signal 1587. The clock signal generator 1589 generates the clock signal 1590, from the clock reference signal 1578, to synchronize timing of the digital control channel processing by the digital control channel processor 1595. In embodiments where the clock reference signal 1578 is a sinusoid, the clock signal generator 1589 can provide amplification and limiting to create a traditional clock signal or other timing signal from the sinusoid. In embodiments where the clock reference signal 1578 is a modulated carrier signal, such as a modulation of the reference or pilot signal or other carrier wave, the clock signal generator 1589 can provide demodulation to create a traditional clock signal or other timing signal.

In various embodiments, the control channel signal 1587 can be either a digitally modulated signal in a range of frequencies separate from the pilot signal 1591 and the clock reference 1588 or as modulation of the pilot signal 1591. In operation, the digital control channel processor 1595 provides demodulation of the control channel signal 1587 to extract the instructions contained therein in order to generate a control signal 1593. In particular, the control signal 1593 generated by the digital control channel processor 1595 in response to instructions received via the control channel can be used to select the particular channel signals 1594 along with the corresponding pilot signal 1591 and/or clock reference 1588 to be used for converting the frequencies of channel signals 1594 for transmission via wireless interface 1411. It should be noted that in circumstances where the control channel signal 1587 conveys the instructions via modulation of the pilot signal 1591, the pilot signal 1591 can be extracted via the digital control channel processor 1595 rather than the analog front-end 1586 as shown.

The digital control channel processor 1595 may be implemented via a processing module such as a microprocessor, micro-controller, digital signal processor, microcomputer, central processing unit, field programmable gate array, programmable logic device, state machine, logic circuitry, digital circuitry, an analog to digital converter, a digital to analog converter and/or any device that manipulates signals (analog and/or digital) based on hard coding of the circuitry and/or operational instructions. The processing module may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that the memory and/or memory element storing the corresponding operational instructions may be embedded within, or external to, the microprocessor, micro-controller, digital signal processor, microcomputer, central processing unit, field programmable gate array, programmable logic device, state machine, logic circuitry, digital circuitry, an analog to digital converter, a digital to analog converter or other device. Still further note that, the memory element may store, and the processing module executes, hard coded and/or operational instructions corresponding to at least some of the steps and/or functions described herein and such a memory device or memory element can be implemented as an article of manufacture.

The local oscillator 1592 generates the local oscillator signal 1597 utilizing the pilot signal 1591 to reduce distortion during the frequency conversion process. In various embodiments the pilot signal 1591 is at the correct frequency and phase of the local oscillator signal 1597 to generate the local oscillator signal 1597 at the proper frequency and phase to convert the channel signals 1594 at the carrier frequency associated with their placement in the spectrum of the distributed antenna system to their original/native spectral segments for transmission to fixed or mobile communication devices. In this case, the local oscillator 1592 can employ bandpass filtration and/or other signal conditioning to generate a sinusoidal local oscillator signal 1597 that preserves the frequency and phase of the pilot signal 1591. In other embodiments, the pilot signal 1591 has a frequency and phase that can be used to derive the local oscillator signal 1597. In this case, the local oscillator 1592 employs frequency division, frequency multiplication or other frequency synthesis, based on the pilot signal 1591, to generate the local oscillator signal 1597 at the proper frequency and phase to convert the channel signals 1594 at the carrier frequency associated with their placement in the spectrum of the distributed antenna system to their original/native spectral segments for transmission to fixed or mobile communication devices.

The mixer 1596 operates based on the local oscillator signal 1597 to shift the channel signals 1594 in frequency to generate frequency converted channel signals 1598 at their corresponding original/native spectral segments. While a single mixing stage is shown, multiple mixing stages can be employed to shift the channel signals to baseband and/or one or more intermediate frequencies as part of the total frequency conversion. The transmitter (Xmtr) front-end 1584 includes a power amplifier and impedance matching to wirelessly transmit the frequency converted channel signals 1598 as a free space wireless signals via one or more antennas, such as antennas 1424, to one or more mobile or fixed communication devices in range of the communication node 1404B-E.

Figure 15I:
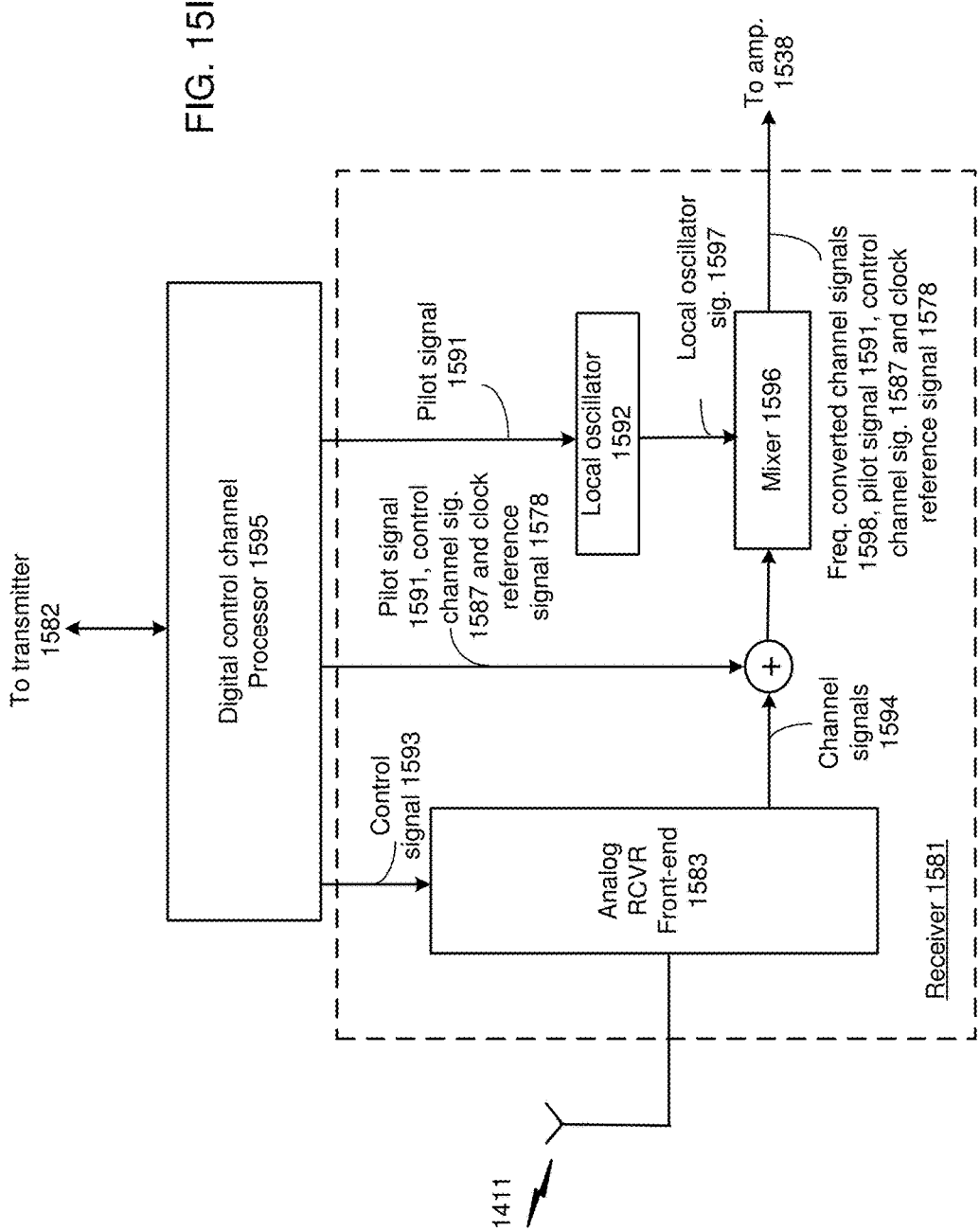
FIG. 15I is a block diagram illustrating an example, non-limiting embodiment of a receiver in accordance with various aspects described herein.

Turning now to FIG. 15I, a block diagram 1585 illustrating an example, non-limiting embodiment of a receiver is shown. In particular, a receiver 1581 is shown for use with, for example, transmitter 1582 and digital control channel processor 1595 in a transceiver, such as transceiver 1533 presented in conjunction with FIG. 15C. As shown, the receiver 1581 includes an analog receiver (RCVR) front-end 1583, local oscillator 1592, and mixer 1596. The digital control channel processor 1595 operates under control of instructions from the control channel to generate the pilot signal 1591, control channel signal 1587 and clock reference signal 1578.

The control signal 1593 generated by the digital control channel processor 1595 in response to instructions received via the control channel can also be used to select the particular channel signals 1594 along with the corresponding pilot signal 1591 and/or clock reference 1588 to be used for converting the frequencies of channel signals 1594 for reception via wireless interface 1411. The analog receiver front end 1583 includes a low noise amplifier and one or more filters or other frequency selection to receive one or more selected channels signals 1594 under control of the control signal 1593.

The local oscillator 1592 generates the local oscillator signal 1597 utilizing the pilot signal 1591 to reduce distortion during the frequency conversion process. In various embodiments the local oscillator employs bandpass filtration and/or other signal conditioning, frequency division, frequency multiplication or other frequency synthesis, based on the pilot signal 1591, to generate the local oscillator signal 1597 at the proper frequency and phase to frequency convert the channel signals 1594, the pilot signal 1591, control channel signal 1587 and clock reference signal 1578 to the spectrum of the distributed antenna system for transmission to other communication nodes 1404A-E. In particular, the mixer 1596 operates based on the local oscillator signal 1597 to shift the channel signals 1594 in frequency to generate frequency converted channel signals 1598 at the desired placement within spectrum spectral segment of the distributed antenna system for coupling to the amplifier 1538, to transceiver 1536A for amplification and retransmission via the transceiver 1536A back to the communication node 1404A or upstream communication nodes 1404B-E for further retransmission back to a base station, such as macro base station 1402, for processing. Again, while a single mixing stage is shown, multiple mixing stages can be employed to shift the channel signals to baseband and/or one or more intermediate frequencies as part of the total frequency conversion.

Figure 16A:
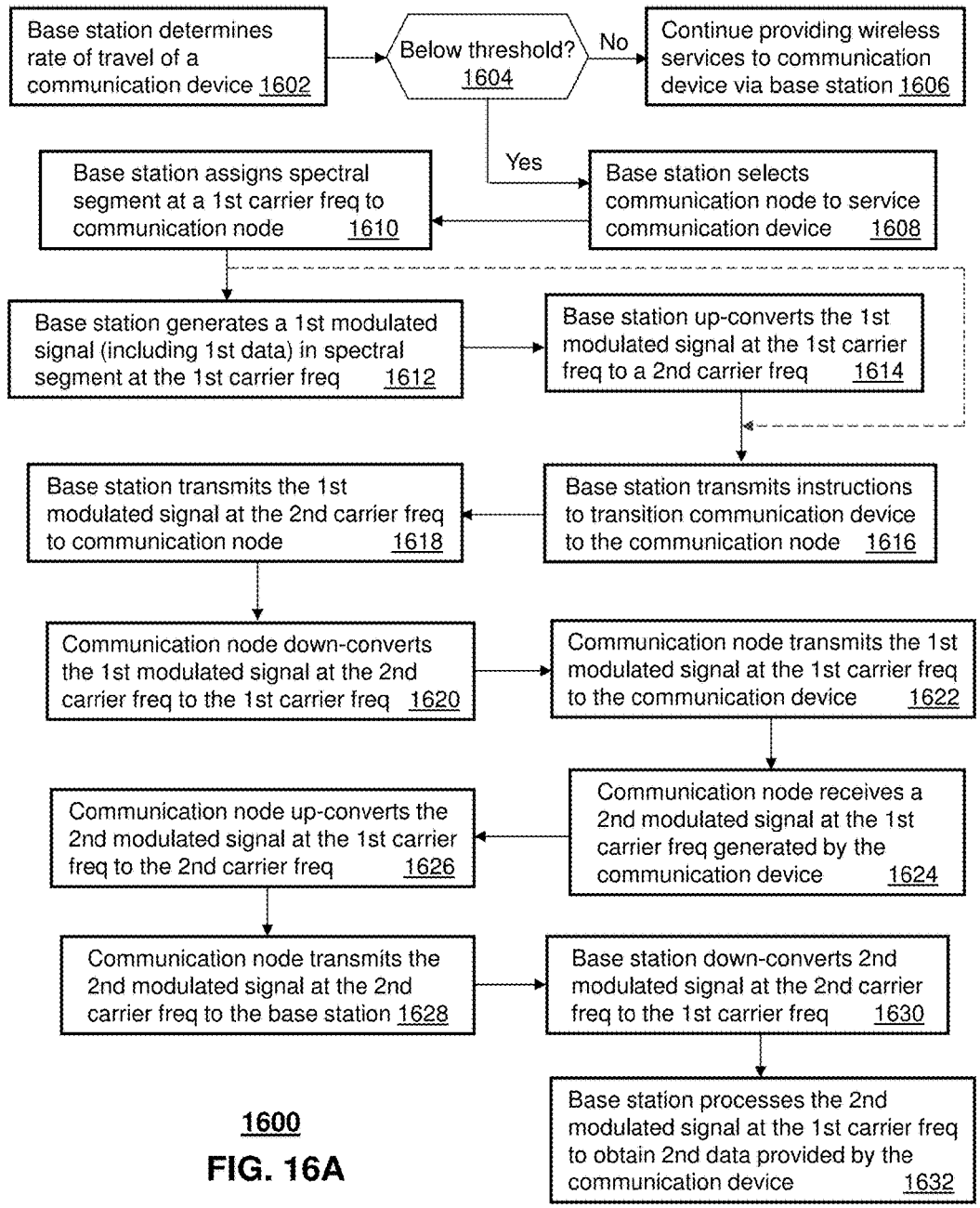
FIG. 16A illustrates a flow diagram of an example, non-limiting embodiment of a method in accordance with various aspects described herein.

Turning now to FIG. 16A, a flow diagram of an example, non-limiting embodiment of a method 1600, is shown. Method 1600 can be used with one or more functions and features presented in conjunction with FIGS. 1-15. Method 1600 can begin with step 1602 in which a base station, such as the macro base station 1402 of FIG. 14A, determines a rate of travel of a communication device. The communication device can be a mobile communication device such as one of the mobile devices 1406 illustrated in FIG. 14B, or stationary communication device (e.g., a communication device in a residence, or commercial establishment). The base station can communicate directly with the communication device utilizing wireless cellular communications technology (e.g., LTE), which enables the base station to monitor the movement of the communication device by receiving location information from the communication device, and/or to provide the communication device wireless communication services such as voice and/or data services. During a communication session, the base station and the communication device exchange wireless signals that operate at a certain native/original carrier frequency (e.g., a 900 MHz band, 1.9 GHz band, a 2.4 GHz band, and/or a 5.8 GHz band, etc.) utilizing one or more spectral segments (e.g., resource blocks) of a certain bandwidth (e.g., 10-20 MHz). In some embodiments, the spectral segments are used according to a time slot schedule assigned to the communication device by the base station.

The rate of travel of the communication device can be determined at step 1602 from GPS coordinates provided by the communication device to the base station by way of cellular wireless signals. If the rate of travel is above a threshold (e.g., 25 miles per hour) at step 1604, the base station can continue to provide wireless services to the communication device at step 1606 utilizing the wireless resources of the base station. If, on the other hand, the communication device has a rate of travel below the threshold, the base station can be configured to further determine whether the communication device can be redirected to a communication node to make available the wireless resources of the base station for other communication devices.

For example, suppose the base station detects that the communication device has a slow rate of travel (e.g., 3 mph or near stationary). Under certain circumstances, the base station may also determine that a current location of the communication device places the communication device in a communication range of a particular communication node 1404. The base station may also determine that the slow rate of travel of the communication device will maintain the communication device within the communication range of the particular communication node 1404 for a sufficiently long enough time (another threshold test that can be used by the base station) to justify redirecting the communication device to the particular communication node 1404. Once such a determination is made, the base station can proceed to step 1608 and select the communication node 1404 that is in the communication range of the communication device for providing communication services thereto.

Accordingly, the selection process performed at step 1608 can be based on a location of the communication device determined from GPS coordinates provided to the base station by the communication device. The selection process can also be based on a trajectory of travel of the communication device, which may be determined from several instances of GPS coordinates provided by the communication device. In some embodiments, the base station may determine that the trajectory of the communication device will eventually place the communication device in a communication range of a subsequent communication node 1404 neighboring the communication node selected at step 1608. In this embodiment, the base station can inform multiple communication nodes 1404 of this trajectory to enable the communication nodes 1404 coordinate a handoff of communication services provided to the communication device.

Once one or more communication nodes 1404 have been selected at step 1608, the base station can proceed to step 1610 where it assigns one or more spectral segments (e.g., resource blocks) for use by the communication device at a first carrier frequency (e.g., 1.9 GHz). It is not necessary for the first carrier frequency and/or spectral segments selected by the base station to be the same as the carrier frequency and/or spectral segments in use between the base station and the communication device. For example, suppose the base station and the communication device are utilizing a carrier frequency at 1.9 GHz for wireless communications between each other. The base station can select a different carrier frequency (e.g., 900 MHz) at step 1610 for the communication node selected at step 1608 to communicate with the communication device. Similarly, the base station can assign spectral segment(s) (e.g., resource blocks) and/or a timeslot schedule of the spectral segment(s) to the communication node that differs from the spectral segment(s) and/or timeslot schedule in use between the base station and the communication device.

At step 1612, the base station can generate first modulated signal(s) in the spectral segment(s) assigned in step 1610 at the first carrier frequency. The first modulated signal(s) can include data directed to the communication device, the data representative of a voice communication session, a data communication session, or a combination thereof. At step 1614, the base station can up-convert (with a mixer, bandpass filter and other circuitry) the first modulated signal(s) at the first native carrier frequency (e.g., 1.9 GHz) to a second carrier frequency (e.g., 80 GHz) for transport of such signals in one or more frequency channels of a downlink spectral segment 1506 which is directed to the communication node 1404 selected at step 1608. Alternatively, the base station can provide the first modulated signal(s) at the first carrier frequency to the first communication node 1404A (illustrated in FIG. 14A) for up-conversion to the second carrier frequency for transport in one or more frequency channels of a downlink spectral segment 1506 directed to the communication node 1404 selected at step 1608.

At step 1616, the base station can also transmit instructions to transition the communication device to the communication node 1404 selected at step 1608. The instructions can be directed to the communication device while the communication device is in direct communications with the base station utilizing the wireless resources of the base station. Alternatively, the instructions can be communicated to the communication node 1404 selected at step 1608 by way of a control channel 1502 of the downlink spectral segment 1506 illustrated in FIG. 15A. Step 1616 can occur before, after or contemporaneously with steps 1612-1614.

Once the instructions have been transmitted, the base station can proceed to step 1618 where it transmits in one or more frequency channels of a downlink spectral segment 1506 the first modulated signal at the second carrier frequency (e.g., 80 GHz) for transmission by the first communication node 1404A (illustrated in FIG. 14A). Alternatively, the first communication node 1404A can perform the up-conversion at step 1614 for transport of the first modulated signal at the second carrier frequency in one or more frequency channels of a downlink spectral segment 1506 upon receiving from the base station the first modulated signal(s) at the first native carrier frequency. The first communication node 1404A can serve as a master communication node for distributing downlink signals generated by the base station to downstream communication nodes 1404 according to the downlink spectral segments 1506 assigned to each communication node 1404 at step 1610. The assignment of the downlink spectral segments 1506 can be provided to the communication nodes 1404 by way of instructions transmitted by the first communication node 1404A in the control channel 1502 illustrated in FIG. 15A. At step 1618, the communication node 1404 receiving the first modulated signal(s) at the second carrier frequency in one or more frequency channels of a downlink spectral segment 1506 can be configured to down-convert it to the first carrier frequency, and utilize the pilot signal supplied with the first modulated signal(s) to remove distortions (e.g., phase distortion) caused by the distribution of the downlink spectral segments 1506 over communication hops between the communication nodes 1404B-D. In particular, the pilot signal can be derived from the local oscillator signal used to generate the frequency up-conversion (e.g. via frequency multiplication and/or division). When down conversion is required the pilot signal can be used to recreate a frequency and phase correct version of the local oscillator signal (e.g. via frequency multiplication and/or division) to return the modulated signal to its original portion of the frequency band with minimal phase error. In this fashion, the frequency channels of a communication system can be converted in frequency for transport via the distributed antenna system and then returned to their original position in the spectrum for transmission to wireless client device.

Once the down-conversion process is completed, the communication node 1404 can transmit at step 1622 the first modulated signal at the first native carrier frequency (e.g., 1.9 GHz) to the communication device utilizing the same spectral segment assigned to the communication node 1404. Step 1622 can be coordinated so that it occurs after the communication device has transitioned to the communication node 1404 in accordance with the instructions provided at step 1616. To make such a transition seamless, and so as to avoid interrupting an existing wireless communication session between the base station and the communication device, the instructions provided in step 1616 can direct the communication device and/or the communication node 1404 to transition to the assigned spectral segment(s) and/or time slot schedule as part of and/or subsequent to a registration process between the communication device and the communication node 1404 selected at step 1608. In some instances such a transition may require that the communication device to have concurrent wireless communications with the base station and the communication node 1404 for a short period of time.

Once the communication device successfully transitions to the communication node 1404, the communication device can terminate wireless communications with the base station, and continue the communication session by way of the communication node 1404. Termination of wireless services between the base station and the communication device makes certain wireless resources of the base station available for use with other communication devices. It should be noted that although the base station has in the foregoing steps delegated wireless connectivity to a select communication node 1404, the communication session between base station and the communication device continues as before by way of the network of communication nodes 1404 illustrated in FIG. 14A. The difference is, however, that the base station no longer needs to utilize its own wireless resources to communicate with the communication device.

In order to provide bidirectional communications between the base station and the communication device, by way of the network of communication nodes 1404, the communication node 1404 and/or the communication device can be instructed to utilize one or more frequency channels of one or more uplink spectral segments 1510 on the uplink illustrated in FIG. 15A. Uplink instructions can be provided to the communication node 1404 and/or communication device at step 1616 as part of and/or subsequent to the registration process between the communication device and the communication node 1404 selected at step 1608. Accordingly, when the communication device has data it needs to transmit to the base station, it can wirelessly transmit second modulated signal(s) at the first native carrier frequency which can be received by the communication node 1404 at step 1624. The second modulated signal(s) can be included in one or more frequency channels of one or more uplink spectral segments 1510 specified in the instructions provided to the communication device and/or communication node at step 1616.

To convey the second modulated signal(s) to the base station, the communication node 1404 can up-convert these signals at step 1626 from the first native carrier frequency (e.g., 1.9 GHz) to the second carrier frequency (e.g., 80 GHz). To enable upstream communication nodes and/or the base station to remove distortion, the second modulated signal(s) at the second carrier frequency can be transmitted at step 1628 by the communication node 1404 with one or more uplink pilot signals 1508. Once the base station receives the second modulated signal(s) at the second carrier frequency via communication node 1404A, it can down-convert these signals at step 1630 from the second carrier frequency to the first native carrier frequency to obtain data provided by the communication device at step 1632. Alternatively, the first communication node 1404A can perform the down-conversion of the second modulated signal(s) at the second carrier frequency to the first native carrier frequency and provide the resulting signals to the base station. The base station can then process the second modulated signal(s) at the first native carrier frequency to retrieve data provided by the communication device in a manner similar or identical to how the base station would have processed signals from the communication device had the base station been in direct wireless communications with the communication device.

The foregoing steps method 1600 provide a way for a base station 1402 to make available wireless resources (e.g., sector antennas, spectrum) for fast moving communication devices and in some embodiments increase bandwidth utilization by redirecting slow moving communication devices to one or more communication nodes 1404 communicatively coupled to the base station 1402. For example, suppose a base station 1402 has ten (10) communication nodes 1404 that it can redirect mobile and/or stationary communication devices to. Further suppose that the 10 communication nodes 1404 have substantially non-overlapping communication ranges.

Further suppose, the base station 1402 has set aside certain spectral segments (e.g., resource blocks 5, 7 and 9) during particular timeslots and at a particular carrier frequency, which it assigns to all 10 communication nodes 1404. During operations, the base station 1402 can be configured not to utilize resource blocks 5, 7 and 9 during the timeslot schedule and carrier frequency set aside for the communication nodes 1404 to avoid interference. As the base station 1402 detects slow moving or stationary communication devices, it can redirect the communication devices to different ones of the 10 communication nodes 1404 based on the location of the communication devices. When, for example, the base station 1402 redirects communications of a particular communication device to a particular communication node 1404, the base station 1402 can up-convert resource blocks 5, 7 and 9 during the assigned timeslots and at the carrier frequency to one or more spectral range(s) on the downlink (see FIG. 15A) assigned to the communication node 1404 in question.

The communication node 1404 in question can also be assigned to one or more frequency channels of one or more uplink spectral segments 1510 on the uplink which it can use to redirect communication signals provided by the communication device to the base station 1402. Such communication signals can be up-converted by the communication node 1404 according to the assigned uplink frequency channels in one or more corresponding uplink spectral segments 1510 and transmitted to the base station 1402 for processing. The downlink and uplink frequency channel assignments can be communicated by the base station 1402 to each communication node 1404 by way of a control channel as depicted in FIG. 15A. The foregoing downlink and uplink assignment process can also be used for the other communication nodes 1404 for providing communication services to other communication devices redirected by the base station 1402 thereto.

In this illustration, the reuse of resource blocks 5, 7 and 9 during a corresponding timeslot schedule and carrier frequency by the 10 communication nodes 1404 can effectively increase bandwidth utilization by the base station 1402 up to a factor of 10. Although the base station 1402 can no longer use resource blocks 5, 7 and 9 it set aside for the 10 communication nodes 1404 for wirelessly communicating with other communication devices, its ability to redirect communication devices to 10 different communication nodes 1404 reusing these resource blocks effectively increases the bandwidth capabilities of the base station 1402. Accordingly, method 1600 in certain embodiments can increase bandwidth utilization of a base station 1402 and make available resources of the base station 1402 for other communication devices.

It will be appreciated that in some embodiments, the base station 1402 can be configured to reuse spectral segments assigned to communication nodes 1404 by selecting one or more sectors of an antenna system of the base station 1402 that point away from the communication nodes 1404 assigned to the same spectral segments. Accordingly, the base station 1402 can be configured in some embodiments to avoid reusing certain spectral segments assigned to certain communication nodes 1404 and in other embodiments reuse other spectral segments assigned to other communication nodes 1404 by selecting specific sectors of the antenna system of the base station 1402. Similar concepts can be applied to sectors of the antenna system 1424 employed by the communication nodes 1404. Certain reuse schemes can be employed between the base station 1402 and one or more communication nodes 1404 based on sectors utilized by the base station 1402 and/or the one or more communication nodes 1404.

Method 1600 also enables the reuse of legacy systems when communication devices are redirected to one or more communication nodes. For example, the signaling protocol (e.g., LTE) utilized by the base station to wirelessly communicate with the communication device can be preserved in the communication signals exchanged between the base station and the communication nodes 1404. Accordingly, when assigning spectral segments to the communication nodes 1404, the exchange of modulated signals in these segments between the base station and the communication nodes 1404 can be the same signals that would have been used by the base station to perform direct wireless communications with the communication device. Thus, legacy base stations can be updated to perform the up and down-conversion process previously described, with the added feature of distortion mitigation, while all other functions performed in hardware and/or software for processing modulated signals at the first native carrier frequency can remain substantially unaltered. It should also be noted that, in further embodiments, channels from an original frequency band can be converted to another frequency band utilizing by the same protocol. For example, LTE channels in the 2.5 GHz band can be up-converted into a 80 GHZ band for transport and then down-converted as 5.8 GHz LTE channels if required for spectral diversity.

It is further noted that method 1600 can be adapted without departing from the scope of the subject disclosure. For example, when the base station detects that a communication device has a trajectory that will result in a transition from the communication range of one communication node to another, the base station (or the communication nodes in question) can monitor such a trajectory by way of periodic GPS coordinates provided by the communication device, and accordingly coordinate a handoff of the communication device to the other communication node. Method 1600 can also be adapted so that when the communication device is near a point of transitioning from the communication range of one communication node to another, instructions can be transmitted by the base station (or the active communication node) to direct the communication device and/or the other communication node to utilize certain spectral segments and/or timeslots in the downlink and uplink channels to successfully transition communications without interrupting an existing communication session.

It is further noted that method 1600 can also be adapted to coordinate a handoff of wireless communications between the communication device and a communication node 1404 back to the base station when the base station or the active communication node 1404 detects that the communication device will at some point transition outside of a communication range of the communication node and no other communication node is in a communication range of the communication device. Other adaptations of method 1600 are contemplated by the subject disclosure. It is further noted that when a carrier frequency of a downlink or uplink spectral segment is lower than a native frequency band of a modulated signal, a reverse process of frequency conversion would be required. That is, when transporting a modulated signal in a downlink or uplink spectral segment frequency down-conversion will be used instead of up-conversion. And when extracting a modulated signal in a downlink or uplink spectral segment frequency up-conversion will be used instead of down-conversion. Method 1600 can further be adapted to use the clock signal referred to above for synchronizing the processing of digital data in a control channel. Method 1600 can also be adapted to use a reference signal that is modulated by instructions in the control channel or a clock signal that is modulated by instructions in the control channel.

Method 1600 can further be adapted to avoid tracking of movement of a communication device and instead direct multiple communication nodes 1404 to transmit the modulated signal of a particular communication device at its native frequency without knowledge of which communication node is in a communication range of the particular communication device. Similarly, each communication node can be instructed to receive modulated signals from the particular communication device and transport such signals in certain frequency channels of one or more uplink spectral segments 1510 without knowledge as to which communication node will receive modulated signals from the particular communication device. Such an implementation can help reduce the implementation complexity and cost of the communication nodes 1404.

While for purposes of simplicity of explanation, the respective processes are shown and described as a series of blocks in FIG. 16A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 16B:
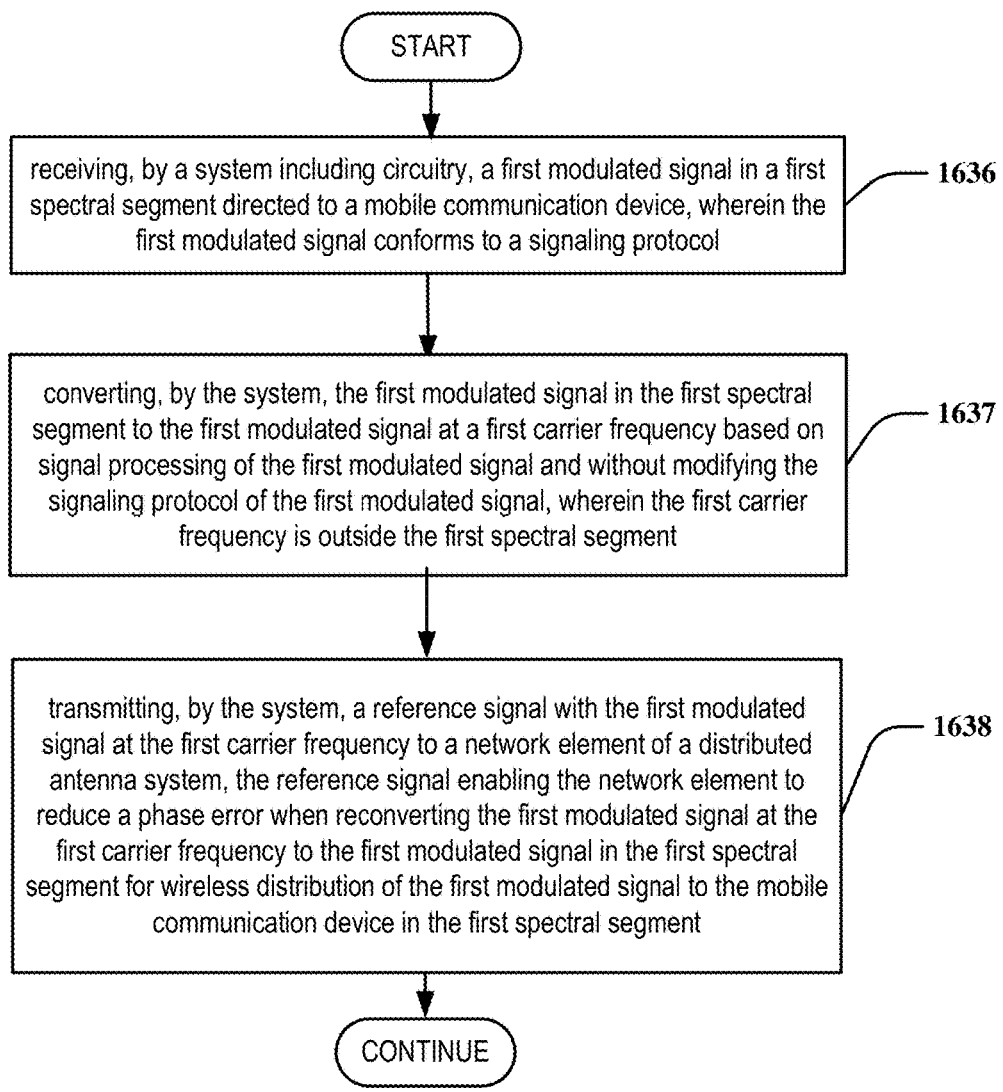
FIG. 16B illustrates a flow diagram of an example, non-limiting embodiment of a method in accordance with various aspects described herein.

Turning now to FIG. 16B, a flow diagram of an example, non-limiting embodiment of a method 1635, is shown. Method 1635 can be used with one or more functions and features presented in conjunction with FIGS. 1-15. Step 1636 includes receiving, by a system including circuitry, a first modulated signal in a first spectral segment directed to a mobile communication device, wherein the first modulated signal conforms to a signaling protocol. Step 1637 includes converting, by the system, the first modulated signal in the first spectral segment to the first modulated signal at a first carrier frequency based on a signal processing of the first modulated signal and without modifying the signaling protocol of the first modulated signal, wherein the first carrier frequency is outside the first spectral segment. Step 1638 includes transmitting, by the system, a reference signal with the first modulated signal at the first carrier frequency to a network element of a distributed antenna system, the reference signal enabling the network element to reduce a phase error when reconverting the first modulated signal at the first carrier frequency to the first modulated signal in the first spectral segment for wireless distribution of the first modulated signal to the mobile communication device in the first spectral segment.

In various embodiments, the signal processing does not require either analog to digital conversion or digital to analog conversion. The transmitting can comprise transmitting to the network element the first modulated signal at the first carrier frequency as a free space wireless signal. The first carrier frequency can be in a millimeter-wave frequency band.

The first modulated signal can be generated by modulating signals in a plurality of frequency channels according to the signaling protocol to generate the first modulated signal in the first spectral segment. The signaling protocol can comprise a Long-Term Evolution (LTE) wireless protocol or a fifth generation cellular communications protocol.

Converting by the system can comprise up-converting the first modulated signal in the first spectral segment to the first modulated signal at the first carrier frequency or down-converting the first modulated signal in the first spectral segment to the first modulated signal at the first carrier frequency. Converting by the network element can comprises down-converting the first modulated signal at the first carrier frequency to the first modulated signal in the first spectral segment or up-converting the first modulated signal at the first carrier frequency to the first modulated signal in the first spectral segment.

The method can further include receiving, by the system, a second modulated signal at a second carrier frequency from the network element, wherein the mobile communication device generates the second modulated signal in a second spectral segment, and wherein the network element converts the second modulated signal in the second spectral segment to the second modulated signal at the second carrier frequency and transmits the second modulated signal at the second carrier frequency. The method can further include converting, by the system, the second modulated signal at the second carrier frequency to the second modulated signal in the second spectral segment; and sending, by the system, the second modulated signal in the second spectral segment to a base station for processing.

The second spectral segment can differ from the first spectral segment, and wherein the first carrier frequency can differ from the second carrier frequency. The system can be mounted to a first utility pole and the network element can be mounted to a second utility pole.

While for purposes of simplicity of explanation, the respective processes are shown and described as a series of blocks in FIG. 16B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 16C:
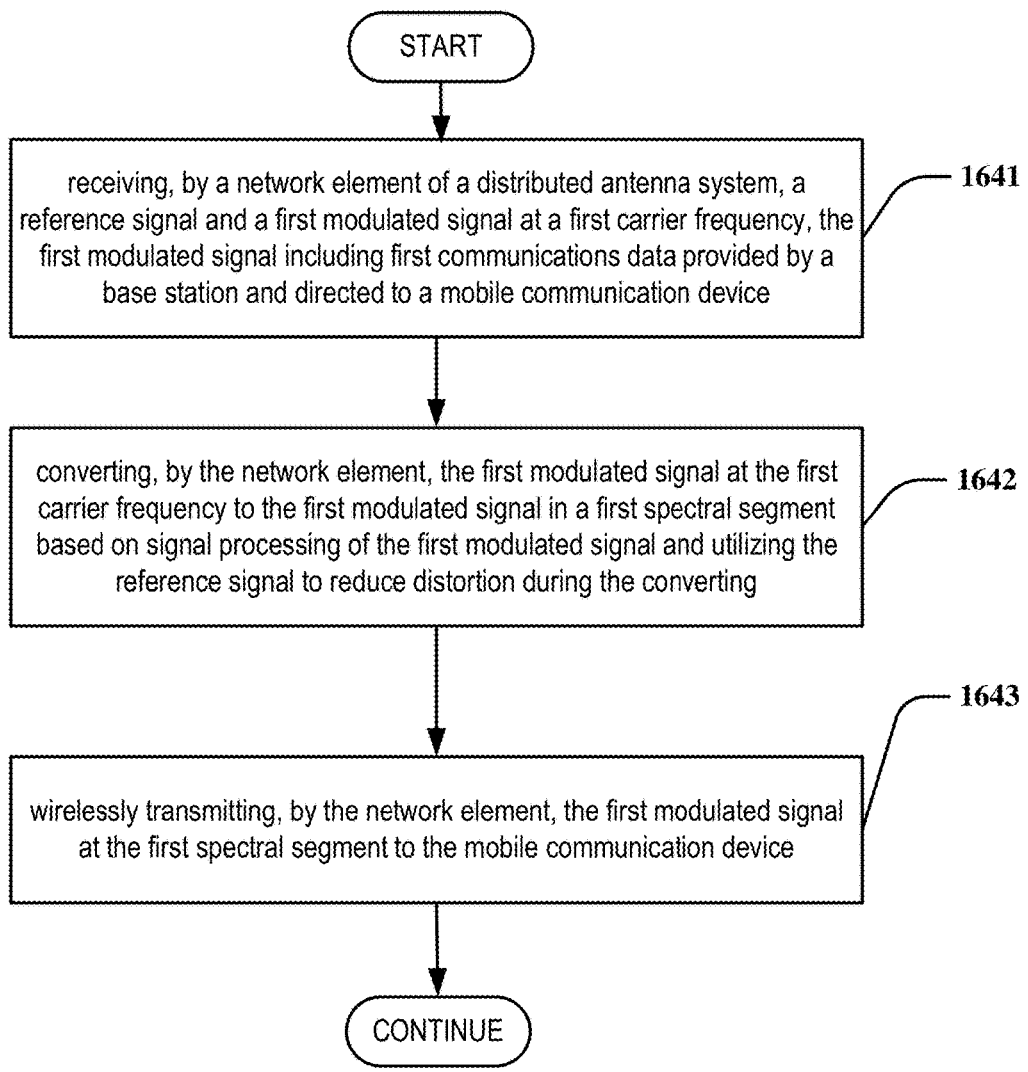
FIG. 16C illustrates a flow diagram of an example, non-limiting embodiment of a method in accordance with various aspects described herein.

Turning now to FIG. 16C, a flow diagram of an example, non-limiting embodiment of a method 1640, is shown. Method 1635 can be used with one or more functions and features presented in conjunction with FIGS. 1-15. Step 1641 include receiving, by a network element of a distributed antenna system, a reference signal and a first modulated signal at a first carrier frequency, the first modulated signal including first communications data provided by a base station and directed to a mobile communication device. Step 1642 includes converting, by the network element, the first modulated signal at the first carrier frequency to the first modulated signal in a first spectral segment based on a signal processing of the first modulated signal and utilizing the reference signal to reduce distortion during the converting. Step 1643 includes wirelessly transmitting, by the network element, the first modulated signal at the first spectral segment to the mobile communication device.

In various embodiments the first modulated signal conforms to a signaling protocol, and the signal processing converts the first modulated signal in the first spectral segment to the first modulated signal at the first carrier frequency without modifying the signaling protocol of the first modulated signal. The converting by the network element can include converting the first modulated signal at the first carrier frequency to the first modulated signal in the first spectral segment without modifying the signaling protocol of the first modulated signal. The method can further include receiving, by the network element, a second modulated signal in a second spectral segment generated by the mobile communication device, converting, by the network element, the second modulated signal in the second spectral segment to the second modulated signal at a second carrier frequency; and transmitting, by the network element, to an other network element of the distributed antenna system the second modulated signal at the second carrier frequency. The other network element of the distributed antenna system can receive the second modulated signal at the second carrier frequency, converts the second modulated signal at the second carrier frequency to the second modulated signal in the second spectral segment, and provides the second modulated signal in the second spectral segment to the base station for processing. The second spectral segment can differs from the first spectral segment, and the first carrier frequency can differ from the second carrier frequency.

While for purposes of simplicity of explanation, the respective processes are shown and described as a series of blocks in FIG. 16C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 16D:
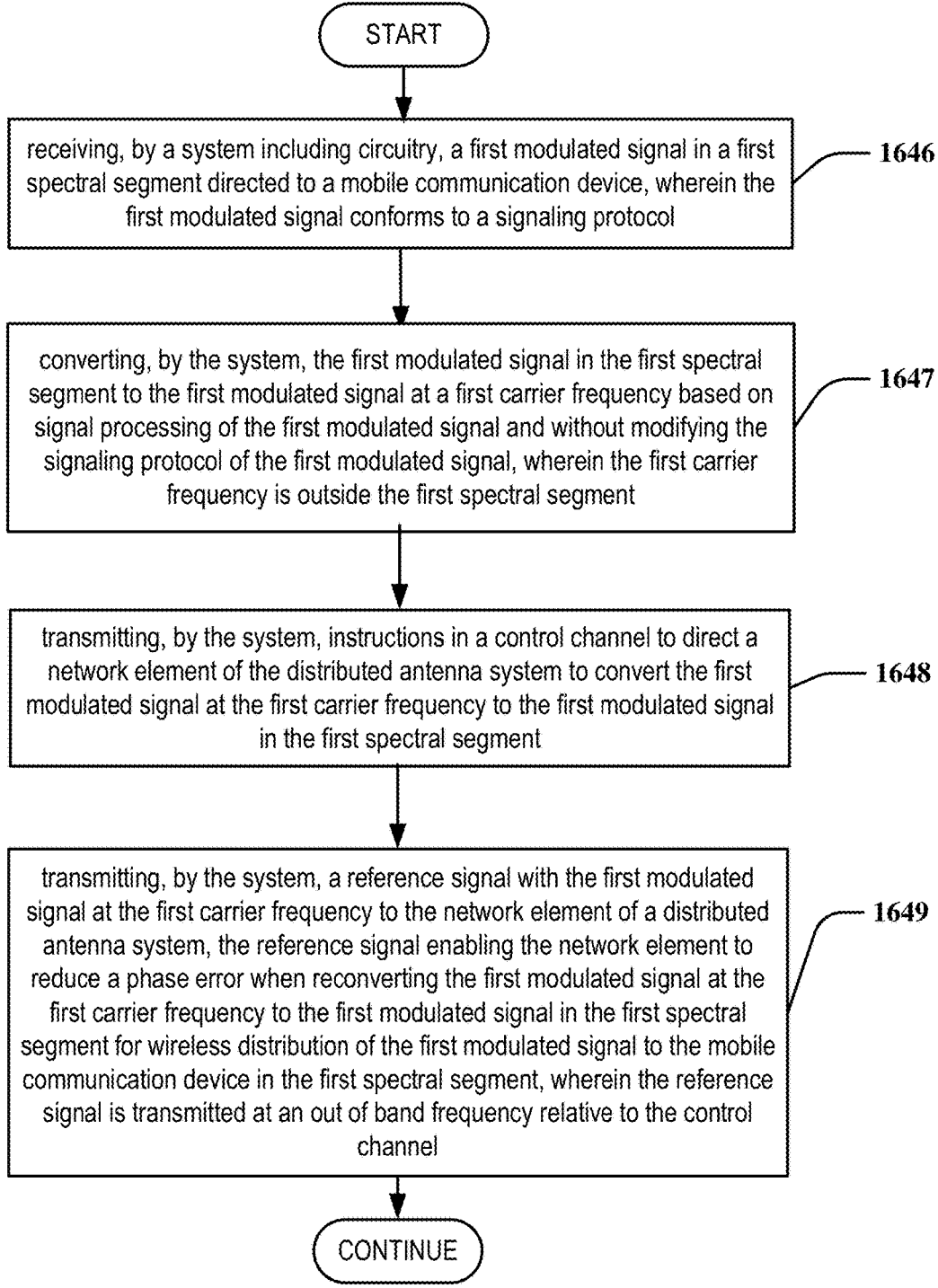
FIG. 16D illustrates a flow diagram of an example, non-limiting embodiment of a method in accordance with various aspects described herein.

Turning now to FIG. 16D, a flow diagram of an example, non-limiting embodiment of a method 1645, is shown. Method 1645 can be used with one or more functions and features presented in conjunction with FIGS. 1-15. Step 1646 includes receiving, by a system including circuitry, a first modulated signal in a first spectral segment directed to a mobile communication device, wherein the first modulated signal conforms to a signaling protocol. Step 1647 includes converting, by the system, the first modulated signal in the first spectral segment to the first modulated signal at a first carrier frequency based on a signal processing of the first modulated signal and without modifying the signaling protocol of the first modulated signal, wherein the first carrier frequency is outside the first spectral segment. Step 1648 includes transmitting, by the system, instructions in a control channel to direct a network element of the distributed antenna system to convert the first modulated signal at the first carrier frequency to the first modulated signal in the first spectral segment. Step 1649 includes transmitting, by the system, a reference signal with the first modulated signal at the first carrier frequency to the network element of a distributed antenna system, the reference signal enabling the network element to reduce a phase error when reconverting the first modulated signal at the first carrier frequency to the first modulated signal in the first spectral segment for wireless distribution of the first modulated signal to the mobile communication device in the first spectral segment, wherein the reference signal is transmitted at an out of band frequency relative to the control channel.

In various embodiments, the control channel is transmitted at a frequency adjacent to the first modulated signal at the first carrier frequency and/or at a frequency adjacent to the reference signal. The first carrier frequency can be in a millimeter-wave frequency band. The first modulated signal can be generated by modulating signals in a plurality of frequency channels according to the signaling protocol to generate the first modulated signal in the first spectral segment. The signaling protocol can comprise a Long-Term Evolution (LTE) wireless protocol or a fifth generation cellular communications protocol.

The converting by the system can comprises up-converting the first modulated signal in the first spectral segment to the first modulated signal at the first carrier frequency or down-converting the first modulated signal in the first spectral segment to the first modulated signal at the first carrier frequency. The converting by the network element can comprise down-converting the first modulated signal at the first carrier frequency to the first modulated signal in the first spectral segment or up-converting the first modulated signal at the first carrier frequency to the first modulated signal in the first spectral segment.

The method can further include receiving, by the system, a second modulated signal at a second carrier frequency from the network element, wherein the mobile communication device generates the second modulated signal in a second spectral segment, and wherein the network element converts the second modulated signal in the second spectral segment to the second modulated signal at the second carrier frequency and transmits the second modulated signal at the second carrier frequency. The method can further include converting, by the system, the second modulated signal at the second carrier frequency to the second modulated signal in the second spectral segment; and sending, by the system, the second modulated signal in the second spectral segment to a base station for processing.

The second spectral segment can differ from the first spectral segment, and wherein the first carrier frequency can differ from the second carrier frequency. The system can be mounted to a first utility pole and the network element can be mounted to a second utility pole.

While for purposes of simplicity of explanation, the respective processes are shown and described as a series of blocks in FIG. 16D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 16E:
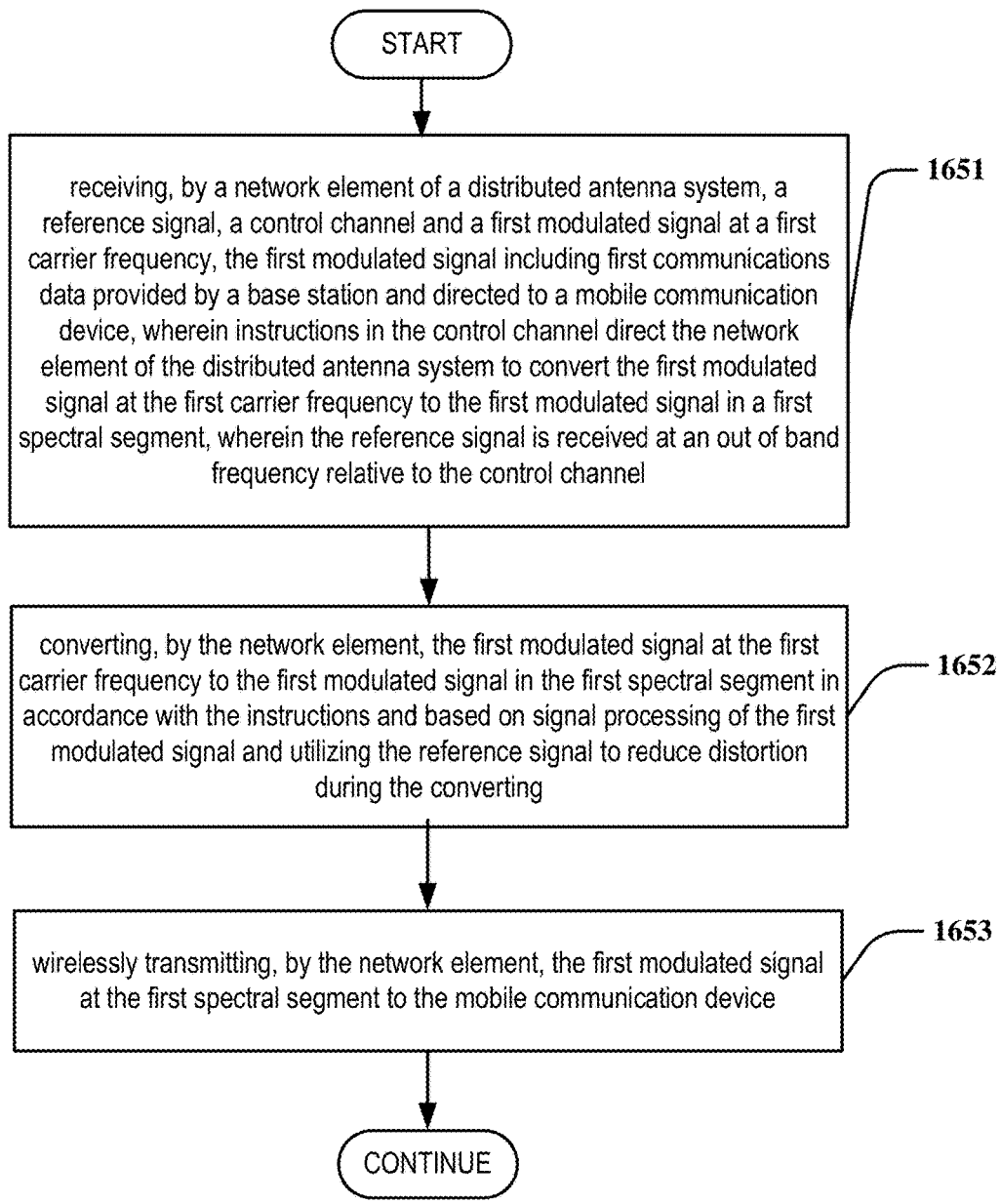
FIG. 16E illustrates a flow diagram of an example, non-limiting embodiment of a method in accordance with various aspects described herein.

Turning now to FIG. 16E, a flow diagram of an example, non-limiting embodiment of a method 1650, is shown. Method 1650 can be used with one or more functions and features presented in conjunction with FIGS. 1-15. Step 1651 includes receiving, by a network element of a distributed antenna system, a reference signal, a control channel and a first modulated signal at a first carrier frequency, the first modulated signal including first communications data provided by a base station and directed to a mobile communication device, wherein instructions in the control channel direct the network element of the distributed antenna system to convert the first modulated signal at the first carrier frequency to the first modulated signal in a first spectral segment, wherein the reference signal is received at an out of band frequency relative to the control channel. Step 1652 includes converting, by the network element, the first modulated signal at the first carrier frequency to the first modulated signal in the first spectral segment in accordance with the instructions and based on a signal processing of the first modulated signal and utilizing the reference signal to reduce distortion during the converting. Step 1653 includes wirelessly transmitting, by the network element, the first modulated signal at the first spectral segment to the mobile communication device.

In various embodiments, the control channel can be received at a frequency adjacent to the first modulated signal at the first carrier frequency and/or adjacent to the reference signal.

While for purposes of simplicity of explanation, the respective processes are shown and described as a series of blocks in FIG. 16E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 16F:
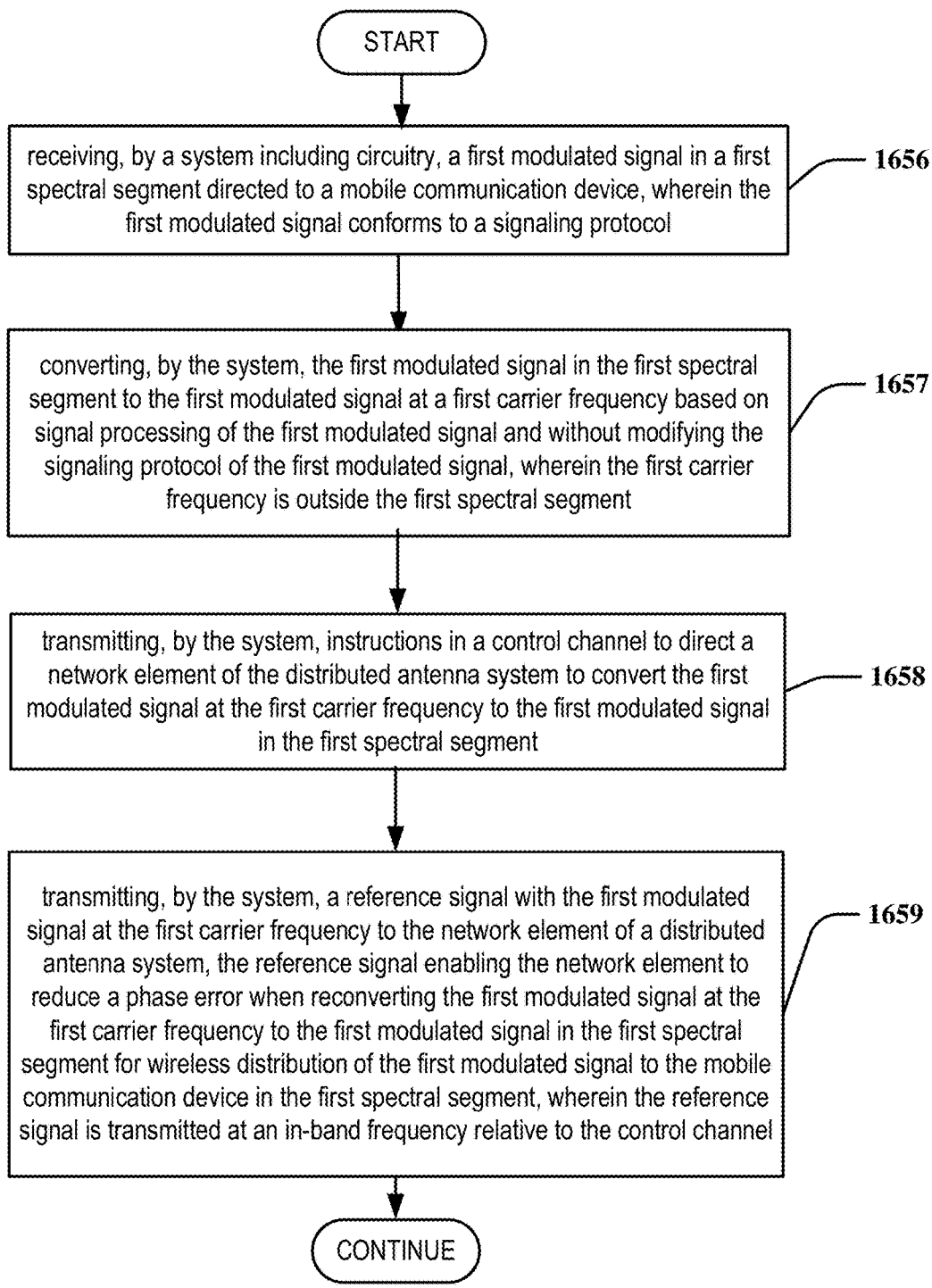
FIG. 16F illustrates a flow diagram of an example, non-limiting embodiment of a method in accordance with various aspects described herein.

Turning now to FIG. 16F, a flow diagram of an example, non-limiting embodiment of a method 1655, is shown. Method 1655 can be used with one or more functions and features presented in conjunction with FIGS. 1-15. Step 1656 includes receiving, by a system including circuitry, a first modulated signal in a first spectral segment directed to a mobile communication device, wherein the first modulated signal conforms to a signaling protocol. Step 1657 includes converting, by the system, the first modulated signal in the first spectral segment to the first modulated signal at a first carrier frequency based on a signal processing of the first modulated signal and without modifying the signaling protocol of the first modulated signal, wherein the first carrier frequency is outside the first spectral segment. Step 1658 includes transmitting, by the system, instructions in a control channel to direct a network element of the distributed antenna system to convert the first modulated signal at the first carrier frequency to the first modulated signal in the first spectral segment. Step 1659 includes transmitting, by the system, a reference signal with the first modulated signal at the first carrier frequency to the network element of a distributed antenna system, the reference signal enabling the network element to reduce a phase error when reconverting the first modulated signal at the first carrier frequency to the first modulated signal in the first spectral segment for wireless distribution of the first modulated signal to the mobile communication device in the first spectral segment, wherein the reference signal is transmitted at an in-band frequency relative to the control channel.

In various embodiments, the instructions are transmitted via modulation of the reference signal. The instructions can be transmitted as digital data via an amplitude modulation of the reference signal. The first carrier frequency can be in a millimeter-wave frequency band. The first modulated signal can be generated by modulating signals in a plurality of frequency channels according to the signaling protocol to generate the first modulated signal in the first spectral segment. The signaling protocol can comprise a Long-Term Evolution (LTE) wireless protocol or a fifth generation cellular communications protocol.

The converting by the system can comprises up-converting the first modulated signal in the first spectral segment to the first modulated signal at the first carrier frequency or down-converting the first modulated signal in the first spectral segment to the first modulated signal at the first carrier frequency. The converting by the network element can comprise down-converting the first modulated signal at the first carrier frequency to the first modulated signal in the first spectral segment or up-converting the first modulated signal at the first carrier frequency to the first modulated signal in the first spectral segment.

The method can further include receiving, by the system, a second modulated signal at a second carrier frequency from the network element, wherein the mobile communication device generates the second modulated signal in a second spectral segment, and wherein the network element converts the second modulated signal in the second spectral segment to the second modulated signal at the second carrier frequency and transmits the second modulated signal at the second carrier frequency. The method can further include converting, by the system, the second modulated signal at the second carrier frequency to the second modulated signal in the second spectral segment; and sending, by the system, the second modulated signal in the second spectral segment to a base station for processing.

The second spectral segment can differ from the first spectral segment, and wherein the first carrier frequency can differ from the second carrier frequency. The system can be mounted to a first utility pole and the network element can be mounted to a second utility pole.

While for purposes of simplicity of explanation, the respective processes are shown and described as a series of blocks in FIG. 16F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 16G:
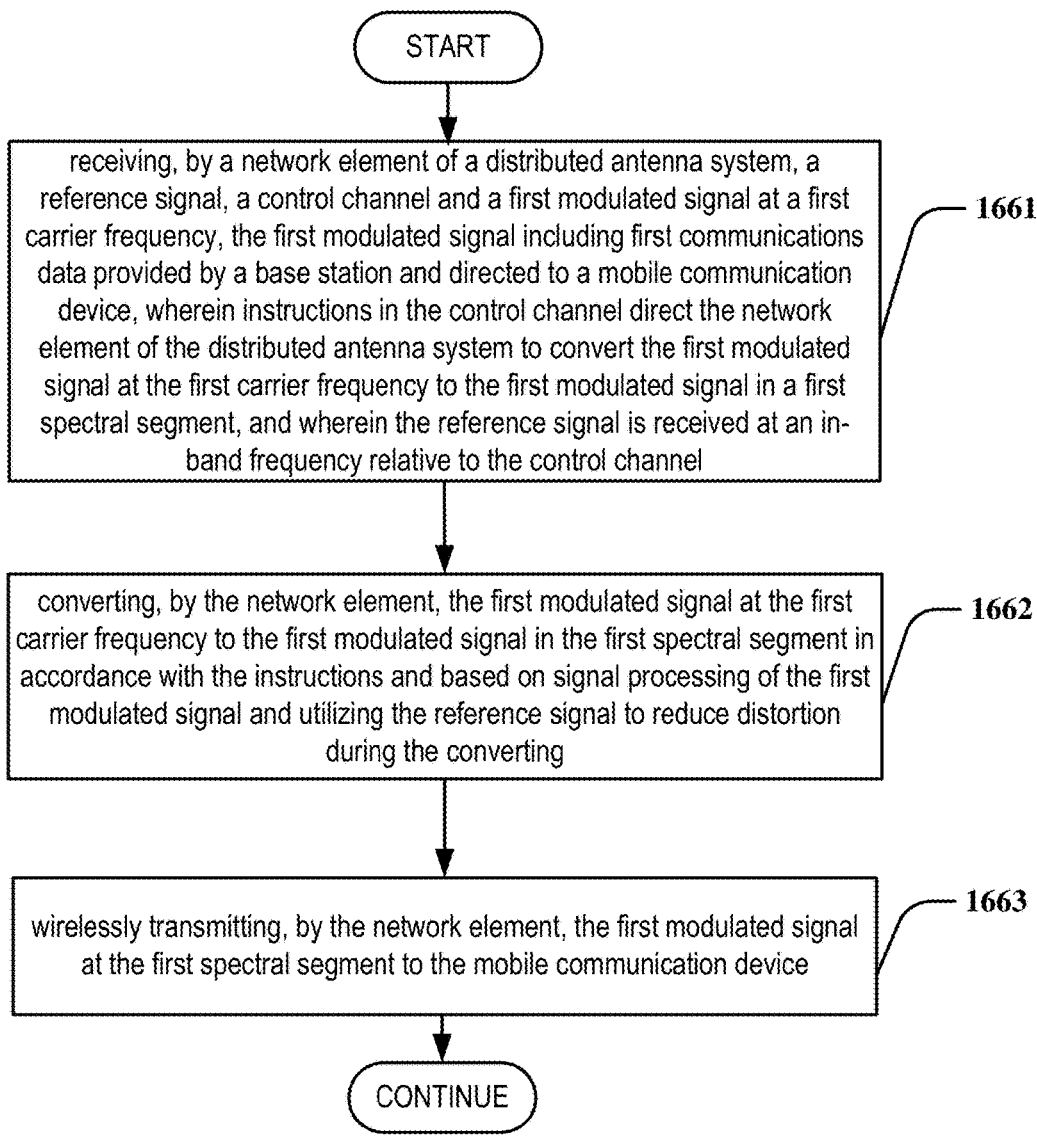
FIG. 16G illustrates a flow diagram of an example, non-limiting embodiment of a method in accordance with various aspects described herein.

Turning now to FIG. 16G, a flow diagram of an example, non-limiting embodiment of a method 1660, is shown. Method 1660 can be used with one or more functions and features presented in conjunction with FIGS. 1-15. Step 1661 includes receiving, by a network element of a distributed antenna system, a reference signal, a control channel and a first modulated signal at a first carrier frequency, the first modulated signal including first communications data provided by a base station and directed to a mobile communication device, wherein instructions in the control channel direct the network element of the distributed antenna system to convert the first modulated signal at the first carrier frequency to the first modulated signal in a first spectral segment, and wherein the reference signal is received at an in-band frequency relative to the control channel. Step 1662 includes converting, by the network element, the first modulated signal at the first carrier frequency to the first modulated signal in the first spectral segment in accordance with the instructions and based on a signal processing of the first modulated signal and utilizing the reference signal to reduce distortion during the converting. Step 1663 includes wirelessly transmitting, by the network element, the first modulated signal at the first spectral segment to the mobile communication device.

In various embodiments, the instructions are received via demodulation of the reference signal and/or as digital data via an amplitude demodulation of the reference signal.

While for purposes of simplicity of explanation, the respective processes are shown and described as a series of blocks in FIG. 16G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 16H:
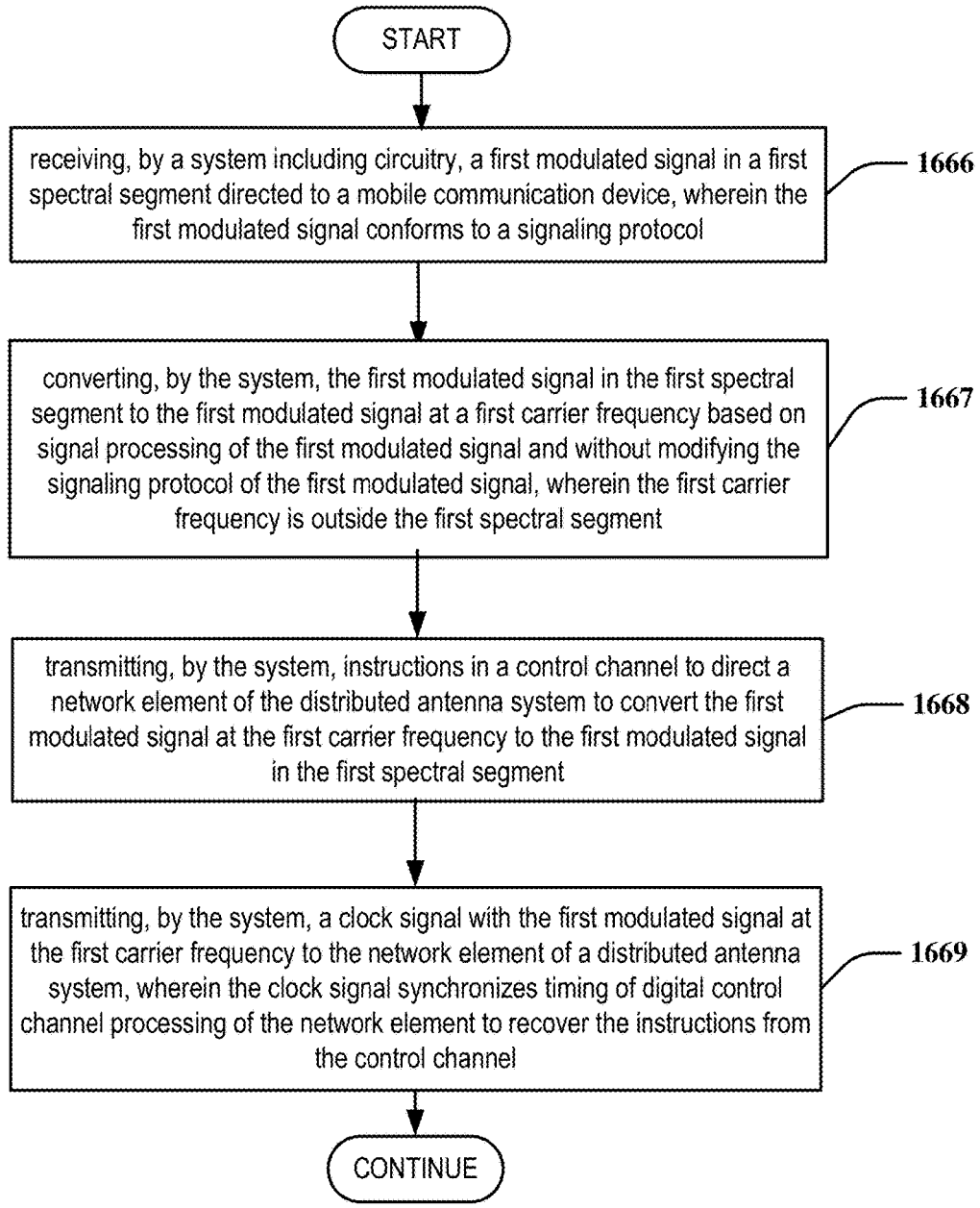
FIG. 16H illustrates a flow diagram of an example, non-limiting embodiment of a method in accordance with various aspects described herein.

Turning now to FIG. 16H, a flow diagram of an example, non-limiting embodiment of a method 1665, is shown. Method 1665 can be used with one or more functions and features presented in conjunction with FIGS. 1-15. Step 1666 includes receiving, by a system including circuitry, a first modulated signal in a first spectral segment directed to a mobile communication device, wherein the first modulated signal conforms to a signaling protocol. Step 1667 includes converting, by the system, the first modulated signal in the first spectral segment to the first modulated signal at a first carrier frequency based on a signal processing of the first modulated signal and without modifying the signaling protocol of the first modulated signal, wherein the first carrier frequency is outside the first spectral segment. Step 1668 includes transmitting, by the system, instructions in a control channel to direct a network element of the distributed antenna system to convert the first modulated signal at the first carrier frequency to the first modulated signal in the first spectral segment. Step 1669 includes transmitting, by the system, a clock signal with the first modulated signal at the first carrier frequency to the network element of a distributed antenna system, wherein the clock signal synchronizes timing of digital control channel processing of the network element to recover the instructions from the control channel.

In various embodiments, the method further includes transmitting, by the system, a reference signal with the first modulated signal at the first carrier frequency to a network element of a distributed antenna system, the reference signal enabling the network element to reduce a phase error when reconverting the first modulated signal at the first carrier frequency to the first modulated signal in the first spectral segment for wireless distribution of the first modulated signal to the mobile communication device in the first spectral segment. The instructions can be transmitted as digital data via the control channel.

In various embodiments, the first carrier frequency can be in a millimeter-wave frequency band. The first modulated signal can be generated by modulating signals in a plurality of frequency channels according to the signaling protocol to generate the first modulated signal in the first spectral segment. The signaling protocol can comprise a Long-Term Evolution (LTE) wireless protocol or a fifth generation cellular communications protocol.

The converting by the system can comprises up-converting the first modulated signal in the first spectral segment to the first modulated signal at the first carrier frequency or down-converting the first modulated signal in the first spectral segment to the first modulated signal at the first carrier frequency. The converting by the network element can comprise down-converting the first modulated signal at the first carrier frequency to the first modulated signal in the first spectral segment or up-converting the first modulated signal at the first carrier frequency to the first modulated signal in the first spectral segment.

The method can further include receiving, by the system, a second modulated signal at a second carrier frequency from the network element, wherein the mobile communication device generates the second modulated signal in a second spectral segment, and wherein the network element converts the second modulated signal in the second spectral segment to the second modulated signal at the second carrier frequency and transmits the second modulated signal at the second carrier frequency. The method can further include converting, by the system, the second modulated signal at the second carrier frequency to the second modulated signal in the second spectral segment; and sending, by the system, the second modulated signal in the second spectral segment to a base station for processing.

The second spectral segment can differ from the first spectral segment, and wherein the first carrier frequency can differ from the second carrier frequency. The system can be mounted to a first utility pole and the network element can be mounted to a second utility pole.

While for purposes of simplicity of explanation, the respective processes are shown and described as a series of blocks in FIG. 16H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 16I:
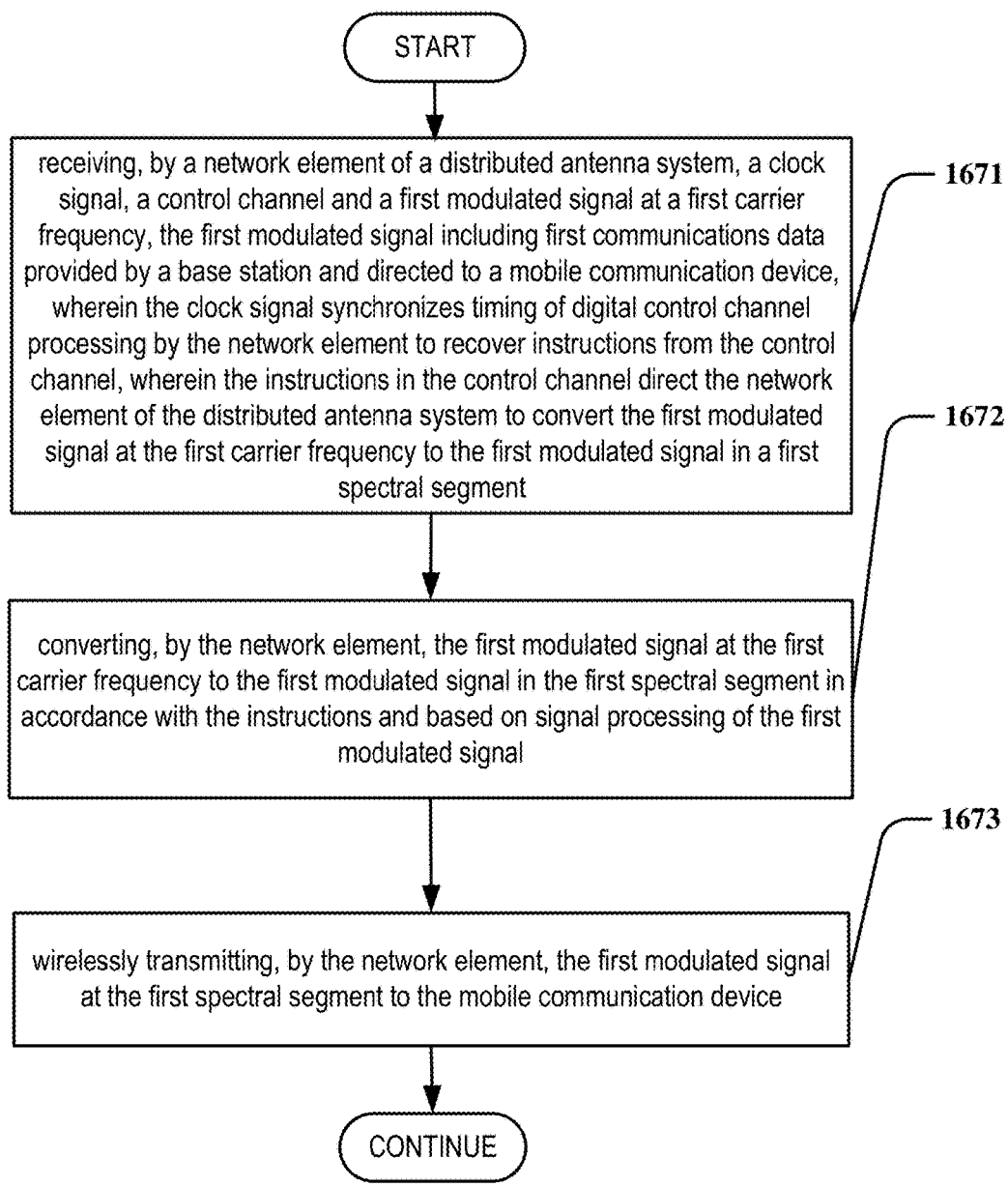
FIG. 16I illustrates a flow diagram of an example, non-limiting embodiment of a method in accordance with various aspects described herein.

Turning now to FIG. 16I, a flow diagram of an example, non-limiting embodiment of a method 1670, is shown. Method 1670 can be used with one or more functions and features presented in conjunction with FIGS. 1-15. Step 1671 includes receiving, by a network element of a distributed antenna system, a clock signal, a control channel and a first modulated signal at a first carrier frequency, the first modulated signal including first communications data provided by a base station and directed to a mobile communication device, wherein the clock signal synchronizes timing of digital control channel processing by the network element to recover instructions from the control channel, wherein the instructions in the control channel direct the network element of the distributed antenna system to convert the first modulated signal at the first carrier frequency to the first modulated signal in a first spectral segment. Step 1672 includes converting, by the network element, the first modulated signal at the first carrier frequency to the first modulated signal in the first spectral segment in accordance with the instructions and based on a signal processing of the first modulated signal. Step 1673 includes wirelessly transmitting, by the network element, the first modulated signal at the first spectral segment to the mobile communication device. In various embodiments, the instructions are received as digital data via the control channel.

While for purposes of simplicity of explanation, the respective processes are shown and described as a series of blocks in FIG. 16I, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 16J:
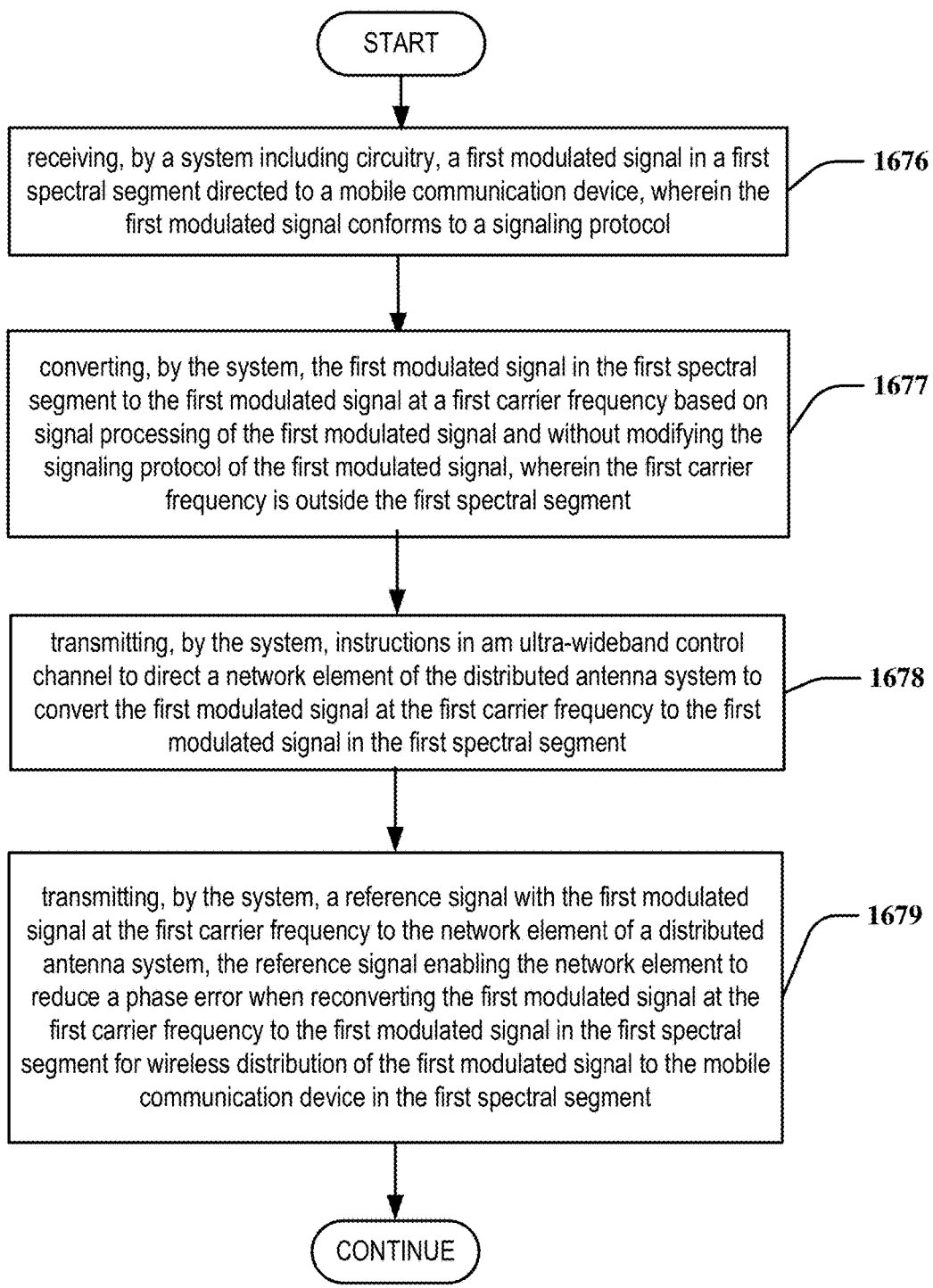
FIG. 16J illustrates a flow diagram of an example, non-limiting embodiment of a method in accordance with various aspects described herein.

Turning now to FIG. 16J, a flow diagram of an example, non-limiting embodiment of a method 1675, is shown. Method 1675 can be used with one or more functions and features presented in conjunction with FIGS. 1-15. Step 1676 includes receiving, by a system including circuitry, a first modulated signal in a first spectral segment directed to a mobile communication device, wherein the first modulated signal conforms to a signaling protocol. Step 1677 includes converting, by the system, the first modulated signal in the first spectral segment to the first modulated signal at a first carrier frequency based on a signal processing of the first modulated signal and without modifying the signaling protocol of the first modulated signal, wherein the first carrier frequency is outside the first spectral segment. Step 1678 includes transmitting, by the system, instructions in an ultra-wideband control channel to direct a network element of the distributed antenna system to convert the first modulated signal at the first carrier frequency to the first modulated signal in the first spectral segment. Step 1659 includes transmitting, by the system, a reference signal with the first modulated signal at the first carrier frequency to the network element of a distributed antenna system, the reference signal enabling the network element to reduce a phase error when reconverting the first modulated signal at the first carrier frequency to the first modulated signal in the first spectral segment for wireless distribution of the first modulated signal to the mobile communication device in the first spectral segment.

In various embodiments, wherein the first reference signal is transmitted at an in-band frequency relative to the ultra-wideband control channel. The method can further include receiving, via the ultra-wideband control channel from the network element of a distributed antenna system, control channel data that includes include: status information that indicates network status of the network element, network device information that indicates device information of the network element or an environmental measurement indicating an environmental condition in proximity to the network element. The instructions can further include a channel spacing, a guard band parameter, an uplink/downlink allocation, or an uplink channel selection.

The first modulated signal can be generated by modulating signals in a plurality of frequency channels according to the signaling protocol to generate the first modulated signal in the first spectral segment. The signaling protocol can comprise a Long-Term Evolution (LTE) wireless protocol or a fifth generation cellular communications protocol.

The converting by the system can comprises up-converting the first modulated signal in the first spectral segment to the first modulated signal at the first carrier frequency or down-converting the first modulated signal in the first spectral segment to the first modulated signal at the first carrier frequency. The converting by the network element can comprise down-converting the first modulated signal at the first carrier frequency to the first modulated signal in the first spectral segment or up-converting the first modulated signal at the first carrier frequency to the first modulated signal in the first spectral segment.

The method can further include receiving, by the system, a second modulated signal at a second carrier frequency from the network element, wherein the mobile communication device generates the second modulated signal in a second spectral segment, and wherein the network element converts the second modulated signal in the second spectral segment to the second modulated signal at the second carrier frequency and transmits the second modulated signal at the second carrier frequency. The method can further include converting, by the system, the second modulated signal at the second carrier frequency to the second modulated signal in the second spectral segment; and sending, by the system, the second modulated signal in the second spectral segment to a base station for processing.

The second spectral segment can differ from the first spectral segment, and wherein the first carrier frequency can differ from the second carrier frequency. The system can be mounted to a first utility pole and the network element can be mounted to a second utility pole.

While for purposes of simplicity of explanation, the respective processes are shown and described as a series of blocks in FIG. 16J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 16K:
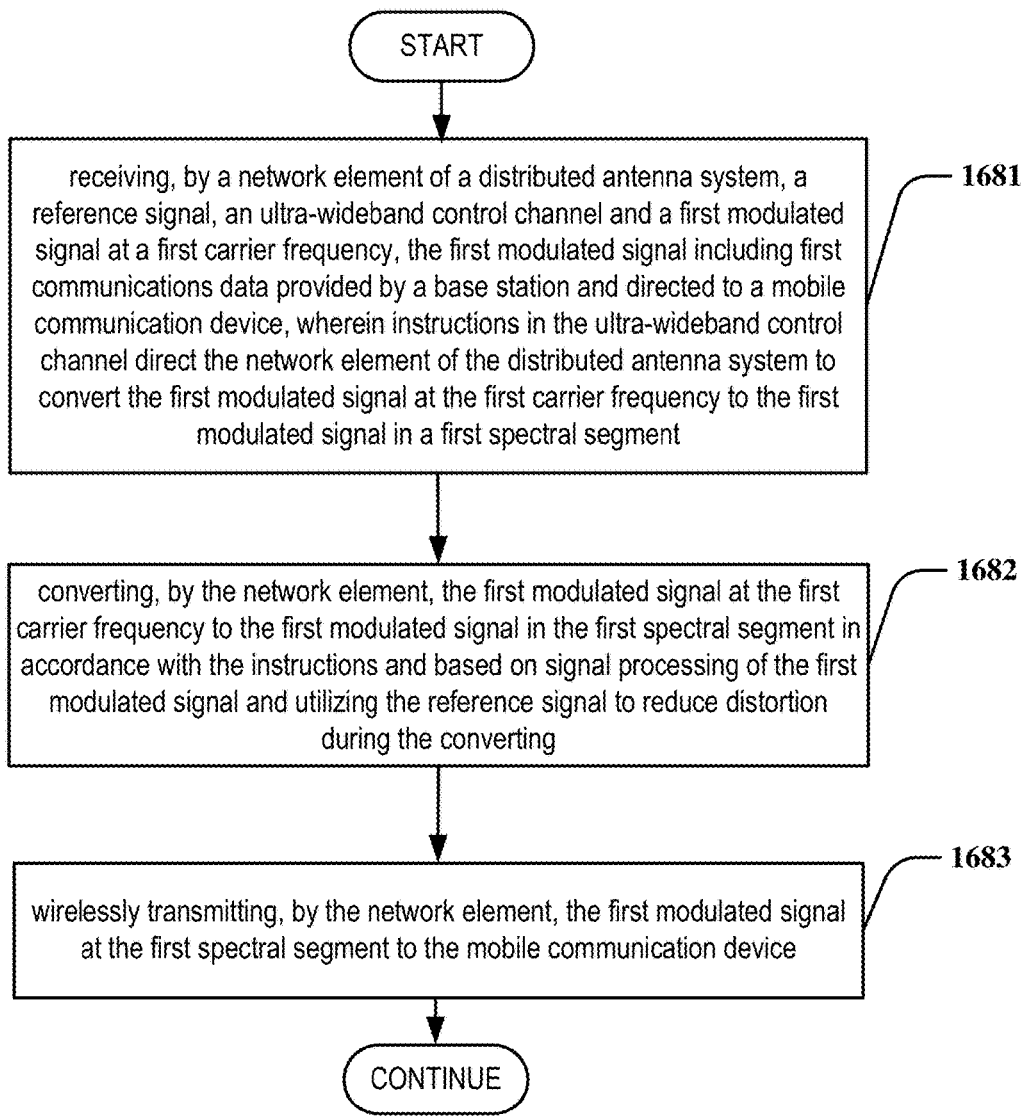
FIG. 16K illustrates a flow diagram of an example, non-limiting embodiment of a method in accordance with various aspects described herein.

Turning now to FIG. 16K, a flow diagram of an example, non-limiting embodiment of a method 1680, is shown. Method 1680 can be used with one or more functions and features presented in conjunction with FIGS. 1-15. Step 1681 includes receiving, by a network element of a distributed antenna system, a reference signal, an ultra-wideband control channel and a first modulated signal at a first carrier frequency, the first modulated signal including first communications data provided by a base station and directed to a mobile communication device, wherein instructions in the ultra-wideband control channel direct the network element of the distributed antenna system to convert the first modulated signal at the first carrier frequency to the first modulated signal in a first spectral segment, and wherein the reference signal is received at an in-band frequency relative to the control channel. Step 1682 includes converting, by the network element, the first modulated signal at the first carrier frequency to the first modulated signal in the first spectral segment in accordance with the instructions and based on a signal processing of the first modulated signal and utilizing the reference signal to reduce distortion during the converting. Step 1683 includes wirelessly transmitting, by the network element, the first modulated signal at the first spectral segment to the mobile communication device.

In various embodiments, wherein the first reference signal is received at an in-band frequency relative to the ultra-wideband control channel. The method can further include transmitting, via the ultra-wideband control channel from the network element of a distributed antenna system, control channel data that includes include: status information that indicates network status of the network element, network device information that indicates device information of the network element or an environmental measurement indicating an environmental condition in proximity to the network element. The instructions can further include a channel spacing, a guard band parameter, an uplink/downlink allocation, or an uplink channel selection.

While for purposes of simplicity of explanation, the respective processes are shown and described as a series of blocks in FIG. 16K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1320 (see below), non-volatile memory 1322 (see below), disk storage 1324 (see below), and memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x =$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
receiving, by an antenna system of a second network element of a distributed antenna system, a wireless signal from a first network element of the distributed antenna system, wherein the wireless signal includes a reference signal and includes a modulated signal that is frequency-shifted from a first spectral segment to a carrier frequency without modulating or demodulating the modulated signal at the carrier frequency;
converting, by the second network element, the wireless signal to an electrical signal, wherein the electrical signal includes the reference signal and the modulated signal at the carrier frequency;
amplifying, by the second network element, the reference signal and the modulated signal included in the electrical signal to generate an amplified reference signal and an amplified modulated signal at the carrier frequency, wherein the amplified reference signal enables a third network element of the distributed antenna system to reduce signal distortion when converting the amplified modulated signal at the carrier frequency to the modulated signal in a second spectral segment; and
transmitting, by the antenna system of the second network element, the amplified reference signal and the amplified modulated signal at the carrier frequency as another wireless signal directed to the third network element.

2. The method of claim 1, wherein the frequency-shifting comprises up-converting, by the first network element, the modulated signal in the first spectral segment to the modulated signal at the carrier frequency.

3. The method of claim 2, wherein the converting by the third network element comprises down-converting the amplified modulated signal at the carrier frequency to the modulated signal in the second spectral segment.

4. The method of claim 1, wherein the frequency-shifting comprises down-converting, by the first network element, the modulated signal in the first spectral segment to the modulated signal at the carrier frequency.

5. The method of claim 4, wherein the converting by the third network element comprises up-converting the amplified modulated signal at the carrier frequency to the modulated signal in the second spectral segment.

6. The method of claim 1, wherein the wireless signal further includes a control channel.

7. The method of claim 6, wherein the control channel comprises instructions directing the third network element of the distributed antenna system to convert the amplified modulated signal at the carrier frequency to the modulated signal in the second spectral segment.

8. The method of claim 7, wherein the reference signal is modulated with the instructions in the control channel.

9. The method of claim 1, wherein the modulated signal is modulated with a signaling protocol that comprises a Long-Term Evolution (LTE) wireless protocol or a fifth generation cellular communications protocol.

10. A repeater system of a distributed antenna system, the repeater system comprising:
an antenna; and
communication circuitry that facilitates operations, the operations comprising:
receiving, by the antenna, a wireless signal from an upstream system of the distributed antenna system, wherein the wireless signal includes a reference signal and includes a modulated signal that is frequency-shifted from a first spectral segment to a carrier frequency without modulating or demodulating the modulated signal at the carrier frequency;
converting the wireless signal to an electrical signal, wherein the electrical signal includes the reference signal and the modulated signal at the carrier frequency;
amplifying the reference signal and the modulated signal included in the electrical signal to generate an amplified reference signal and an amplified modulated signal at the carrier frequency, wherein the amplified reference signal facilitates a reduction in signal distortion when a downstream system of the distributed antenna system converts the amplified modulated signal at the carrier frequency to the modulated signal in a second spectral segment; and
transmitting the amplified modulated signal at the carrier frequency and the amplified reference signal in another wireless signal, wherein the transmitting is to the downstream system.

11. The repeater system of claim 10, wherein the frequency-shifting comprises up-converting, by the upstream system, the modulated signal in the first spectral segment to the modulated signal at the carrier frequency.

12. The repeater system of claim 11, wherein the downstream system performs conversion via down-converting the amplified modulated signal at the carrier frequency to the modulated signal in the second spectral segment.

13. The repeater system of claim 10, wherein the frequency-shifting comprises down-converting, by the upstream system, the modulated signal in the first spectral segment to the modulated signal at the carrier frequency.

14. The repeater system of claim 13, wherein the downstream system performs conversion via up-converting the amplified modulated signal at the carrier frequency to the modulated signal in the second spectral segment.

15. A repeater element of a distributed antenna system, the repeater element comprising:
an antenna system; and
communication circuitry that facilitates operations, the operations comprising:
receiving, by the antenna system, a first wireless signal in a carrier frequency from a first network element of the distributed antenna system, the first wireless signal including a reference signal and a modulated signal at the carrier frequency; and
transmitting, by the antenna system, a second wireless signal at the carrier frequency, the second wireless signal being received by a second network element of the distributed antenna system, the second wireless signal including an amplified version of the reference signal and including an amplified version of the modulated signal at the carrier frequency, the amplified version of the reference signal enabling the second network element to reduce signal distortion when frequency shifting the amplified version of the modulated signal at the carrier frequency to the modulated signal in a spectral segment without modulating or demodulating the amplified version of the modulated signal, the carrier frequency not overlapping in frequency with the spectral segment.

16. The repeater element of claim 15, wherein the frequency shifting comprises down-converting.

17. The repeater element of claim 15, wherein the frequency shifting comprises up-converting.

18. The repeater element of claim 15, wherein the second wireless signal further includes a control channel comprising instructions directing the second network element of the distributed antenna system to frequency shift the amplified version of the modulated signal at the carrier frequency to the modulated signal in the spectral segment.

19. The repeater element of claim 18, wherein the amplified version of the reference signal is modulated with the instructions in the control channel.

20. The repeater element of claim 15, wherein the frequency shifting further comprises frequency shifting the reference signal.

* * * * *